US012696221B2

(12) United States Patent
Vaidya et al.

(10) Patent No.: US 12,696,221 B2
(45) Date of Patent: Jul. 28, 2026

(54) METHODS AND APPARATUS FOR SUPPORTING AND USING OF A QUIC CONNECTION BETWEEN A UE AND TNGF IN A COMMUNICATIONS SYSTEM

(71) Applicant: Charter Communications Operating, LLC, St. Louis, MO (US)

(72) Inventors: Maulik Vaidya, Escondido, CA (US); Paul L. Russell, Jr., Lawrence, NJ (US); Imtiyaz Shaikh, Irving, TX (US); Yildirim Sahin, Englewood, CO (US); Umamaheswar Achari Kakinada, Greenwood Village, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 177 days.

(21) Appl. No.: 18/377,755

(22) Filed: Oct. 6, 2023

(65) Prior Publication Data

US 2025/0106803 A1      Mar. 27, 2025

Related U.S. Application Data

(60) Provisional application No. 63/540,046, filed on Sep. 22, 2023.

(51) Int. Cl.
*H04W 60/04*        (2009.01)
*H04L 5/00*        (2006.01)
(Continued)

(52) U.S. Cl.
CPC ........... *H04W 60/04* (2013.01); *H04L 5/0044* (2013.01); *H04W 12/06* (2013.01);
(Continued)

(58) Field of Classification Search
None
See application file for complete search history.

(56) References Cited

U.S. PATENT DOCUMENTS 12,432,565 B2 *   9/2025   Boucadair ............. H04W 76/12
2019/0281522 A1    9/2019   Wong et al.
(Continued)

OTHER PUBLICATIONS

Thomson et al., Request for Comments (RFC) 9001 "Using TLS to Secure QUIC", Internet Engineering Task Force (IETF), May 2021, 31 pages.

(Continued)

*Primary Examiner* — Eunsook Choi
(74) *Attorney, Agent, or Firm* — Straub & Straub; Michael P. Straub; Stephen T. Straub

(57) ABSTRACT

Methods and apparatus for using a QUIC connection established between a user equipment (UE) and a Trusted Non-3GPP Gateway Function (TNGF) to support trusted non-3GPP access which facilitates Access Traffic Steering, Switching, and Splitting (ATSSS) are described. An exemplary TGNF, implements Multiplexed Application Substrate over QUIC Encryption (MASQUE) over QUIC. In some embodiments, QUIC connection IDs are used to delineate control plane (CP) traffic and user plane traffic being communicated over the established QUIC connection. In other embodiments, a new 3GPP Payload type header is used to delineate between control plane (CP) traffic and user plane traffic communicated over the established QUIC connection.

18 Claims, 40 Drawing Sheets

(51) Int. Cl.

| | | |
|---|---|---|
| *H04W 12/06* | (2021.01) | |
| *H04W 28/02* | (2009.01) | |
| *H04W 76/10* | (2018.01) | |
| *H04W 80/06* | (2009.01) | |

(52) U.S. Cl.
CPC ....... *H04W 28/0263* (2013.01); *H04W 76/10* (2018.02); *H04W 80/06* (2013.01)

(56) References Cited

U.S. PATENT DOCUMENTS

| | | | |
|---|---|---|---|
| 2023/0074838 | A1 | 3/2023 | De Foy et al. |
| 2023/0080836 | A1 | 3/2023 | Vahidi Mazinani et al. |
| 2023/0171643 | A1* | 6/2023 | Nadkarni ........... H04L 41/5022 |
| | | | 370/235 |
| 2023/0217509 | A1 | 7/2023 | Lin et al. |
| 2023/0370848 | A1* | 11/2023 | Boucadair ............. H04L 63/166 |
| 2024/0298174 | A1 | 9/2024 | Rajadurai et al. |
| 2024/0314561 | A1 | 9/2024 | Rohini et al. |
| 2025/0106907 | A1 | 3/2025 | Vaidya et al. |
| 2025/0168635 | A1 | 5/2025 | Stojanovski et al. |
| 2025/0184881 | A1 | 6/2025 | Olvera-Hernandez et al. |
| 2025/0202801 | A1 | 6/2025 | Salkintzis |
| 2025/0212268 | A1 | 6/2025 | Mihály et al. |
| 2025/0311025 | A1 | 10/2025 | Sabin et al. |

OTHER PUBLICATIONS

KI#2.2: New Solution: ATSSS architectures over non-3GPP access, alleviating the use of EAP-5G and IPsec, SA WG2 Meeting #161, S2-2402816, Athens, Greece, Feb. 26-Mar. 1, 2024, 15 pages.

3rd Generation Partnership Project; Technical Specification Group Services and System Aspects; Study on access traffic steering, switching and splitting support in the 5G system architecture; Phase 3 (Release 18), 3GPP TR 23.700-53 V18.0.0, Dec. 2022, 102 pages.

Notification of Transmittal of the International Search Report and the Written Opinion of the International Searching Authority, Inter-national Search Report and Written Opinion of the International Searching Authority from PCT/US2024/047871, dated Dec. 23, 2024, 17 pages.

3rd Generation Partnership Project; Technical Specification Group Services and System Aspects; System architecture for the 5G System (5GS); Stage 2 (Release 18), 3GPP TS 23.501 V18.3.0, Sep. 2023, 696 pages.

3rd Generation Partnership Project; Technical Specification Group Services and System Aspects; Procedures for the 5G System (5GS); Stage 2 (Release 18), 3GPP TS 23.502 V18.3.0, Sep. 2023, 899 pages.

3rd Generation Partnership Project; Technical Specification Group Services and System Aspects; Security architecture and procedures for 5G system (Release 18), 3GPP TS 33.501 V18.3.0, Sep. 2023, 322 pages.

Eric Rescorla, Request for Comments (RFC) 8446 "The Transport Layer Security (TLS) Protocol Version 1.3", Internet Engineering Task Force (IETF), Aug. 2018, 160 pages.

Barnes et al., Request for Comments (RFC) 8555 "Automatic Certificate Management Environment (ACME)", Internet Engineering Task Force (IETF), Mar. 2019, 95 pages.

Iyengar et al., Request for Comments (RFC) 9000 "QUIC: A UDP-Based Multiplexed and Secure Transport", Internet Engineering Task Force (IETF), May 2021, 96 pages.

Schinazi et al., Request for Comments (RFC) 9297 "HTTP Datagrams and the Capsule Protocol", Internet Engineering Task Force (IETF), Aug. 2022, 14 pages.

Schinazi et al., Request for Comments (RFC) 9298 "Proxying UDP in HTTP", Internet Engineering Task Force (IETF), Aug. 2022, 16 pages.

Pauly et al., draft-ietf-masque-connect-ip-04 "Proxying IP in HTTP", Internet Engineering Task Force (IETF), Jan. 18, 2023, 28 pages.

A. R. Sedeño, draft-asedeno-masque-connect-ethernet-00 "Proxying Ethernet in HTTP", Internet Engineering Task Force (IETF), May 1, 2023, 13 pages.

Kaufman et al., Request for Comments (RFC) 7296 "Internet Key Exchange Protocol Version 2 (IKEv2)", Internet Engineering Task Force (IETF), Oct. 2014, 142 pages.

* cited by examiner

METHODS AND APPARATUS FOR SUPPORTING AND USING OF A QUIC CONNECTION BETWEEN A UE AND TNGF IN A COMMUNICATIONS SYSTEM

RELATED APPLICATIONS

The present application claims the benefit of U.S. Provisional Patent application Ser. No. 63/540,046 which was filed on Sep. 22, 2023 and which is hereby expressly incorporated by reference in its entirety.

FIELD

The invention relates to methods and apparatus for supporting non-3GPP network access.

BACKGROUND

The 5G System architecture is designed to support a wide variety of connectivity networks, including both wireline and wireless access networks. 3rd Generation Partnership Project (3GPP) Rel-16 introduced an optional Access Traffic Steering, Switching, and Splitting (ATSSS) feature that enables a multi-access Protocol Data Unit (PDU) Connectivity Service, which can exchange PDUs between the user equipment (UE) and data network (DN) by simultaneously using one 3GPP access network and one non-3GPP access network and two independent N3/N9 tunnels between the PDU Session Anchor (PSA) and the Radio Access Network/ Access Network (RAN/AN). This multi-access PDU Connectivity Service is realized by establishing a Multi-Access PDU (MA PDU) Session, i.e., a PDU Session that may have user-plan resources on two access networks. This optional ATSSS feature has been enhanced with additional capabilities in Rel-17 and Rel-18.

QUIC is a transport protocol that's an alternative to TCP. QUIC sits on top of UDP and uses TLS 1.3 for securing its payload. It was initially designed for HTTP use case but later evolved to accommodate a variety of use cases.

Rel-18 ATSSS enhancements included the introduction of a MultiPath QUIC (MPQUIC) functionality, which enables steering, switching, and splitting of User Datagram Protocol (UDP) traffic between the UE and User Plane Function (UPF), in accordance with the ATSSS policy created by the network. The operation of the MPQUIC functionality is based on RFC 9298 "proxying UDP in HTTP", which specifies how UDP traffic can be transferred between a client (UE) and a proxy (UPF) using the RFC 9114 HTTP/3 protocol. The HTTP/3 protocol operates on top of the QUIC protocol (RFC 9000, RFC 9001, RFC 9002), which supports simultaneous communication over multiple paths, as defined in draft-ietf-quic-multipath. RFC 9298 uses MASQUE connect methods, which allows tunneling explicit information through an HTTP server that acts as a proxy.

To support the ATSSS feature, the 5G System Architecture is extended as shown in TS 23.501, Figure 4.2.10-1 which is part of TS23.501 V18.02.01 clause 4.2.8.1. FIG. 1 is a drawing 100 illustrating 5G System Architecture for Non-roaming and Roaming with Local Breakout architecture for ATSSS support. Drawing 100 includes user equipment (UE) 102, 3GPP access network 104, non-3GPP access network 106, access and mobility management function (AMF) 108, session management function (SMF) 110, user plane function (UPF) 112, policy control function (PCF) 114 and data network (DN) 116 coupled together as shown. UE 102 includes MulitPath TCP (MPTCP) functionality 118, MPQUIC functionality 120, access traffic steering, switching and splitting—lower layer (ATSSS-LL) functionality 112 and Performance Measurement Functionality 124 (See, e.g., TS23.501 clause 4.2.10). UPF 112 includes MPTCP Proxy functionality 126, MPQUIC Proxy functionality 128, ATSSS-LL functionality 130 and PMF 134. Connection 136 is between UE 102 and 3GPP access network 104. N1 interface connection 138 connects UE 102 to AMF 108, via 3GPP access network 104. N2 interface connection 140 is between 3GPP access network 104 and AMF 108. N3 interface connection 142 is between 3GPP access network 104 and UPF 142. Connection 144 is between UE 102 and non-3GPP access network 106. N1 interface connection 146 connects UE 102 to AMF 108 via non-3GPP access network 106. N2 interface connection 148 is between non-3GPP access network 106 and AMF 108. N3 interface connection 150 is between non-3GPP access network 106 and UPF 112. N11 interface connection 152 connects AMF 108 to SMF 110. N4 interface connection 154 connects SMF 110 to UPF 112. N7 interface connection 156 connects SMF 110 to PCF 114. N6 interface connection 158 connects UPF 112 to data network (DN) 116.

Principles covered in TS 23.501 clause 4.2.8.1 General Concepts to Support Trusted and Untrusted Non-3GPP Access include:

The 5G Core Network supports connectivity of UEs via non-3GPP access networks, e.g., Wireless Local Area Network (WLAN) access networks The 5G Core Network supports both untrusted non-3GPP access networks and trusted non-3GPP access networks (TNANs)

An untrusted non-3GPP access network shall be connected to the 5G Core Network via a Non-3GPP InterWorking Function (N3IWF), whereas a trusted non-3GPP access network shall be connected to the 5G Core Network via a Trusted Non-3GPP Gateway Function (TNGF).

Both the N3IWF and the TNGF interface with the 5G Core Network Control Plane (CP) and User Plane (UP) functions via the N2 and N3 interfaces, respectively Architecture Reference Models for Trusted and Untrusted Non-3GPP Accesses will now be described.

FIG. 2 is a drawing 200 illustrating non-roaming architecture for 5G Core Network with untrusted non-3GPP access. Drawing 200 illustrates a Home Public Land Mobile Network (HPLMN) 201 coupled to non-GPP network(s) 203, a UE 202 and a data network 216. The HPLMN 201 includes a 3GPP access network 204, an AMF 210, a non-3GPP interworking function (N3IWF) 208, a SMF 212, and a UPF 214. UE 202 is coupled to 3GPP access network 204 via connection 218. N1 interface connection 220 connects UE 202 to AMF 210 via 3GPP access network 204. N2 interface connection 222 is between 3GPP access network 204 and AMF 210. N3 interface connection 224 is between 3GPP access network 204 and UPF 214. Y1 connection 226 is between UE 202 and untrusted non-3GPP access network 206. N1 interface connection 228 connects UE 202 to AMF 210 via untrusted 3GPP access network 206 and N3IWF 208. NWu connection 230 connects UE 202 to N3IWF 208 via untrusted non-3GPP access network 206. Y2 connection 232 is between untrusted 3GPP access network 206 and N3IWF 208. N2 interface connection 234 is between N3IWF 208 and AMF 210. N3 interface connection 236 is between N3IWF 208 and UPF 214. N11 interface connection 238 is between AMF 210 and SMF 212. N4 interface connection 240 is between SMF 212 and UPF 214. N6 interface connection 242 is between UPF 214 and data network 216.

FIG. 3 is a drawing 300 illustrating non-roaming architecture for 5G Core Network with trusted non-3GPP access. Drawing 300 illustrates a Home Public Land Mobile Network (HPLMN) 301, a UE 302 and a data network 314. The HPLMN 301 includes a 3GPP access network 304, a trusted non-3GPP access network (TNAN) 306, an AMF 308, a SMF 310, and a UPF 312. The TNAN 306 includes a trusted non-3GPP access point (TNAP) coupled to a trusted non-3GPP gateway function (TNGF) 318. UE 302 is coupled to 3GPP access network 304 via connection 320. N1 interface connection 322 connects UE 302 to AMF 308 via 3GPP access network 304. N2 interface connection 334 is between 3GPP access network 304 and AMF 308. N3 interface connection 326 is between 3GPP access network 304 and UPF 312. Yt connection 328 is between UE 302 and TNAP 316. N1 interface connection 330 connects UE 302 to AMF 308 via trusted 3GPP access network 306. NWt connection 332 connects UE 302 to TNGF 318 via TNAP 316. Ta connection 334 is between TNAP 316 and TNGF 318. Tn connection 336 is between a first portion of TNGF 318 and a second portion of TNGF 318. N2 interface connection 338 is between TNGF 318 and AMF 308. N3 interface connection 340 is between TNGF 318 and UPF 312. N11 interface connection 342 is between AMF 308 and SMF 310. N4 interface connection 344 is between SMF 310 and UPF 312. N6 interface connection 346 is between UPF 312 and data network 314.

For 3GPP Rel-19, several proposals were presented at the Service & Systems Aspects (SA) Rel-19 Workshop in June 2023 resulting in a set of initial Work Tasks (WTs) for moderated discussion. A moderated discussion WT related to a Streamlined (or Lightweight) Access Traffic Steering, Switching and Splitting (ATSSS) support in the 5G system architecture was proposed, which involves studying solutions that is not based on current TNGF/N3IWF and to define a solution that optimizes deployment scenarios over non-3GPP access.

Additional developments in 3GPP R19 System Architecture Working Group 2 are described below.

The following ATSSS phase 4 related work tasks have been initiated:

WT-A-1 (SWS-230073-Apple) (SWS-230036) Study how the MPQUIC steering functionality can be extended to be able to steer, switch, and split non-UDP traffic (TCP, IP, Ethernet traffic).

WT-A-2A (SWS-230073-Apple) Study how to relax the mandatory use of IPSec tunnel encapsulation on the untrusted non-3GPP access for the MPQUIC steering functionality, investigate new architectural options for ATSSS, if necessary.

WT-A-2B (SWS-230012-QCOM) (SWS-230035-Samsung) Define a new architecture for Lightweight Access Aggregation and Steering of non-integrated Wi-Fi in 5GC not based on TNGF/N3IWF. Introduce the concept of Non-Integrated Aggregated (NIA) PDU Session based on the re-use of IETF RFC protocols (e.g., MPQUIC/MPTCP) and related functions in the UE and in the PSA UPF How to establish and modify NIA PDU Sessions How to extend the usage of rules for UE and UPF to coordinate the aggregation and steering of traffic within a NIA PDU Session, including how to configure the MPTCP/MPQUIC proxy functionality in the UPF.

It is assumed that the Lightweight Access Aggregation and Steering functionality applies to non-GBR traffic type only.

WT-A-2C (SWS-230057-Charter) Study an ATSSS-like solution between one 3GPP access and one WLAN. Since the first release of 5GS, untrusted/trusted WLAN (i.e., N3IWF and TNGF) have not been fully commercially deployed that also prevents adoption of 5GS capabilities like ATSSS. A 'lightweight' ATSSS-like capabilities between one 3GPP and one WLAN can be beneficial for the ecosystem until (un)trusted access nodes become widely available.

MASQUE (Multiplexed Application Substrate over QUIC Encryption) was introduced in 3GPP R18 as part of ATSSS higher layer steering functionality called MPQUIC Functionality (See, e.g., TS 23.501 clause 5.32.6.2.2) for UDP traffic. CONNECT-UDP and CONNECT-IP was developed by the IETF MASQUE working group.

The primary goal of the IETF MASQUE working group is to develop mechanism(s) that allow configuring and concurrently running multiple proxied stream- and datagram-based flows inside an HTTP connection. The IETF MASQUE group has specified CONNECT-UDP and CONNECT-IP, collectively known as MASQUE, to enable this functionality.

MASQUE leverages the HTTP request/response semantics, multiplexes flows over streams, uses a unified congestion controller, encrypts flow metadata, and enables unreliable delivery suitable for UDP and IP-based applications.

Exercising the extension points defined by CONNECT-UDP and CONNECT-IP helps to make it easier to support new use cases or accommodate changes in the environment in which these protocols are deployed.

Public Documents which are hereby expressly incorporated by reference in their entirety include:

RFC9297 HTTP Datagrams and the Capsule Protocol can be accessed via (https://datatracker.ietf.org/doc/rfc9297/):

Proposed standard RFC9297 (August 2022) Proxying UDP in HTTP can be accessed via (https://datatracker.ietf.org/doc/rfc9298/)

Proposed standard RFC9298 (August 2022) Proxying IP in HTTP can be accessed via (https://datatracker.ietf.org/doc/draft-ietf-masque-connect-ip/) was Submitted to IESG for Publication, Apr. 28, 2023

Proxying Ethernet in HTTP can be accessed via (https://datatracker.ietf.org/doc/draft-asedeno-masque-connect-ethernet/) I-D Exists, May 1, 2023

Proxying enables endpoints to communicate when end-to-end connectivity is not possible or to apply additional encryption where desirable.

Problems with existing standards remain. Problems which remain to be address includer the fact that ATSSS requires gateway functions on the non-3GPP access such as an TNGF and N3IWF to function properly. Reference architectures utilizing TNGF and N3IWF can be found in TS23.501 V18.02.01 clause 4.2.8.2 Figures 4.2.8.2.1-1 & 4.2.8.2.1-2. TNGF and N3IWF commercial deployments are very limited, which impedes the support and adoption of ATSSS in the UE and the network.

In addition, 3GPP modem device manufacturers have concerns of sharing their control plane software (SW) (i.e., Non-Access Stratum (NAS) logic) on top of a non-3GPP modem (i.e., 802.11) that is supplied by another device manufacturer. It has been suggested/proposed to define an ATSSS light solution that alleviates the need for Wi-Fi to handle control plane (NAS, N1/N2) signaling procedures.

In view of the above discussion, there is a need for new methods and apparatus for supporting non-3GPP access which facilitate ATSSS.

SUMMARY

A QUIC connection is established between a user equipment (UE) and a TNGF to support trusted non-3GPP access which facilitates ATSSS. An exemplary TGNF, implemented in accordance with features of the present invention, implements MASQUE over QUIC. In some embodiments, QUIC connection IDs are used to delineate control plane (CP) traffic and user plane traffic being communicated over the established QUIC connection. In other embodiments, a new 3GPP Payload type header is used to delineate between control plane (CP) traffic and user plane traffic communicated over the established QUIC connection.

An exemplary method of operating a Trusted Non-3GPP Gateway Function (TNGF) to support user equipment (UE) communications, in accordance with various exemplary embodiments, comprises: performing a QUIC connection setup with a first UE to establish a first QUIC connection between the first UE and the TNGF; and communicating authentication request and response messages via the first QUIC connection between the first UE and the TNGF as part of a UE registration procedure.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 13 comprises the combination of FIG. 13A and FIG. 13B.

FIG. 24 comprises the combination of FIG. 24A and FIG. 24B.

FIG. 25 comprises the combination of FIG. 25A, FIG. 25B and FIG. 25C.

DETAILED DESCRIPTION

Various solutions to the above-described problem, in accordance with various embodiments of the present invention, will now be described.

Two broad types (or classes) of solutions are envisioned:

Those which modify a non-3GPP core network interfacing device, N3IWF or TNGF, to lower the entry-bar for ATSSS realization.

Embodiment #1, Embodiment #2, & Embodiment #3 depict potential realizations of this solution class.

Embodiment #4 depicts one potential realization which eliminates the N3IWF.

Solutions belonging to type-B may result in certain disadvantages such as removal of topology hiding and access-core network separation.

Figure 1:
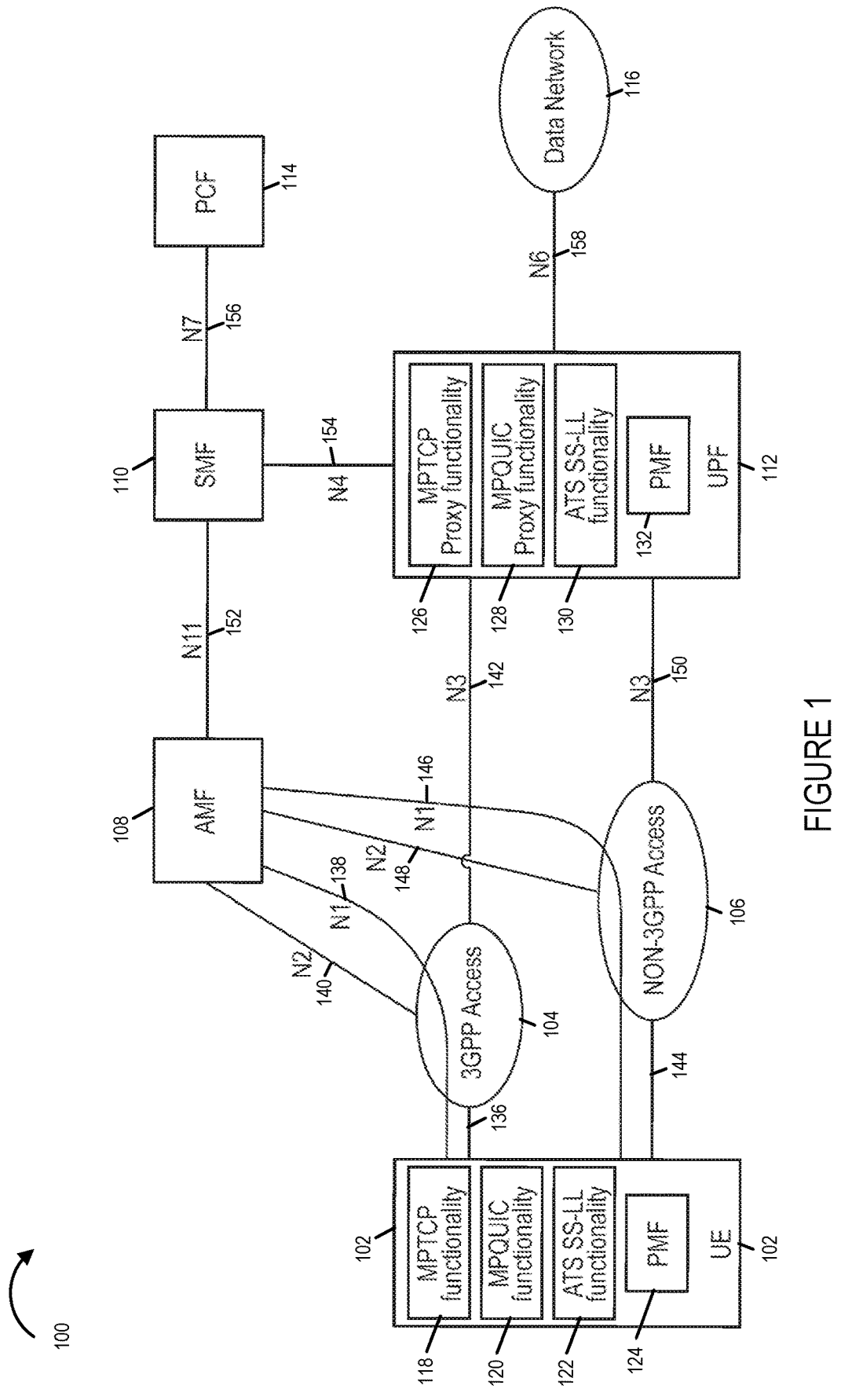
FIG. 1 is a drawing illustrating 5G System Architecture for Non-roaming and Roaming with Local Breakout architecture for ATSSS support.
Figure 2:
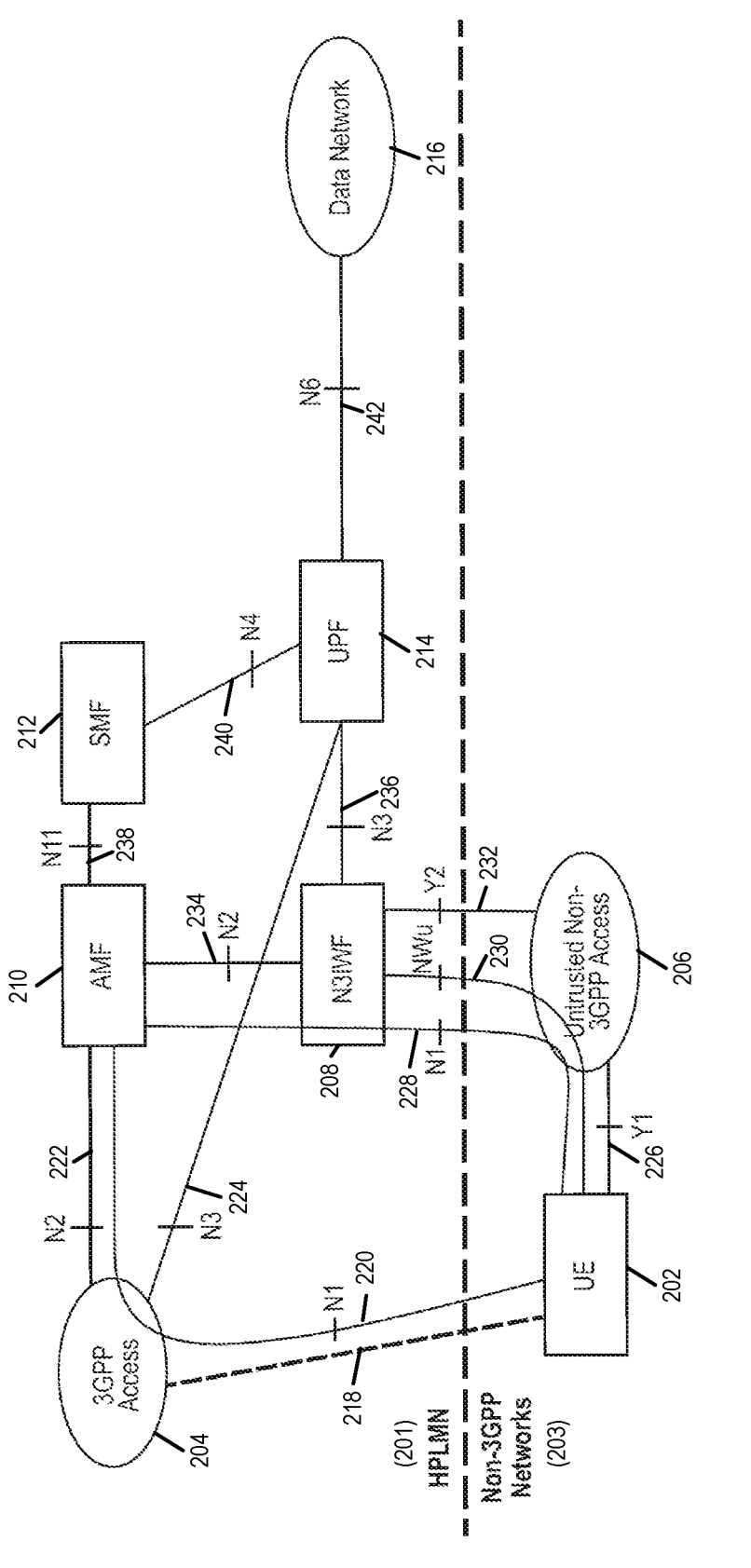
FIG. 2 is a drawing illustrating non-roaming architecture for 5G Core Network with untrusted non-3GPP access.
Figure 3:
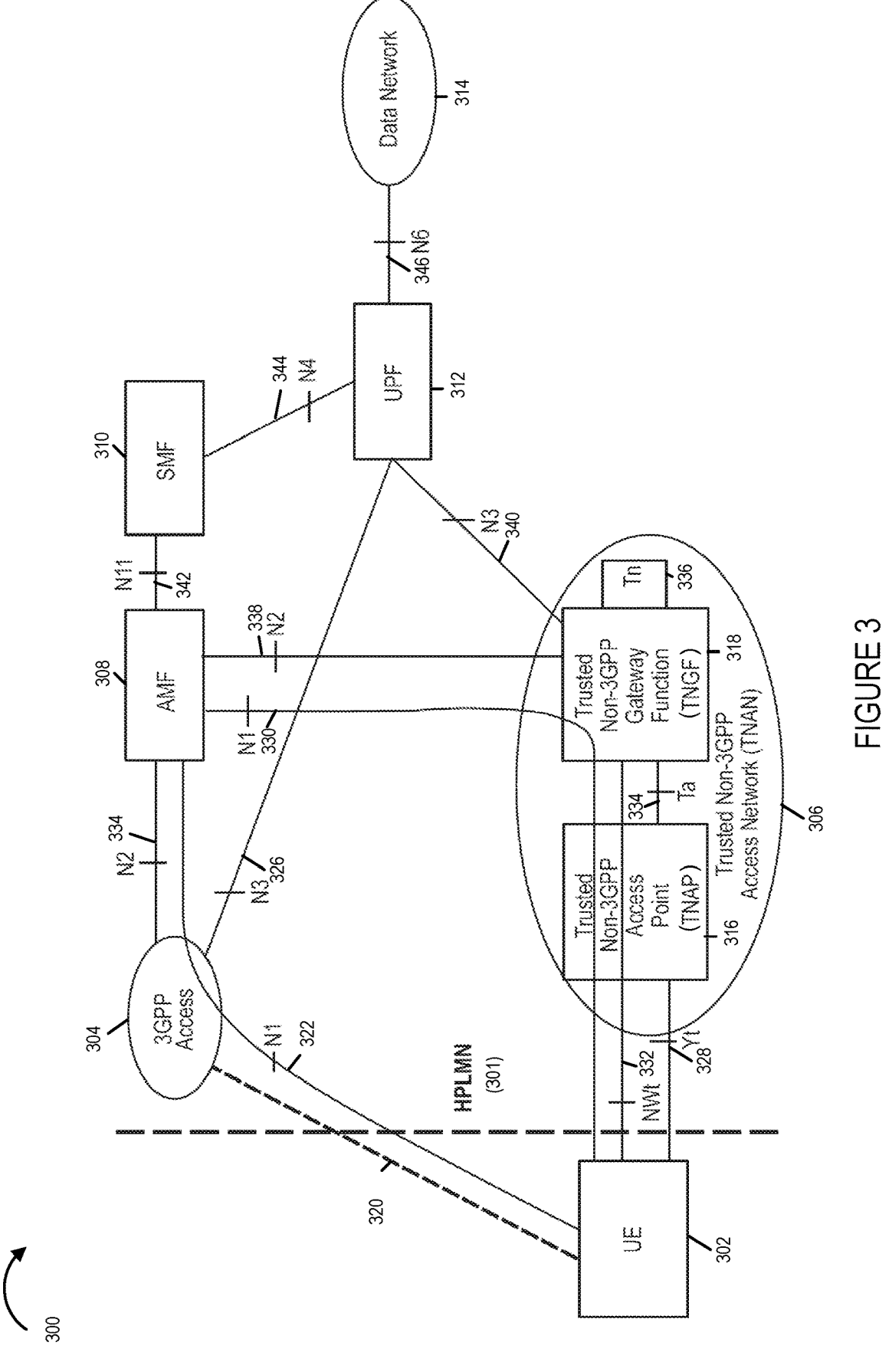
FIG. 3 is a drawing illustrating non-roaming architecture for 5G Core Network with trusted non-3GPP access.
Figure 4:
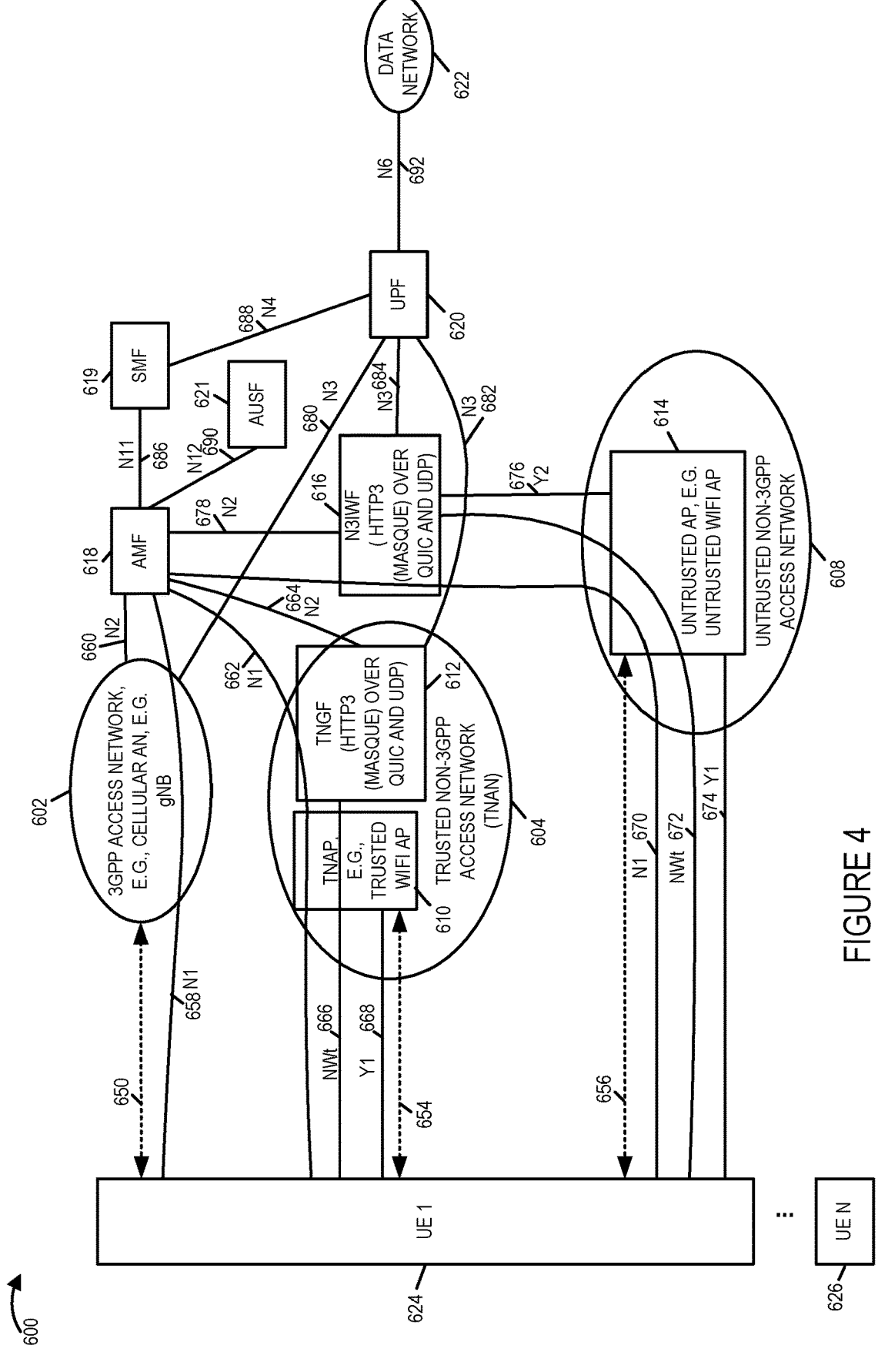
FIG. 4 is a drawing of an exemplary communications system in accordance with an exemplary embodiment.

FIG. 4 is a drawing of an exemplary communications system 600 in accordance with an exemplary embodiment. Exemplary communications system 600 includes 3GPP access network (AN) 602, e.g., a cellular AN, e.g., a gNB base station, a Trusted Non-3GPP access network (TNAN) 604, an untrusted non-3GPP access network 608, a Non-3GPP Interworking Function (N3IWF) 616, a plurality of 5G core network functions including an access and mobility management function (AMF) 618, a session management function (SMF) 619, a user plane function (UPF) 620, e.g., a protocol session anchor (PSA) UPF, and an authentication server function (AUSF) 612. Communications system 600 further includes a plurality of user equipments (UEs) (UE 1 624, . . . , UE N 626), and data network 622.

TNAN 604 includes a Trusted Non-3GPP Access Point (TNAP) 610, e.g., a trusted WiFi AP, and a Trusted Non-3GPP Gateway Function (TNGF) 612 coupled together. TNGF 612, in accordance with various exemplary embodiments of the present invention, supports HTTP/3 (MASQUE) over QUIC and UDP. The untrusted non-3GPP access network (AN) 608 includes untrusted AP 614, e.g., an untrusted WiFi AP. The N3IWF 616 in accordance with various exemplary embodiments of the present invention, supports HTTP/3 (MASQUE) over QUIC and UDP. The UEs, e.g., UE 1 624, in accordance with various exemplary embodiments of the present invention, supports HTTP/3 (MASQUE) over QUIC and UDP.

UE 1 624 can be, and sometimes is, coupled to 3GPP access network 602 via wireless connection 650. UE 1 624 can be, and sometimes is, coupled to TNAP 610 via wireless connection 654. UE 1 624 can be, and sometimes is, coupled to untrusted AP 614 via wireless connection 656.

N1 interface connection 658 (via 3GPP AN 602) is between UE 1 624 and AMF 618. N2 interface connection 660 is between 3GPP AN 602 and AMF 618. N1 interface connection 662 (via TNAP 610 and TNGF 612) is between UE 1 624 and AMF 618. N2 interface connection 664 is between TNGF 612 and AMF 618. NWt interface connection 666 is between UE 1 624 and TNGF 612. Y1 interface connection 668 is between UE 1 624 and TNAP 610. N1 interface connection 670 (via untrusted AP 614 and N3IWF 616) is between UE 1 624 and AMF 618. NWt interface connection 672 (via untrusted AP 614) is between UE 1 624 and N3IWF 616. Y1 interface connection 674 is between UE 1 624 and untrusted AP 614. Y2 interface connection 676 is between untrusted AP 614 and N3IWF 616. N2 interface connection 678 is between N3IWF 616 and AMF 618. N3 interface connection 680 is between 3GPP AN 602 and UPF 620. N3 interface connection 682 is between TNGF 612 and UPF 620. N3 interface connection 684 is between N3IWF 616 and UPF 620. N11 interface connection 686 is between AMF 616 and SMF 619. N4 interface connection 688 is between SMF 619 and UPF 620. N12 interface connection 690 is between AMF 618 and AUSF 621. N6 interface connection 692 is between UPF 620 and data network 622.

In some embodiments (e.g., Embodiment 1 and Embodiment #2) a QUIC connection is established between UE 1 624 and N3IWF 616. In some embodiments (e.g., Embodiment #3), a QUIC connection is established between UE 1 624 and TNGF 612. In some embodiments (e.g., Embodiment #4) a QUIC connection is established between UE 1 624 and AMF 618.

Figure 5:
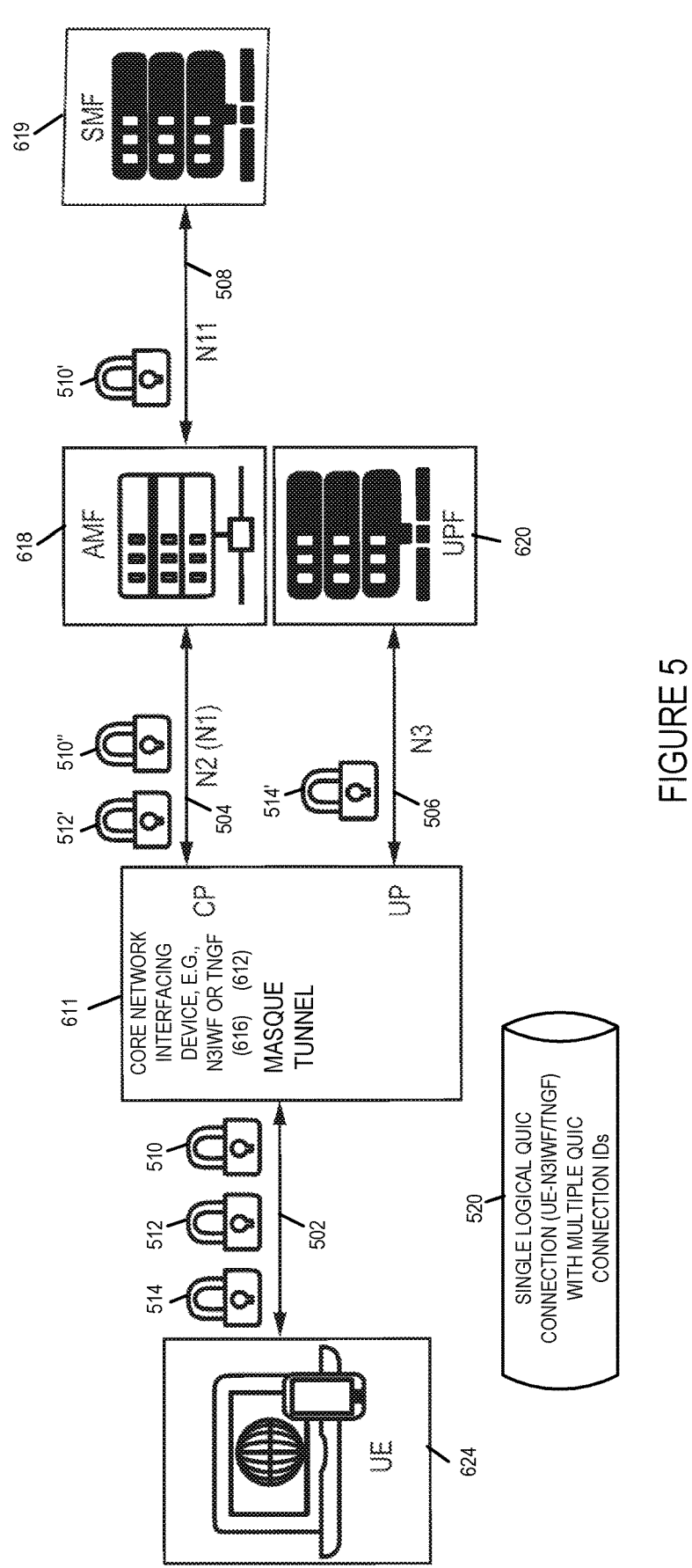
FIG. 5 is an illustration of how a UE might manage one logical QUIC connection to a core network interfacing device, e.g., a N3IWF or a TNGF, implemented in accordance with the present invention, (i.e., with HTTP/3 & QUIC support within N3IWF or TNGF).

FIG. 5 is a drawing 500 including an exemplary UE 624, implemented in accordance with the present invention, an exemplary core network interfacing device 611, implemented in accordance with the present invention, AMF 618 and SMF 619 coupled together. The exemplary core network interfacing device 611 is, e.g., N3IWF 616 or TNGF 612, which supports HTTP/3 (MASQUE) over QUIC, and there is a MASQUE tunnel established between the core network interfacing device 611 and UE 624, via which QUIC communications 502 are communicated. An exemplary QUIC communications signal includes a QUIC connection ID, and encrypted control signaling. Another exemplary QUIC communications signal includes a QUIC connection ID and encrypted N3 traffic data signaling. N2(N1) signaling 504 is communicated between core network interfacing device 611 and AMF 618. A control plane interface of the core network interfacing device 611 is coupled to the AMF 618. A user plane (UP) interface of the core network interfacing device 611 is coupled to UPF 620. N3 signaling is communicated between core network interfacing device 611 and UPF 620. N11 signaling 508 is communicated between AMF 618 and SMF 619.

FIG. 5 is an illustration 500 of how a UE 624 manages one logical QUIC connection 520 to a core network interfacing device 611, e.g., N3IWF 616 or TNGF TNGF 612, implemented in accordance with and exemplary embodiment of the present invention, (i.e., with HTTP/3 & QUIC support within N3IWF 616 or TNGF 612) identified by QUIC Connection IDs within a single peer-to-peer QUIC connection. All the logical QUIC connections share a common Transport Layer Security (TLS) based security association. First, a QUIC connection between UE 624 and the core network interfacing device 611 (e.g., N3IWF/TNGF (616/ 612)) using a pre-defined Connection ID range to allow routing control plane (CP) information to the Access and Mobility management Function (AMF) 618 and Session Management Function (SMF) 619. Second, an independent pre-defined Connection ID range to allow routing user plane (UP) information to the User Plane Function (UPF) 620.

First set of locks (510, 510', 510") are used to illustrate a first secure path between UE 624 and SMF 619. Second set of locks (512, 512') are used to illustrate a second secure path between UE 624 and AMF 618. Third set of locks (514, 514') are used to illustrate a third secure path between UE 624 and UPF 620.

Figure 6:
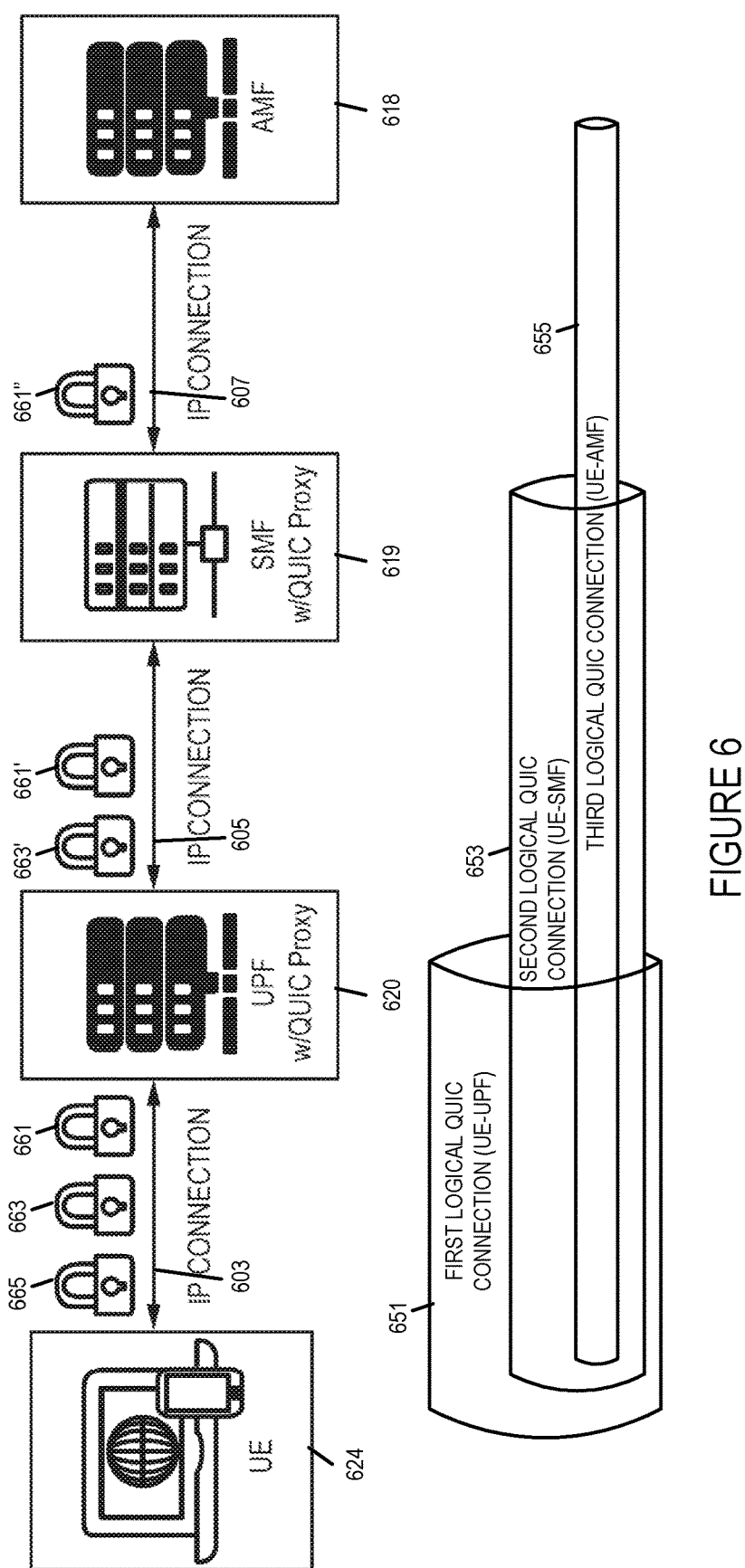
FIG. 6 is an illustration of how a UE might manage at least three logical QUIC connections identified by QUIC Connection IDs within a single peer-to-peer QUIC connection.

FIG. 6 is a drawing 550 including an exemplary UE 624, an exemplary UPF 620, an exemplary SMF 619 and an exemplary AMF 618, coupled together. IP connection 603 exists between UE 624 and UPF 620. IP connection 605 exists between UPF 620 and SMF 619. IP connection 607 exists between SMF 619 and AMF 620.

FIG. 6 is an illustration 550 of how a UE 624 might manage at least three logical QUIC connections identified by QUIC Connection IDs within a single peer-to-peer QUIC connection. All the logical QUIC connections share a common TLS based security association. First, a QUIC connection 651 between UE 624 and UPF 620 (i.e., HTTP/3 & QUIC support including QUIC proxy functionality within UPF). Second, a QUIC connection 653 between UE 624 and SMF 619 (i.e., HTTP/3 & QUIC support including QUIC proxy functionality within SMF), which runs via a CONNECT tunnel in the first connection 651. Third, an end-to-end byte stream 655 between UE 624 and AMF 618 (i.e., HTTP/3 & QUIC support within AMF 618), which runs via a CONNECT tunnel in the second connection 653. An actual NAS (i.e., N1/N2) connection only exists between SMF 619 and AMF 618. In this deployment scenario, note that each 5GC entity requires HTTP/3 & QUIC support including QUIC proxy functionality and exposes 5GC topology to the UE 624 (i.e., requiring the ability for the UE to address 5GC entities). Reachability between UE 624 and SMF 619, UE 624 and AMF 618 are facilitated by the QUIC proxy functionality in UPF 620 and SMF 619 respectively.

First set of locks (661, 661', 661") are used to illustrate a first secure path between UE 624 and AMF 618. Second set of locks (663, 663") are used to illustrate a second secure path between UE 624 and SMF 619. Third set of locks (665') is used to illustrate a third secure path between UE 624 and UPF 620.

In QUIC, a single logical connection can have more than one Connection ID. Hence, when employing a QUIC-based architecture as proposed in each of the presented exemplary embodiments (e.g., Embodiment #1, Embodiment #2, Embodiment 3, or Embodiment #4), two different alternative realizations, which are presented as alternative approaches to distinguishing between control plane signaling and data plane signaling, can be, and sometimes are, implemented.

Figure 7:
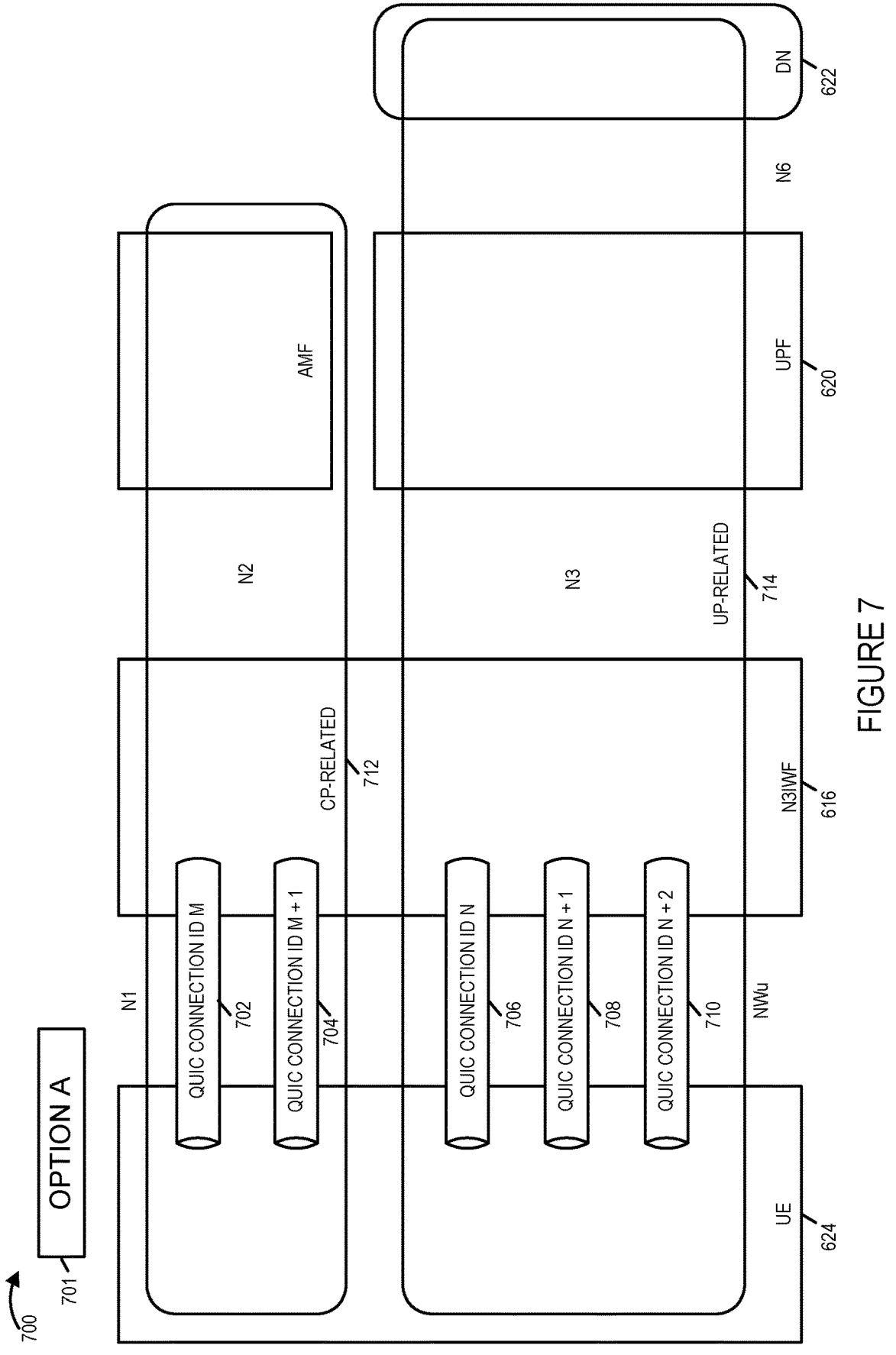
FIG. 7 is a drawing illustrating a first realization (option A), for a single logical QUIC connection having more than one QUIC connection IDs, in which different sets of QUIC connection ID values correspond to control plane (CP) signaling and user plane (UP) signaling.

FIG. 7 is a drawing 700 illustrating a first realization (option A), as indicated by label 701, for a single logical QUIC connection having more than one QUIC connection IDs. Drawing 700 illustrates UE 624, N3IWF 616, UPF 620, and DN 622 of system 600 of FIG. 4. In this example, there is a single QUIC connection, which is established between UE 624 and N3IWF 616. The single QUIC connection carries both control plane (CP) related signaling 712 and user plane (UP related signaling 714). A first set of connection IDs (QUIC connection ID M 702, QUIC connection ID M+1 704) are used for the control plane related signaling, e.g., NAS control messages. A second set of connection IDs (QUIC connection ID N 706, QUIC connection ID N+1 708, QUIC connection ID N+2 710) are used for the user plane (UP) related signaling, e.g., user traffic payload.

Each significant communication leg, e.g., control plane carrying NAS (N1/N2) signaling, PDU Session #1, PDU Session #2 etc. uses its own set of Connection IDs. Whilst not depicted explicitly, each significant communication leg e.g., PDU Session #1 may also employ multiple Connection IDs based on criteria such as Quality of Service Flow Identifiers (QFIs).

Figure 8:
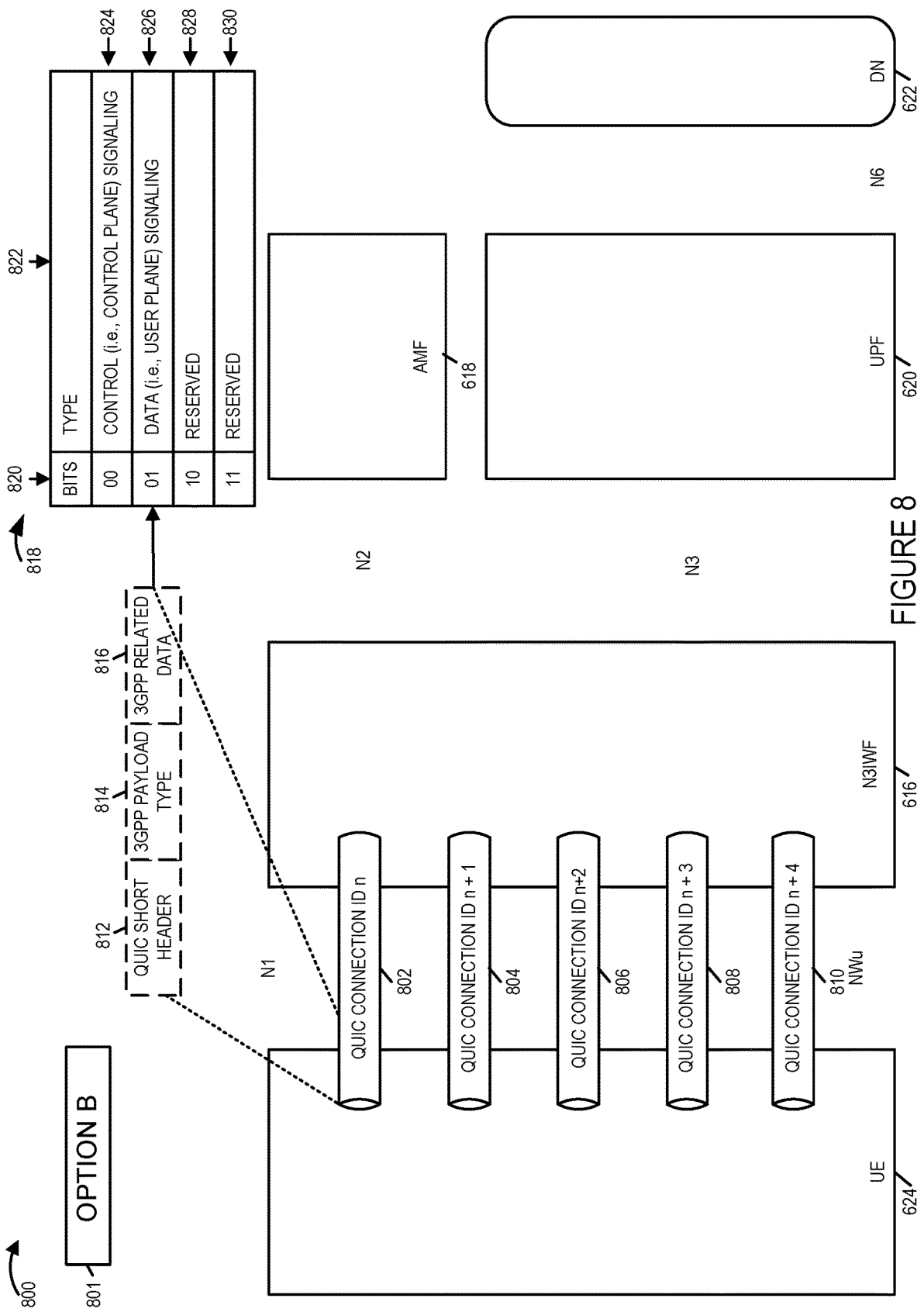
FIG. 8 is a drawing illustrating a second realization (option B), for a single logical QUIC connection having more than one QUIC connection IDs, in which a 3GPP payload type field (e.g., 2 bit field) is included and used in a QUIC communications header to distinguish between different types of traffic, e.g., control plane signaling and user plane data signaling.

FIG. 8 is a drawing 800 illustrating a second realization (option B), as indicated by label 801, for a single logical QUIC connection having more than one QUIC connection IDs (QUIC connection ID n 802, QUIC connection ID n+1 804, QUIC connection ID n+2 806, QUIC connection ID n+3 808, QUIC connection ID n+4 812. Drawing 800 illustrates UE 624, N3IWF 616, UPF 620, and DN 622 of system 600 of FIG. 4. In this example, there is a single QUIC connection, which is established between UE 624 and N3IWF 616. The single QUIC connection carries both control plane (CP) related signaling and user plane. In this exemplary embodiment, the value of the connection ID is not indicative of the type of payload (control plane related signaling or user plane related signaling) being communicated. In this exemplary approach (option B), a 3GPP payload type field 814 is included in a QUIC communication, which includes: i) a QUIC short header 812, a 3GPP payload type 814, and 3GPP related data 816. Table 818 includes bits column 820 and type information column 822. Row 824 indicates that a bit pattern=00 in the 3GPP payload type field 814 indicates control signaling is being communicated in the 3GPP related data field 816 of the QUIC communication. Row 826 indicates that a bit pattern=01 in the 3GPP payload type field 814 indicates user data signaling is being communicated in the 3GPP related data field 816 of the QUIC communication. Row 828 indicates that a bit pattern=10 in the 3GPP payload type field 814 is reserved, e.g., and available for a future configuration assignment. Row 830 indicates that a bit pattern=11 in the 3GPP payload type field 814 is reserved, e.g., and available for a future configuration assignment.

Significant communications e.g., control plane carrying NAS (N1/N2) signaling, PDU Session #1, PDU Session #2 etc. use a single connection indicated by a set of Connection IDs. Whilst resource efficient, this would require an additional "application-level" header to allow UE and N3IWF to distinguish the appropriate treatment to be provided to the type of data being carried in the QUIC payload. A 2-bit header called '3GPP payload type' with following values is implemented:

00—Control (i.e., control plane) signaling

01—Data (i.e., user plane) signaling

10—Reserved

11—Reserved

Thus, for each exemplary embodiment (in the set of embodiments (Embodiment 1, Embodiment 2, Embodiment 3, and Embodiment 4) listed below, in accordance with the present invention, two independent mechanisms can be utilized for distinguishing the communication of CP information (i.e., intended for AMF/SMF) or UP information (i.e., intended for UPF) signaling. Each embodiment utilizes each option independently as described above.

In summary, various solutions in each embodiment discussed herein leverage QUIC connections to transport explicit information as follows:

Embodiment 1 modifies N3IWF to implement MASQUE over QUIC leaving EAP-5G as is.

Solution A uses QUIC Connection IDs to delineate CP and UP traffic.

Solution B uses a new defined 2-bit header called "3GPP Payload type" to delineate CP and UP traffic.

Embodiment 2 modifies N3IWF to implement MASQUE over QUIC replacing EAP-5G with GRE as the transport for NAS.

Solution A uses QUIC Connection IDs to delineate CP and UP traffic.

Solution B uses a new defined 2-bit header called "3GPP Payload type" to delineate CP and UP traffic.

Embodiment 3 modifies TNGF to implement MASQUE over QUIC

Solution A uses QUIC Connection IDs to delineate CP and UP traffic.

Solution B uses a new defined 2-bit header called "3GPP Payload type" to delineate CP and UP traffic.

Embodiment 4 Removes N3IWF and implements MASQUE over QUIC to transport explicit information to AMF and UPF Solution A uses QUIC Connection IDs to delineate CP and UP traffic.

Solution B uses a new defined 2-bit header called "3GPP Payload type" to delineate CP and UP traffic.

Embodiment #1, is an embodiment in which both the N3IWF (e.g., N3IWF 616) and the UE (e.g., UE 624) implement MASQUE over QUIC (MASQUE o/QUIC) leaving EAP-5G as is, will now be described.

In this non-exclusive implementation of type-A solutions, transport protocol stacks for control-plane (CP) and user-plane (UP) implementation are replaced with HTTP/3 and MASQUE over QUIC. NAS encapsulation via EAP-5G is left as-is.

In up to 3GPP Rel-18 architecture, IKEv2 is used to establish a secure CP between UE and N3IWF connection via IPSec. The security credentials used to establish IPSec SAs are tied into EAP-5G protocol between UE and the Network (N3IWF, AMF, AUSF) (See, e.g., 3GPP TS 23.502 clause 4.12.2). Upon establishment of a secure transport link (secured via IPSec SAs per above), NAS signaling can be tunneled between UE and AMF via N3IWF.

In (and up to) 3GPP Rel-18, each PDU session receives its own pair of IPSec SAs (see, e.g., 3GPP TS 23.502 V18.3.0 (2023 September) clause 4.12.5) which is different to the IPSec SAs used to carry N1-/N2-signaling.

Embodiment #1 will now be described with regard to control plane (CP) traffic.

Embodiment #1 Initial Establishment will now be described.

The use of IKEv2+IPSec (used in Prior Art implementations) is replaced by the use of QUIC, which provides built-in transport layer security. The credentials used to establish QUIC connection between UE and N3IWF can either be UICC-based or certificates (see, e.g., 3GPP TS 33.501 V18.3.0 which discusses use of certificates).

In the case of a Universal Integrated Circuit Card (UICC)-based approach, a new Key Derivation Function (KDF) will be implemented which can take AKA derivative keys (as received from AUSF, AMF) and modify QUIC's TLS security layer to ingest the keys.

In case of the certificate approach, any of the following multiple alternative solutions can be used to get the certificates (to be used for QUIC authentication) to the UE and N3IWF.

In one approach the PLMN operator issues a client-certificate to each UE and N3IWF using many of the existing X.509 certificate creation and distributions mechanism (e.g., via provisioning OA&M).

In another approach, a protocol such as Automatic Certificate Management Environment (ACME) is employed to get the certificates (see IETF RFC 8555).

Figure 9:
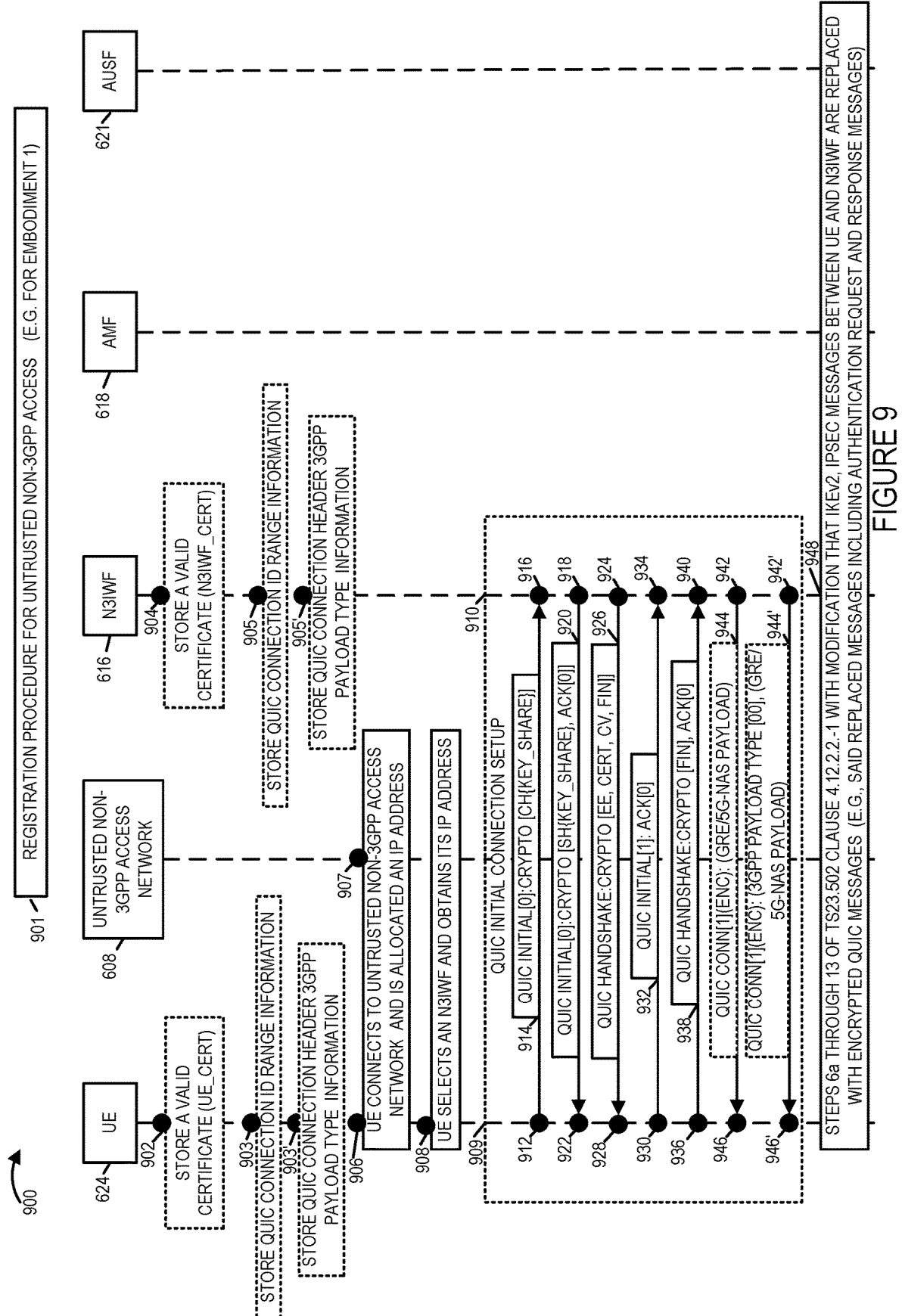
FIG. 9 is a drawing which illustrates an exemplary registration procedure for untrusted non-3GPP access in accordance with an exemplary embodiment (e.g., Embodiment #1) of the present invention.

FIG. 9 illustrates an example of linking the credentialing process with AKA (used in the prior art) to the that of QUIC used in Embodiment #1.

UICC-credentials (via EAP-5G) or certificate (via EAP-TLS or EAP-TTLS) over MASQUE are carried in Embodiment #1, instead of over IKEv2 (as used in prior art) when executing authentication and authorization procedure between UE and Core Network (N3IWF, AMF, AUSF).

The signal flow diagram 900 of FIG. 9 illustrates how the initial QUIC connection between the UE (e.g., UE 624) and N3IWF (e.g., N3IWF 616) is setup and then existing registration procedures are leveraged with the modification that IKEv2 and IPsec messages (used in prior art implementations) between UE and N3IWF are replaced with QUIC messages (used in the new Embodiment #1 implementation).

FIG. 9 is a drawing 900 which illustrates an exemplary registration procedure for untrusted non-3GPP access in accordance with an exemplary embodiment (e.g., Embodiment #1) of the present invention. Drawing 900 is a modified version of Figure 4.12.2.1-1 of TS23.502, said modified version supporting encrypted QUIC messages. Drawing 900 includes UE 624, untrusted non-3GPP access network 608, N3IWF 616, AMF 618 and AUSF 621 and further includes signaling between various elements and operations performed by various elements, as part of the registration procedure.

In step 902 UE 624 stores a valid certificate (UE_cert). The stored UE certificate supports QUIC connection setup. In step 904, N3IWF 616 stores a valid certificate (N3IWF_cert). The stored N3IWF certificate supports QUIC connection setup. In some embodiments, the procedure includes steps 903 and 905. In other embodiments, the procedure includes steps 903' and 905'.

In step 903 UE 624 stores QUIC connection ID range information. In step 905 N3IWF 616 stores QUIC connection ID range information. In some embodiments, said stored QUIC connection ID range information includes: i) a first range of QUIC connection ID values corresponding to control plane interface signaling, ii) a second range of QUIC connection ID values corresponding to user plane interface signaling.

In some embodiments, said steps (903 and 905) of storing connection ID range information includes storing information indicating subsets of QUIC connection ID values corresponding to user plane traffic, different subsets of QUIC connection ID values corresponding to different types of user plane traffic and/or user plane traffic corresponding to different QoS levels.

In some embodiments, said QUIC connection ID range information is preconfigured in the N3IWF 616 (and the first UE 624). In some embodiments, said QUIC connection ID range information is communicated to N3IWF 616 (and to the UE 624) from a control device in the core network (and wherein the connection ID range values can be changed by the control device).

In step 903' the UE 624 stores QUIC connection header 3GPP payload type information. In step 905' the N3IWF 616 stores QUIC connection header 3GPP payload type information. In some embodiments said steps of storing (903' and 905') QUIC connection header 3GPP payload type information includes storing QUIC connection header payload type (e.g., 3GPP payload) identifiers including: i) a first payload type identifier (e.g., value of 00) corresponding to N2(N1) interface (control plane) signaling, ii) a second payload type identifier (e.g., value of 01) corresponding to N3 interface (user plane data) traffic. In some embodiments, said QUIC connection header payload type identifiers are preconfigured in the N3IWF (and the first UE). In some embodiments, said QUIC connection header payload type identifiers are communicated to the N3IWF 616 (and the UE 624) from a control device in the network core (and wherein said QUIC connection header payload type identifiers can be changed by the control device).

In step 906 the UE 624 performs operations to connect to the untrusted non-3GPP access network 608 and obtains, e.g., receives, an allocated IP address. In step 907 the untrusted non-3GPP access network 608: i) performs operations to facilitate the UE 624 to connect with the untrusted non-3GPP access network 608, ii) allocates an IP address to UE 624, and sends the allocated IP address to UE 624.

In step 908 UE 624 selects a N3IWF, e.g., N3IWF 616, and obtains its IP address. In steps 909 and 910, the UE 624 and N3IWF 616 perform a QUIC initial connection setup procedure. In step 912 UE 624 generates and sends QUIC Initial[0]: CRYPTO [CH{key_share}] signal 914 to N3IWF 616, which receives signal 914 in step 916 and recovers the communicated information. In step 918 the N3IWF 616 generates and sends QUIC Initial[0]: CRYPTO [SH{key_share}, ACK[0]] signal 920 to UE 624, which receives signal 920 in step 922 and recovers the communicated information. In step 924 the N3IWF 616 generates and sends Handshake: CRYPTO [EE, CERT, CV, FIN] signal 926 to UE 624, which receives signal 926 in step 928 and recovers the communicated information. In step 930 UE 624 generates and sends QUIC Initial[1]: ACK[0] signal 932 to N3IWF 616, which receives signal 932 in step 934 and recovers the communicated information. In step 936 UE 624 generates and sends QUIC Handshake: CRYPTO [FIN], ACK[0] signal 938 to N3IWF 616, which receives signal 938 in step 940 and recovers the communicated information. In some embodiments, in step 942 the N3IWF 616 generates and sends QUIC CONN[1](Enc): (GRE/5G-NAS payload) signal 944 to UE 624, which receives signal 944 in step 946 and recovers the communicated information. In some other embodiments, in step 942' the N3IWF 616 generates and sends QUIC CONN[1](Enc): (3GPP payload type [00], (GRE/5G-NAS payload)) signal 944' to UE 624, which receives signal 944 in step 946 and recovers the communicated information.

In step 948 the various elements (624, 608, 616, 619, 621) perform operations in accordance with steps 6a through 13 of TS 23.502 clause 4.12.2.2-1 with modification that IKEv2, IPsec messages between UE and N3IWF are replaced with encrypted QUIC messages (e.g., said replaced messages including authentication request and response messages).

Figure 10:
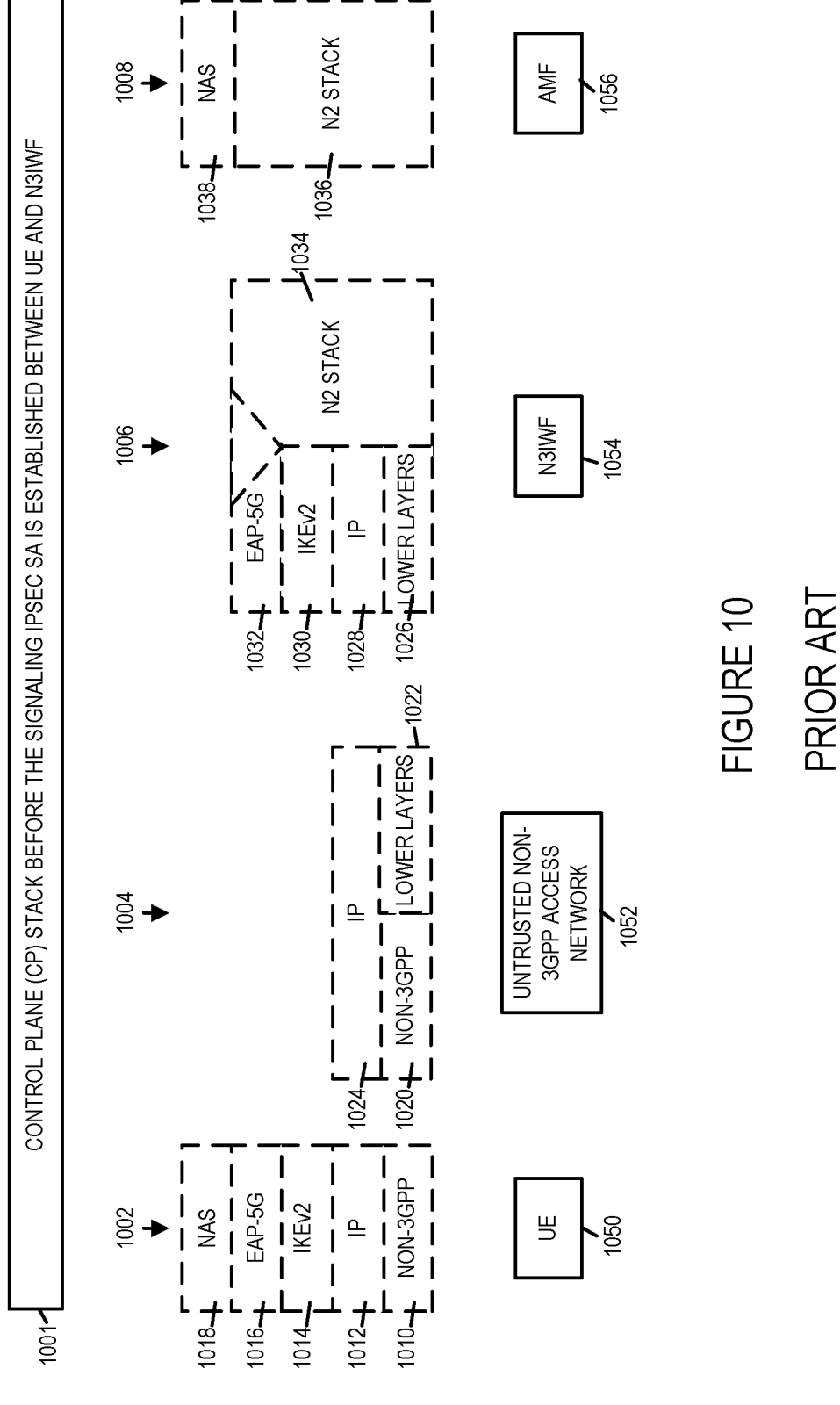
FIG. 10 is a drawing illustrating a control plane (CP) stack before the signaling IPsec Security Association (SA) is established between a prior art UE and a prior art N3IWF.

FIG. 10 is a drawing 1000 illustrating a control plane (CP) stack before the signaling IPsec Security Association (SA) is established between a prior art UE and a prior art N3IWF. Drawing 1000 includes drawing title 1001, the stack configuration 1002 for a prior art UE 1050, the stack configuration 1004 for a prior art untrusted non-3GPP access network 1052, the stack configuration 1006 for a prior art N3IWF 1054, and the stack configuration 1008 for a prior art AMF 1056.

UE stack 1002 includes a NAS layer 1018, an EAP-5G layer 1016, a IKEv2 layer 1014, an IP layer 1012, and a non-3GPP layer 1010, as shown. Untrusted non-3GPP access network stack 1004 includes an IP layer 1024, a non-3GPP layer 1020 and lower layer 1022, as shown. N3IWF stack 1006 includes an EAP-5G layer 1032, an IKEv2 layer 1030, an IP layer 1028, lower layers 1026, and N2 stack 1034, as shown. AMF stack 1008 includes a NAS layer 1038 and N2 stack 1036, as shown.

For reference, 3GPP R18 TS23.501 Figure 8.2.4-1 illustrates control plane before the signaling IPsec SA is established between a prior art UE and a prior art N3IWF.

Currently, an underlying mechanism to carry EAP-directly over MASQUE does not exist. Therefore, it is further proposed, in accordance with a feature of some embodiments of the current invention, that EAP-5G carrying NAS payload is carried over GRE which can be tunneled inside MASQUE.

Figure 11:
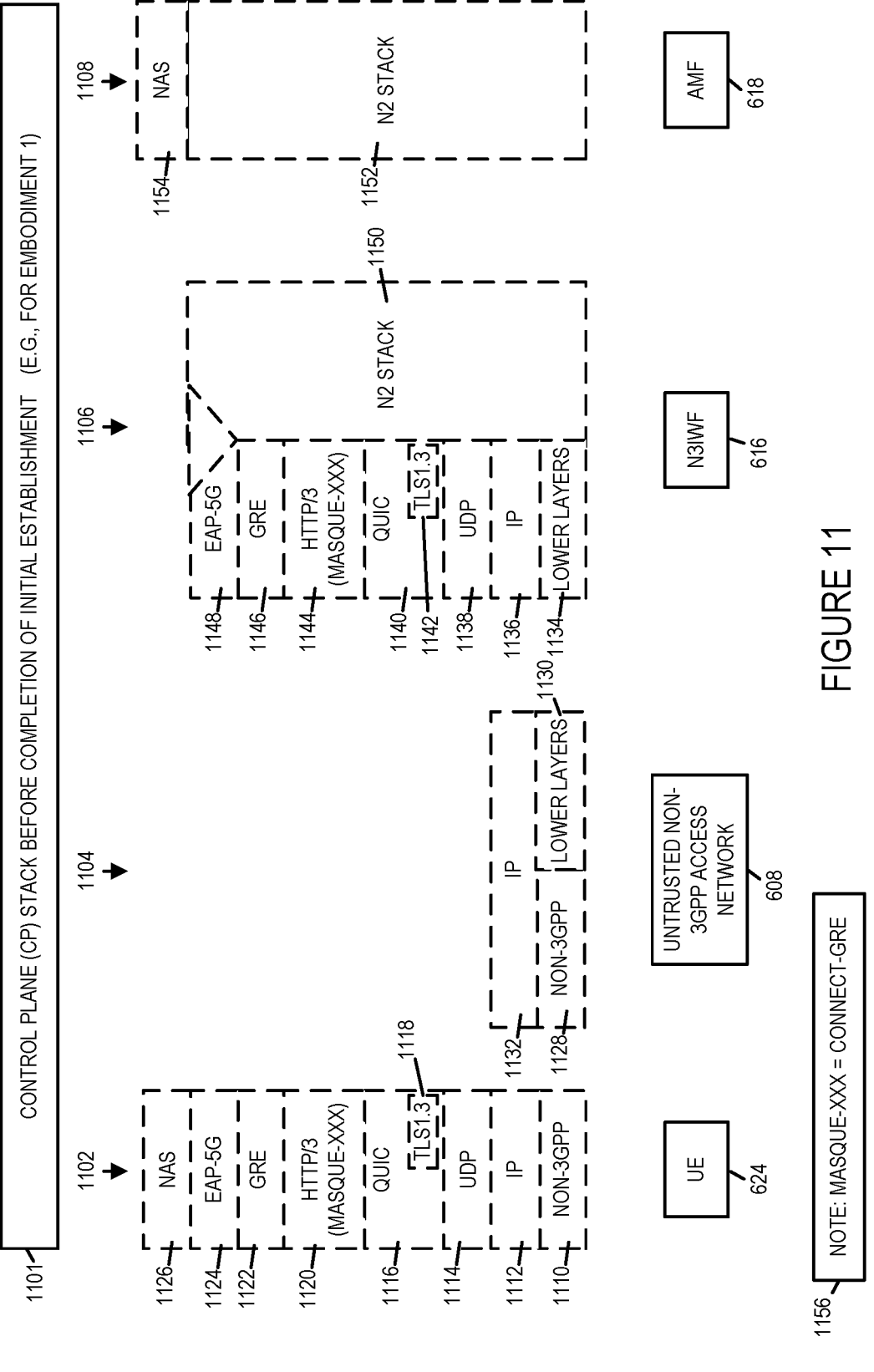
FIG. 11 is a drawing illustrating a control plane (CP) stack before completion of initial establishment, in accordance with an exemplary embodiment (e.g., Embodiment #1).

FIG. 11 is a drawing 1100 illustrating a control plane (CP) stack before completion of initial establishment, in accordance with an exemplary embodiment (e.g., Embodiment #1). Drawing 1100 includes drawing title 1101, the stack configuration 1102 for UE 624, the stack configuration 1104 for untrusted non-3GPP access network 608, the stack configuration 1106 for N3IWF 616, and the stack configuration 1108 for AMF 618.

UE stack 1102 includes a NAS layer 1126, an EAP-5G layer 1124, a GRE layer 1122, a HTTP/3 layer 1120, a QUIC layer 1116 using TLS1.3 1118, a UDP layer 1114, an IP layer 1112, and a non-3GPP layer 1110, as shown. Untrusted non-3GPP access network stack 1104 includes an IP layer 1132, a non-3GPP layer 1128 and lower layers 1130, as shown. N3IWF stack 1006 includes an EAP-5G layer 1148, a GRE layer 1146, a HTTP/3 layer 1144, a QUIC layer 1140 using TLS1.3 1142, a UDP layer 1138, an IP layer 1136, lower layers 1134, and N2 stack 1150, as shown. AMF stack 1108 includes a NAS layer 1154 and N2 stack 1152, as shown. Note: MASQUE-XXX=CONNECT-GRE, as indicated in box 1156, which is a new feature in accordance with the present invention and is currently not an IETF RFC or draft.

Embodiment #1 subsequent communications will now be described.

NAS can be carried over IP (which takes care of fragmentation) which can be, and is, tunneled inside MASQUE over secure QUIC transport established upon successful completion of initial establishment.

Figure 12:
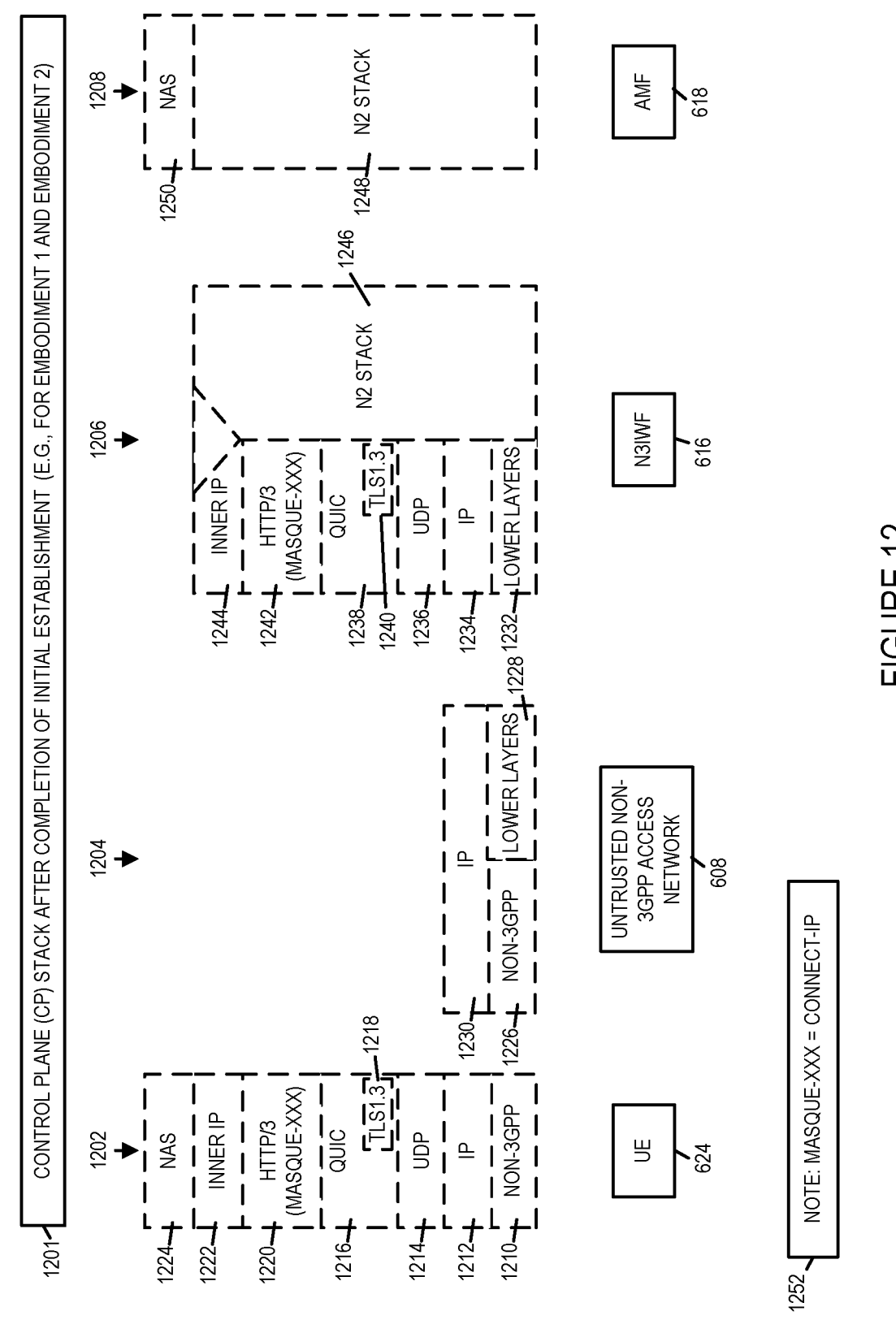
FIG. 12 is a drawing illustrating a control plane (CP) stack after completion of initial establishment, in accordance with exemplary embodiments (e.g., Embodiment #1 and Embodiment #2).

FIG. 12 is a drawing 1200 illustrating a control plane (CP) stack after completion of initial establishment, in accordance with exemplary embodiments (e.g., Embodiment #1 and Embodiment #2). Drawing 1200 includes drawing title 1201, the stack configuration 1202 for UE 624, the stack configuration 1204 for untrusted non-3GPP access network 608, the stack configuration 1206 for N3IWF 616, and the stack configuration 1208 for AMF 618.

UE stack 1202 includes a NAS layer 1224, an inner IP layer 1222, a HTTP/3 layer 1220, a QUIC layer 1216 using TLS1.3 1218, a UDP layer 1214, an IP layer 1212, and a non-3GPP layer 1210, as shown. Untrusted non-3GPP access network stack 1204 includes an IP layer 1230, a non-3GPP layer 1226 and lower layer 1228, as shown. N3IWF stack 1206 includes an inner IP layer 1244, a HTTP/3 layer 1242, an QUIC layer 1238 using TLS1.3 1240, a UDP layer 1236, an IP layer 1234, lower layers 1232, and N2 stack 1246, as shown. AMF stack 1250 includes a NAS layer 1250 and N2 stack 1248, as shown.

Note: MASQUE-xxx=CONNECT-IP, as indicated by block 1252, which is currently an IETF RFC (ix).

Embodiment #1 Session Management related signaling will now be described.

Any N1-procedures other than initial registration will utilize the secure QUIC transport connection established in subsequent communications. This includes setup, teardown, and modification of PDU session(s). As only the underlying transport protocol changes, the sequence flow would be similar to e.g. [ii] clause 4.12.5-1 except for when option B (2-bit header called "3GPP Payload type" to delineate CP and UP traffic) is employed; in which case the proposed new header '3GPP payload type' will be appended to the application payload.

Figure 13A:
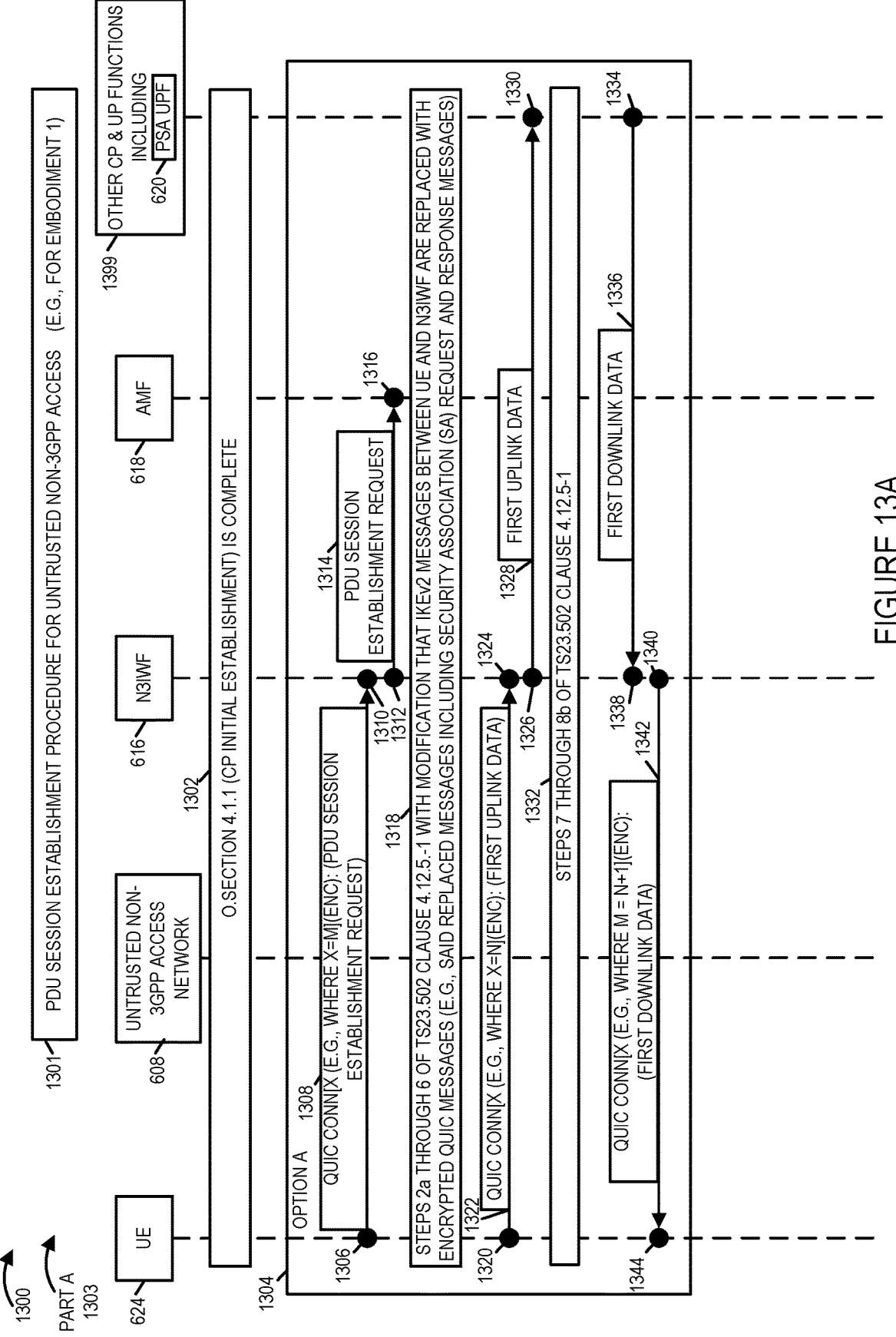
FIG. 13A is a first part of a drawing which illustrates an exemplary PDU session establishment procedure for untrusted non-3GPP access, in accordance with an exemplary embodiment (e.g., Embodiment #1) of the present invention.
Figure 13B:
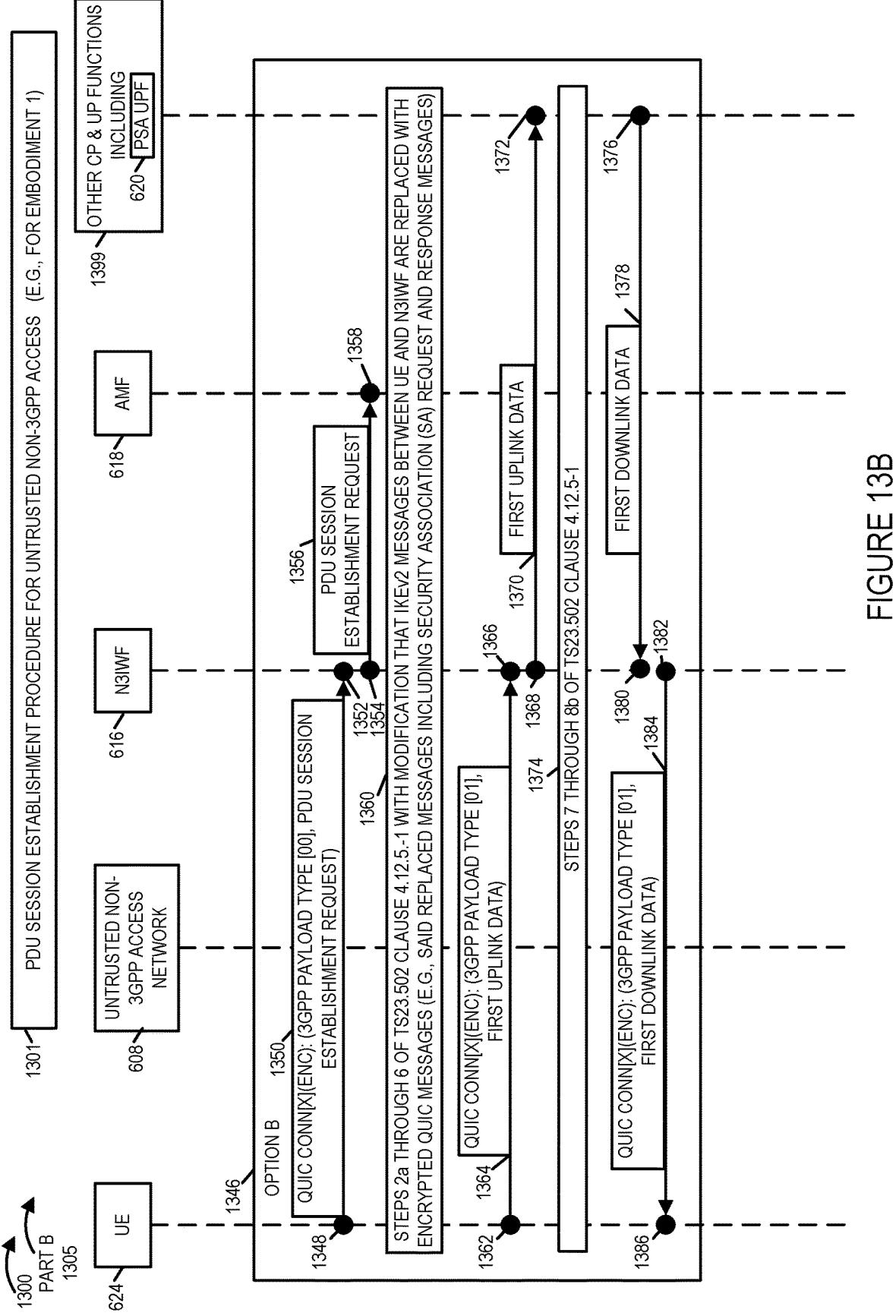
FIG. 13B is a second part of a drawing which illustrates an exemplary PDU session establishment procedure for untrusted non-3GPP access, in accordance with an exemplary embodiment (e.g., Embodiment #1) of the present invention.

FIG. 13, comprising the combination of FIG. 13A and FIG. 13B, is a drawing 1300, comprising Part A 1302 and Part B 1305, which illustrates an exemplary PDU session establishment procedure for untrusted non-3GPP access, as indicated in title box 1301, in accordance with an exemplary embodiment (e.g., Embodiment #1) of the present invention. Drawing 1300 includes UE 624, untrusted non-3GPP access network 608, N3IWF 616, AMF 618 and other CP and UP functions 1399 including PSA UPF 620 and further includes signaling between various elements and operations performed by various elements, as part of the PDU session establishment procedure and subsequent data communications.

Information box 1302 indicates that control plane (CP) initial establishment is complete. Box 1304 includes signaling between various elements and operations performed by various elements, as part of the PDU session establishment procedure and subsequent data communications for option A (in which different sets of QUIC connection IDs are used for control plane signaling and for user plane signaling).

In step 1306 UE 624 generates and sends QUIC CONN[X (e.g., where X=M)] (Enc): (PDU Session Establishment Request) communication 1308 to N3IWF 616. The value of X in communications 1308 corresponds to a QUIC connection ID value from a set of QUIC connection ID values corresponding to CP communications. In step 1310 N3IWF 616 receives the QUIC communication 1308 and recovers the communicated PDU session establishment request message. In step 1312, N3IWF 616 sends PDU session establishment request message 1314 to AMF 618, which receives message 1314 in step 1316 and recovers the communicated information.

In step 1318 the various elements (including elements 624, 608, 616, 618, 620) perform operations in accordance with steps 2a through 6 of TS 23.502 clause 4.12.5.-1 with modification that IKEv2, IPsec messages between UE and N3IWF are replaced with encrypted QUIC messages (e.g., said replaced messages including security association (SA) request and response messages).

In step 1320, UE 624 generates and sends QUIC[X (e.g., where X=N)](Enc):(First Uplink Data) communication 1322 to N3IWF 616. The value of X in communications 1322 corresponds to a QUIC connection ID value from a set of QUIC connection ID values corresponding to UP communications. In step 1324 N3IWF 616 receives the QUIC communication 1322 and recovers the First Uplink Data. In step 1326, N3IWF 616 sends message 1328 including first uplink data to PSA UPF 620, which receives message 1328 in step 1330 and recovers the first uplink data.

In step 1332 the various elements (including elements 624, 608, 616, 618, 620) perform operations in accordance with steps 7 through 8b of TS 23.502 clause 4.12.5.-1

In step 1334, PSA UPF 624 generates and sends message 1336 including first downlink data to N3IWF 616. In step 1338 N3IWF 616 receives message 1336 and recovers the communicated first downlink data. In step 1340, the N3IWF 616 generates and sends QUIC CONN[X (e.g., where X=N+ 1)](Enc): (First Downlink Data communication 1342 to UE 624. The value of X in communications 1342 corresponds to a QUIC connection ID value from a set of QUIC connection ID values corresponding to UP communications. In step 1344 the UE 624 receives the QUIC communications 1342 and recovers the communicated First Downlink Data.

Box 1346 (see FIG. 13B) includes signaling between various elements and operations performed by various elements, as part of the PDU session establishment procedure and subsequent data communications for option B (in which a 3GPP traffic type field in a header is used to distinguish between control plane signaling and user plane signaling).

In step 1348 UE 624 generates and sends QUIC CONN [X] (Enc): (3GPP payload type [00], PDU Session Establishment Request) communication 1350 to N3IWF 616. The value of [00] for the GPP payload type field in communications 1348 corresponds to control plane signaling. In step 1352 N3IWF 616 receives the QUIC communication 1350 and recovers the communicated PDU session establishment request message. In step 1354, N3IWF 616 sends PDU session establishment request message 1356 to AMF 618, which receives message 1356 in step 1358 and recovers the communicated information.

In step 1360 the various elements (including elements 624, 608, 616, 618, 620) perform operations in accordance with steps 2a through 6 of TS 23.502 clause 4.12.5.-1 with modification that IKEv2, IPsec messages between UE and N3IWF are replaced with encrypted QUIC messages (e.g., said replaced messages including security association (SA) request and response messages).

In step 1362, UE 624 generates and sends QUIC[X](Enc): (3GPP payload type [01], First Uplink Data) communication 1364 to N3IWF 616. The value of [01] for the GPP payload type field in communications 1364 corresponds to user plane data signaling. In step 1366 N3IWF 616 receives the QUIC communication 1364 and recovers the First Uplink Data. In step 1368, N3IWF 616 sends message 1370 including first uplink data to PSA UPF 620, which receives message 1370 in step 1372 and recovers the first uplink data.

In step 1374 the various elements (including elements 624, 608, 616, 618, 620) perform operations in accordance with steps 7 through 8b of TS 23.502 clause 4.12.5.-1.

In step 1376, PSA UPF 624 generates and sends message 1378 including first downlink data to N3IWF 616. In step 1380 N3IWF 616 receives message 1378 and recovers the communicated first downlink data. In step 1382, the N3IWF 616 generates and sends QUIC CONN[X](Enc): (3GPP payload type [01], First Downlink Data) communication 1384 to UE 624. The value of [01] for the GPP payload type field in communications 1384 corresponds to user plane data signaling. In step 1386 the UE 624 receives the QUIC communications 1382 and recovers the communicated First Downlink Data.

In some embodiments, the value of X in each of signals 1350, 1364, and 1384 is a different value indicating a different QUIC connection ID, corresponding to the same established QUIC connection between the UE 624 and the N3IWF 616; however, value of X does not signify whether the type of 3GPP payload traffic is control signal (control plane) traffic or data (user plane) traffic.

Embodiment #1 User Plane (UP) related signaling will now be described. UP link is established using appropriate NAS signaling in PDU session establishment procedure. In up to 3GPP Rel-18 architecture, UE encapsulates PDU payload inside a GRE tunnel over IPSec tunnel mode. The SAs used to establish this secure link are derived using the same authentication procedure mentioned above (e.g., see 3GPP TS 23.502 clause 4.12.2).

Figure 14:
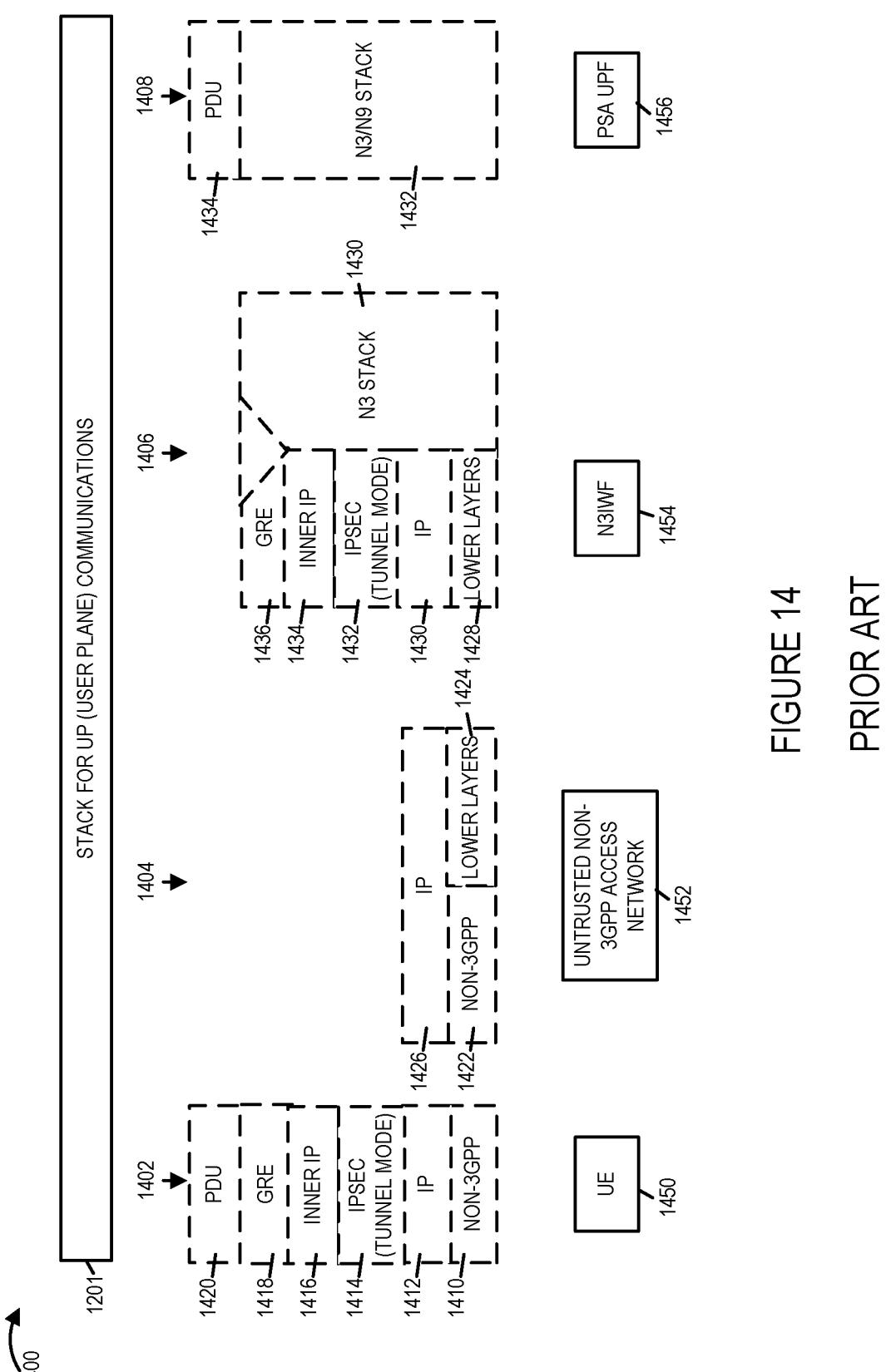
FIG. 14 is a drawing illustrating prior art stacks for user plane (UP) communications.

FIG. 14 is a drawing 1400 illustrating prior art stacks for user plane (UP) communications. Drawing 1400 includes drawing title 1401, the stack configuration 1402 for a prior art UE 1450, the stack configuration 1404 for a prior art untrusted non-3GPP access network 1452, the stack configuration 1406 for a prior art N3IWF 1454, and the stack configuration 1408 for a prior art PSA UPF 1456.

UE stack 1402 includes a PDU layer 1420, a GRE layer 1418, an inner IP layer 1416, an IPsec (tunnel mode) layer 1414, an IP layer 1412, and a non-3GPP layer 1410, as shown. Untrusted non-3GPP access network stack 1404 includes an IP layer 1426, a non-3GPP layer 1422 and lower layers 1424, as shown. N3IWF stack 1406 includes a GRE layer 1436, an inner IP layer 1434, an IPsec (tunnel mode) layer 1432, an IP layer 1430, lower layers 1428, and N3 stack 1430, as shown. PSA UPF stack 1408 includes a PDU layer 1434 and N3/N9 stack 1432, as shown.

For reference, 3GPP R18 TS23.501 Figure 8.3.2-1 illustrates prior art User Plane via prior art N3IWF.

Akin to Initial Establishment, this IPSec layer is replaceable via QUIC.

Tunneling of PDU payload over GRE can be done via MASQUE over QUIC.

In accordance with features of some embodiments of the present invention (e.g., Embodiment #1), with regard to the User Plane (UP) communications stacks, the prior art IPsec layer is replaced with a QUIC layer and tunneling of PDU payload over GRE (as performed in the prior art) is done via MASQUE over QUIC.

Figure 15:
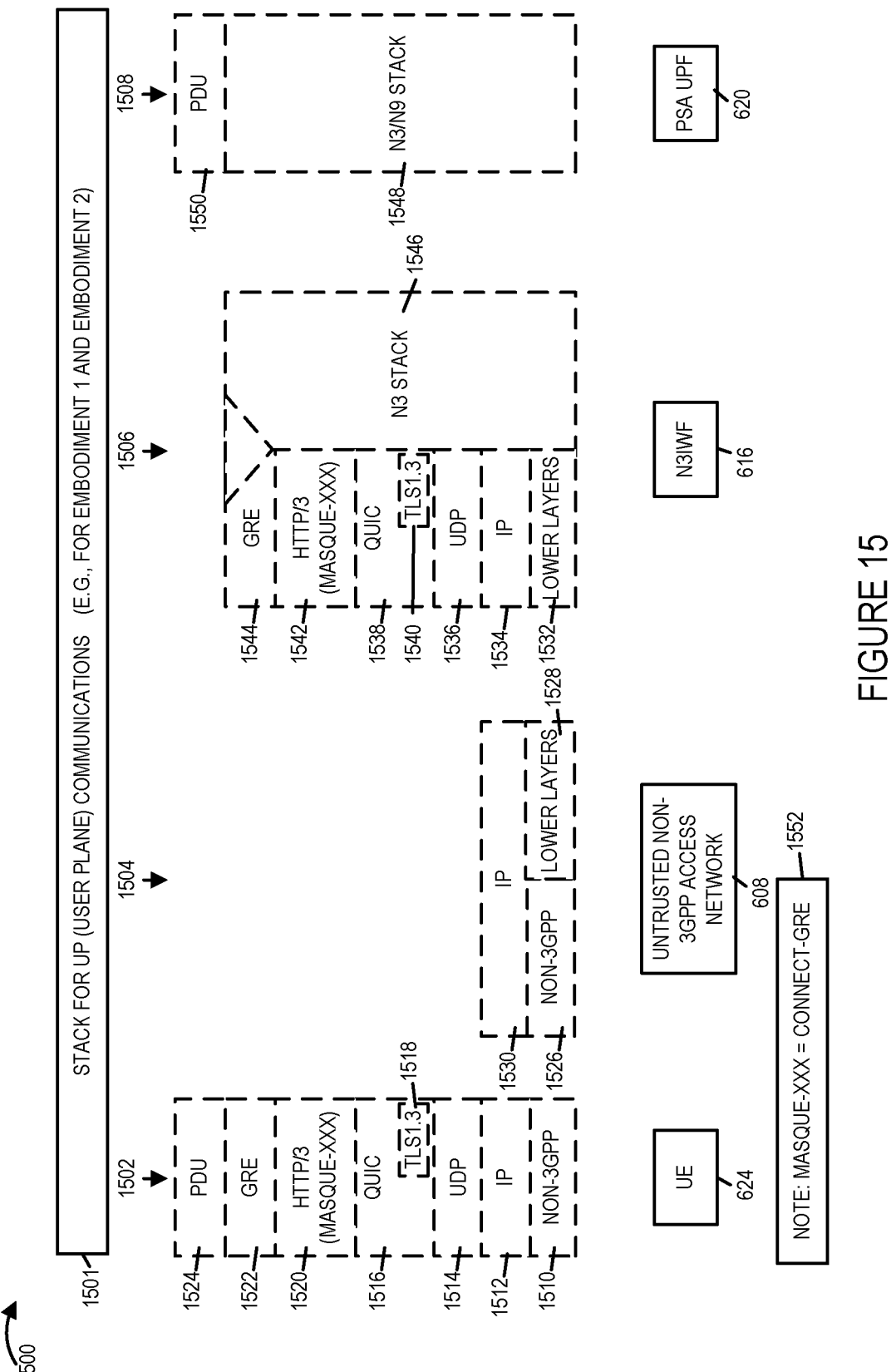
FIG. 15 is a drawing illustrating stacks for user plane (UP) communications in accordance with various embodiments (e.g., Embodiment #1 and Embodiment #2) of the present invention.

FIG. 15 is a drawing 1500 illustrating stacks for user plane (UP) communications in accordance with various embodiments (e.g., Embodiment #1 and Embodiment #2) of the present invention. Drawing 1500 includes drawing title 1501, the stack configuration 1502 for UE 624, the stack configuration 1504 for untrusted non-3GPP access network 608, the stack configuration 1506 for N3IWF 616, and the stack configuration 1508 for PSA UPF 620.

UE stack 1502 includes a PDU layer 1524, a GRE layer 1522, a HTTP/3 layer 1520, a QUIC layer 1516 using TLS1.3 1518, a UDP layer 1514, an IP layer 1512 and a non-3GPP layer 1510, as shown. Untrusted non-3GPP access network stack 1504 includes an IP layer 1530, a non-3GPP layer 1526 and lower layers 1528, as shown.

N3IWF stack 1506 includes a GRE layer 1544, a HTTP/3 layer 1542, a QUIC layer 1538 using TLS 1.3 1540, a UDP layer 1536, an IP layer 1534, lower layers 1532, and N3 stack 1546, as shown. PSA UPF stack 1508 includes a PDU layer 1550 and N3/N9 stack 1548, as shown. Note: MASQUE-XXX=CONNECT-GRE, as indicated by block 1552, is a new feature, which currently is not an IETF RFC or draft.

Embodiment #2, in which both the N3IWF (e.g., N3IWF 616) and the UE (e.g., UE 624) implement MASQUE over QUIC (MASQUE o/QUIC) but in which EAP-5G as transport for NAS is replaced with GRE will now be described. This non-exclusive implementation of type A solutions (those which modify a non-3GPP core network interfacing device, N3IWF or TNGF, to lower the entry-bar for ATSSS realization) is modelled along Embodiment #1 with the key difference that NAS encapsulation via EAP-5G is replaced with NAS encapsulation inside GRE.

The benefit of this embodiment (Embodiment #2) over Embodiment #1 is the approach of Embodiment #2 further simplifies the implementation stack at both UE 624 and N3IWF 616 by employing GRE for both CP (for initial connection establishment) and UP links.

Embodiment #2 will now be described with regard to control plane (CP) traffic.

Embodiment #2 Initial communication will now be described.

In this his embodiment (Embodiment #2) NAS payload is carried over GRE which can be tunneled inside MASQUE. All procedures as described in Embodiment #1 are applicable excluding the use of EAP-5G.

Figure 16:
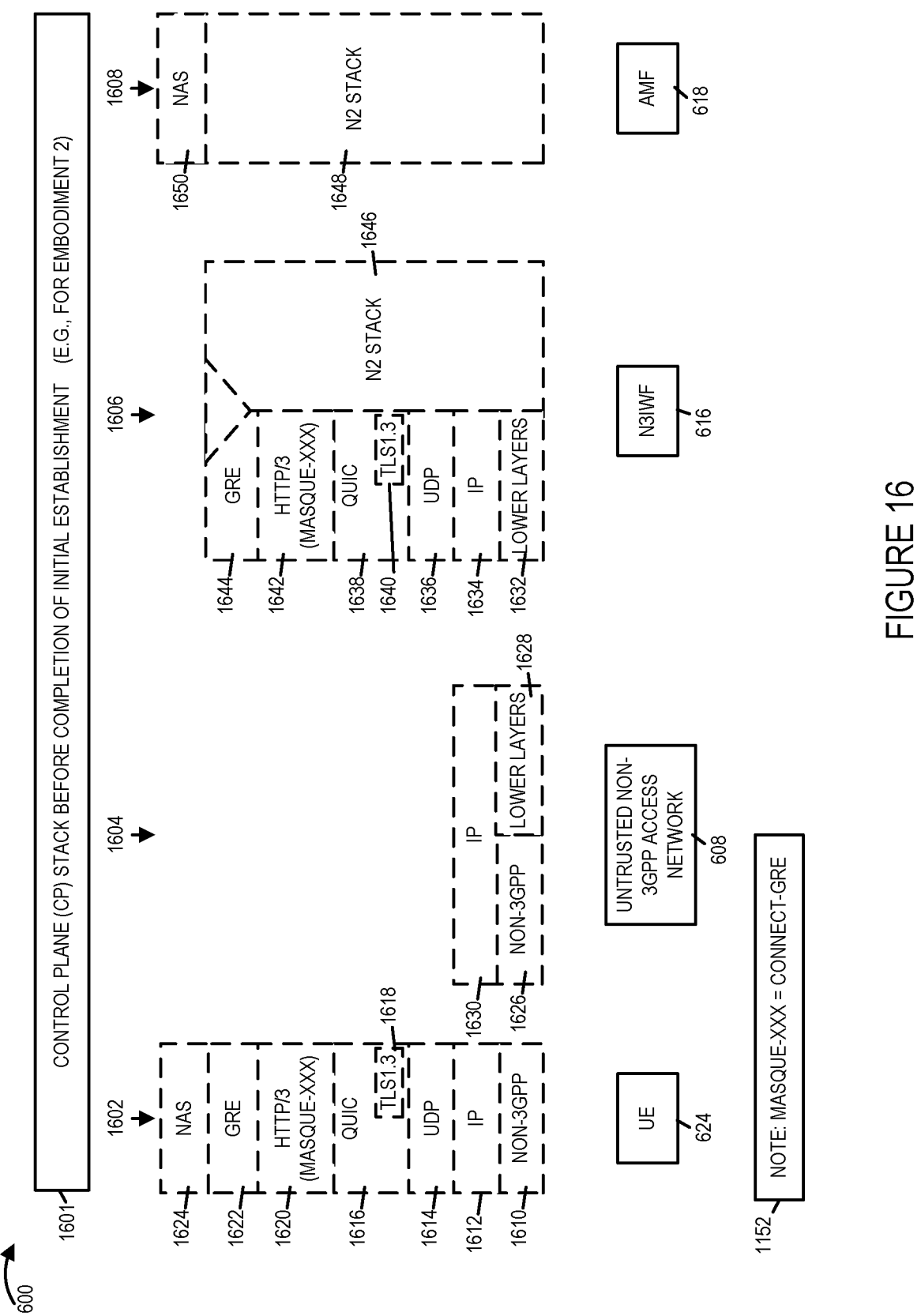
FIG. 16 is a drawing illustrating a control plane (CP) stack before completion of initial establishment, in accordance with an exemplary embodiment (e.g., Embodiment #2).

FIG. 16 is a drawing 1600 illustrating a control plane (CP) stack before completion of initial establishment, in accordance with an exemplary embodiment (e.g., Embodiment #2). Drawing 1600 includes drawing title 1601, the stack configuration 1602 for UE 624, the stack configuration 1604 for untrusted non-3GPP access network 608, the stack configuration 1606 for N3IWF 616, and the stack configuration 1608 for AMF 618.

UE stack 1602 includes a NAS layer 1624, a GRE layer 1622, a HTTP/3 layer 1620, a QUIC layer 1616 using TLS 1.3 1618, a UDP layer 1614, an IP layer 1612, and a non-3GPP layer 1610, as shown. Untrusted non-3GPP access network stack 1604 includes an IP layer 1630, a non-3GPP layer 1626 and lower layers 1628, as shown. N3IWF stack 1606 includes a GRE layer 1644, a HTTP/3 layer 1642, a QUIC layer 1638 using TLS 1.3 1640, a UDP layer 1636, an IP layer 1634, lower layers 1632, and N2 stack 1646, as shown. AMF stack 1608 includes a NAS layer 1650 and N2 stack 1648, as shown.

Note: MASQUE-xxx=CONNECT-GRE, as indicated in box 1152, which is a new feature in accordance with the present invention and is currently not an IETF RFC or draft.

The stack (see FIG. 16) for initial CP communication (for Embodiment #2) is similar to the stack (see FIG. 11) for initial CP communication (for Embodiment #1), with the exception that Embodiment #2 does not have an EAP-5G layer.

The signal flow for initial CP communication (for Embodiment #2) is similar to the signal flow for initial CP communication (for Embodiment 1) (See FIG. 9 and corresponding description.)

Embodiment #2 subsequent communications will now be described.

The stack for Embodiment #2 for subsequent CP communication is similar to the stack for subsequent CP communication for Embodiment #1. (See FIG. 12 and corresponding description.) The session management related signaling for Embodiment #2 is similar to the session management related signaling for Embodiment #1. (See FIG. 13 including FIG. 13A and FIG. 13B and the corresponding description.)

Embodiment #2 with regard to user plane (UP) traffic will now be described. The stack for UP communication for Embodiment #2 is similar to the stack for UP communication for Embodiment #1. (See FIG. 15 and the corresponding description.).

Embodiment #3, Implementing MASQUE for trusted non-3GPP networks, will now be described.

The concept of employing MASQUE to remove the entry barrier for untrusted non-3GPP networks (as previously described) can be, and sometimes is, extended for trusted non-3GPP networks. Employing GRE to transport upper-layer protocols will allow further harmonization of protocol stacks (and therefore capabilities) of untrusted and trusted non-3GPP networks.

Embodiment #3 will now be described with regard to control plane (CP) traffic. Embodiment #3 Initial communication will now be described.

For reference, 3GPP R18 TS23.501 Figure 8.2.5-1 illustrates Control Plane before the NWt connection (i.e., connection between TNAP and TNGF) is established between UE and TNGF.

Figure 17:
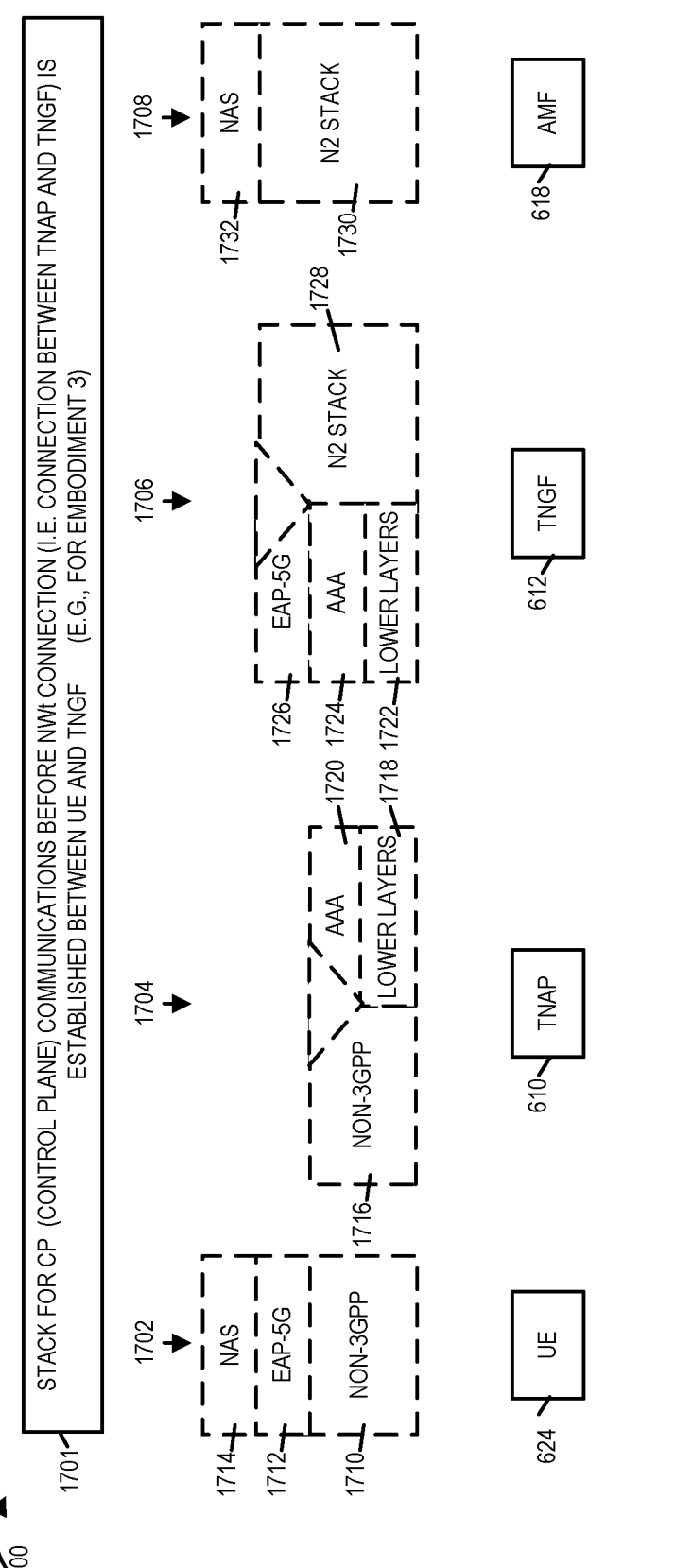
FIG. 17 is a drawing illustrating stack for control plane (CP) communications before NWt connection (i.e., connection between TNAP and TNGP) is established between UE and TNGF in accordance with various embodiments (e.g., Embodiment #3) of the present invention.

FIG. 17 is a drawing 1700 illustrating stack for control plane (CP) communications before NWt connection (i.e., connection between UE and TNAN, which includes both TNAP and TNGF) is established between UE 624 and TNGF 612. Drawing 1700 includes drawing title 1701, the stack configuration 1702 for UE 624, the stack configuration 1704 for TNAP 610, the stack configuration 1706 for TNGF 612, and the stack configuration 1708 AMF 618.

UE stack 1702 includes a NAS layer 1714, an EAP-5G layer 1712, and a non-3GPP layer 1710, as shown. TNAP stack 1704 includes a non-3GPP layer 1716, AAA layer 1720 and lower layers 1718, as shown. TNGF stack 1706 includes an EAP-5G layer 1726, a AAA layer 1724, lower layers 1722, and N2 stack 1728, as shown. AMF stack 1708 includes a NAS layer 1732 and N2 stack 1730, as shown.

Figure 18:
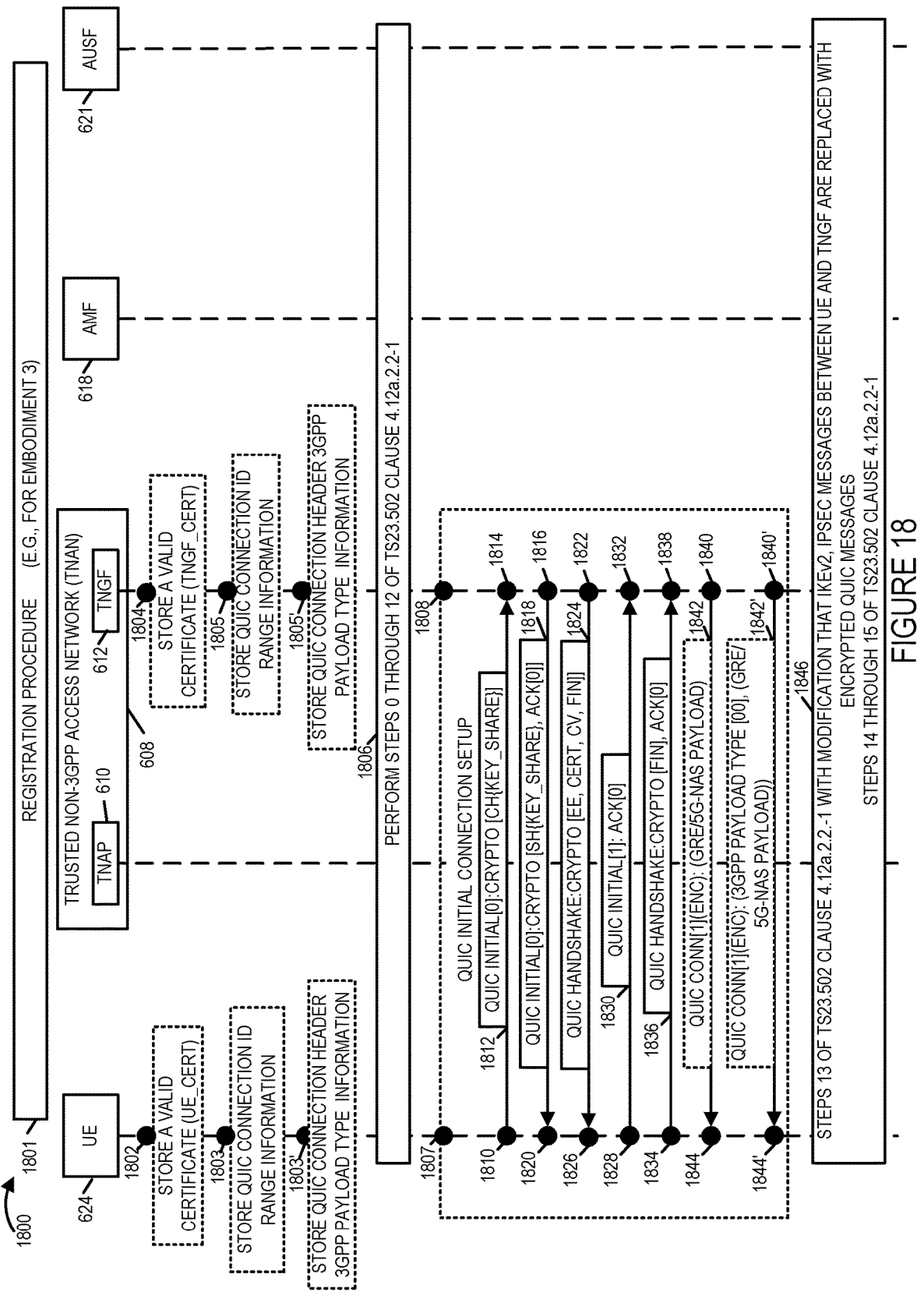
FIG. 18 is a drawing which illustrates an exemplary registration procedure for trusted non-3GPP access in accordance with an exemplary embodiment (e.g., Embodiment #3) of the present invention.

The stack of FIG. 17 is leveraged and unchanged, for initial communication as well as the Registration Procedures 0 through 12 of TS23.502 Figure 4.12a.2.2-1 as illustrated in FIG. 18.

FIG. 18 is a drawing 1800 which illustrates an exemplary registration procedure for trusted non-3GPP access in accordance with an exemplary embodiment (e.g., Embodiment #3) of the present invention. Drawing 1800 is a modified version of a Registration Procedure for Trusted Non-3GPP access, said modified version supporting encrypted QUIC messages. Drawing 1800 includes drawing title 1801, UE 624, trusted non-3GPP access network 604 including TNAP 610 and TNGF 612, AMF 618 and AUSF 621 and further includes signaling between various elements and operations performed by various elements, as part of the registration procedure.

In step 1802 UE 624 stores a valid certificate (UE_cert). The stored UE certificate supports QUIC connection setup. In step 1804, TNGF 612 stores a valid certificate (TNGF_cert). The stored TNGF certificate supports QUIC connection setup. In some embodiments, the procedure includes steps 1803 and 1805. In other embodiments, the procedure includes steps 1803' and 1805'.

In step 1803 UE 624 stores QUIC connection ID range information. In step 1805 TNGF 612 stores QUIC connection ID range information.

In some embodiments, said stored QUIC connection ID range information includes: i) a first range of QUIC connection ID values corresponding to control plane interface signaling, ii) a second range of QUIC connection ID values corresponding to user plane interface signaling.

In some embodiments, said steps (1803 and 1805) of storing connection ID range information includes storing information indicating subsets of QUIC connection ID values corresponding to user plane traffic, different subsets of QUIC connection ID values corresponding to different types of user plane traffic and/or user plane traffic corresponding to different QoS levels.

In some embodiments, said QUIC connection ID range information is preconfigured in the TNGF 612 (and the first UE 624). In some embodiments, said QUIC connection ID range information is communicated to TNGF 612 (and to the first UE 624) from a control device in the core network (and wherein the connection ID range values can be changed by the control device).

In step 1803' the UE 624 stores QUIC connection header 3GPP payload type information. In step 1805' the TNGF 612 stores QUIC connection header 3GPP payload type information.

In some embodiments said steps of storing (1803' and 1805') QUIC connection header 3GPP payload type information includes storing QUIC connection header payload type (e.g., 3GPP payload) identifiers including: i) a first payload type identifier (e.g., value of 00) corresponding to N2(N1) interface (control plane) signaling, ii) a second payload type identifier (e.g., value of 01) corresponding to N3 interface (user plane data) traffic. In some embodiments, said QUIC connection header payload type identifiers are preconfigured in the TNGF 612 (and the first UE 624). In some embodiments, said QUIC connection header payload type identifiers are communicated to the TNGF 616 (and the UE 624) from a control device in the network core (and wherein said QUIC connection header payload type identifiers can be changed by the control device).

In step 1806 the elements (624, 610, 612, 618 and 621) are operated to perform steps 0 through 12 of TS23.502 clause 4.12A.2.2-1.

In steps 1807 and 1808, the UE 624 and TNGF 612 perform a QUIC initial connection setup procedure. In step 1810 UE 624 generates and sends QUIC Initial[0]: CRYPTO [CH{key_share}] signal 1812 to TNGF 612, which receives signal 1812 in step 1814 and recovers the communicated information. In step 1816 the TNGF 612 generates and sends QUIC Initial[0]: CRYPTO [SH{key_share}, ACK[0]] signal 1818 to UE 624, which receives signal 1818 in step 1820 and recovers the communicated information. In step 1822 the TNGF 612 generates and sends Handshake: CRYPTO [EE, CERT, CV, FIN] signal 1824 to UE 624, which receives signal 1824 in step 1826 and recovers the communicated information. In step 1828 UE 624 generates and sends QUIC Initial[1]: ACK[0] signal 1830 to TNGF 612, which receives signal 1830 in step 1832 and recovers the communicated information. In step 1834 UE 624 generates and sends QUIC Handshake: CRYPTO [FIN], ACK[0] signal 1836 to TNGF 612, which receives signal 1836 in step 1838 and recovers the communicated information. In some embodiments, in step 1840 the TNGF 612 generates and sends QUIC CONN[1](Enc): (GRE/5G-NAS payload) signal 1842 to UE 624, which receives signal 1842 in step 1844 and recovers the communicated information. In some other embodiments, in step 1840' the TNGF 612 generates and sends QUIC CONN[1] (Enc): (3GPP payload type [00], (GRE/5G-NAS payload))

signal 1842' to UE 624, which receives signal 1842' in step 1844' and recovers the communicated information.

In step 1846 the various elements (624, 610, 612, 618, 621) perform operations in accordance with step 13 of TS 23.502 clause 4.12a.2.2-1 with modification that IKEv2, IPsec messages between UE and TNGF are replaced with encrypted QUIC messages (e.g., said replaced messages including authentication request and response messages), and the various elements (624, 610, 612, 618, 621) perform operations in accordance with steps 14 through 15 of TS 23.502 clause 4.12a.2.2-1.

Figure 19:
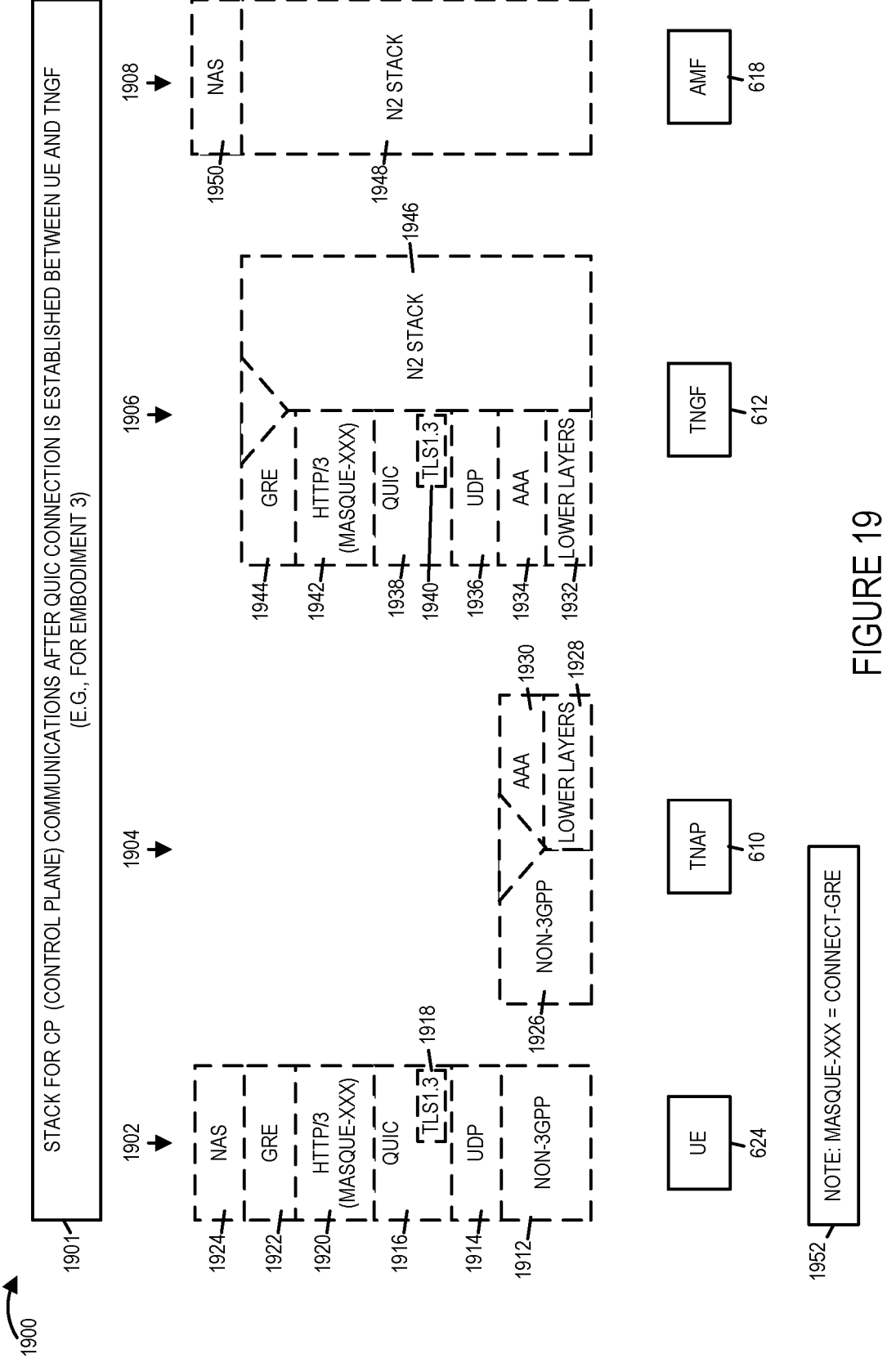
FIG. 19 is a drawing illustrating a control plane (CP) stack after the QUIC connection is established between UE and TNGF, in accordance with an exemplary embodiment (e.g., Embodiment #3).

The procedures of steps 13 through 21 of TS 23.502 clause 4.12a.2.2-1, which are performed as part of the operations of FIG. 18, utilize the stack diagram 1900 of FIG. 19 once the QUIC connection is established as illustrated in the signal flow diagram 1800 of FIG. 18.

FIG. 19 is a drawing 1900 illustrating a control plane (CP) stack the QUIC is established between UE 624 and TNGF 612, in accordance with an exemplary embodiment (e.g., Embodiment #3). Drawing 1900 includes drawing title 1901, the stack configuration 1902 for UE 624, the stack configuration 1904 for TNAP 610, the stack configuration 1906 for TNGF 612, and the stack configuration 1908 for AMF 618.

UE stack 1902 includes a NAS layer 1924, a GRE layer 1922, a HTTP/3 layer 1920, a QUIC layer 1916 using TLS 1.3 1918, a UDP layer 1914, and a non-3GPP layer 1912, as shown. TNAP stack 1904 includes a non-3GPP layer 1926, an AAA layer 1930 and lower layers 1928, as shown. TNGF stack 1906 includes a GRE layer 1944, a HTTP/3 layer 1942, a QUIC layer 1938 using TLS 1.3 1940, a UDP layer 1936, an AAA layer 1934, lower layers 1932, and N2 stack 1946, as shown. AMF stack 1908 includes a NAS layer 1950 and N2 stack 1948, as shown.

Note: MASQUE-XXX=CONNECT-GRE, as indicated in box 1952, which is a new feature in accordance with the present invention and is currently not an IETF RFC or draft.

Embodiment #3 subsequent communications will now be described. Subsequent communication with regard to Embodiment #3 are similar to subsequent communications with regard to Embodiment #2 but with the non-3GPP AN 608 and N3IWF 616 replaced with TNAP 610 and TNGF 612, respectively.

For reference, 3GPP R18 TS23.501 Figure 8.2.5-2 illustrates prior art stack for Control Plane after the NWt connection (i.e., connection between TNAP and TNGF) is established between UE and TNGF.

Figure 20:
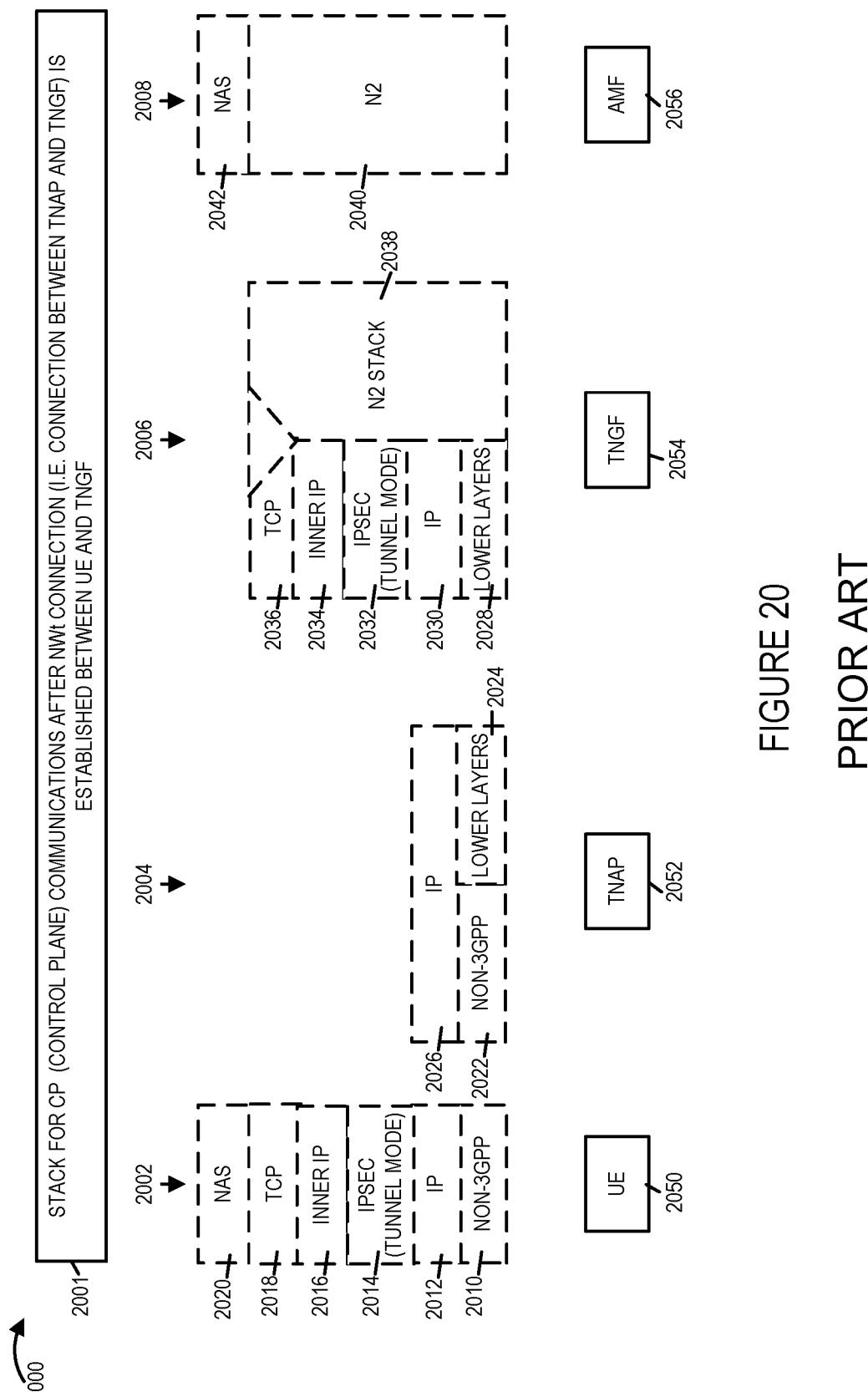
FIG. 20 is a drawing illustrating prior art stack for control plane (CP) stack communications after NWt connection (i.e., connection between TNAP and TNGF) is established between a prior art UE and prior art TNGF.

FIG. 20 is a drawing 2000 illustrating prior art stack for control plane (CP) stack communications after NWt connection (i.e., connection between TNAP and TNGF) is established between a prior art UE and prior art TNGF. Drawing 2000 includes drawing title 2001, the stack configuration 2002 for a prior art UE 2050, the stack configuration 2004 for a prior art TNAP 2052, the stack configuration 2006 for a prior art TNGF 2054, and the stack configuration 2008 for a prior art AMF 2056.

UE stack 2002 includes a NAS layer 2020, TCP layer 2018, an inner IP layer 2016, an IPsec (tunnel mode) layer 2014, an IP layer 2012, and a non-3GPP layer 2010, as shown. TNAP stack 2004 includes an IP layer 2026, a non-3GPP layer 2022 and lower layer 2024, as shown. TNGF stack 2006 includes a TCP layer 2036, an inner IP layer 2034, an IPsec (tunnel mode) layer 2032, an IP layer 2030, lower layers 2032, and N2 stack 2038, as shown. AMF stack 2008 includes a NAS layer 2042 and N2 stack 2040, as shown.

Figure 21:
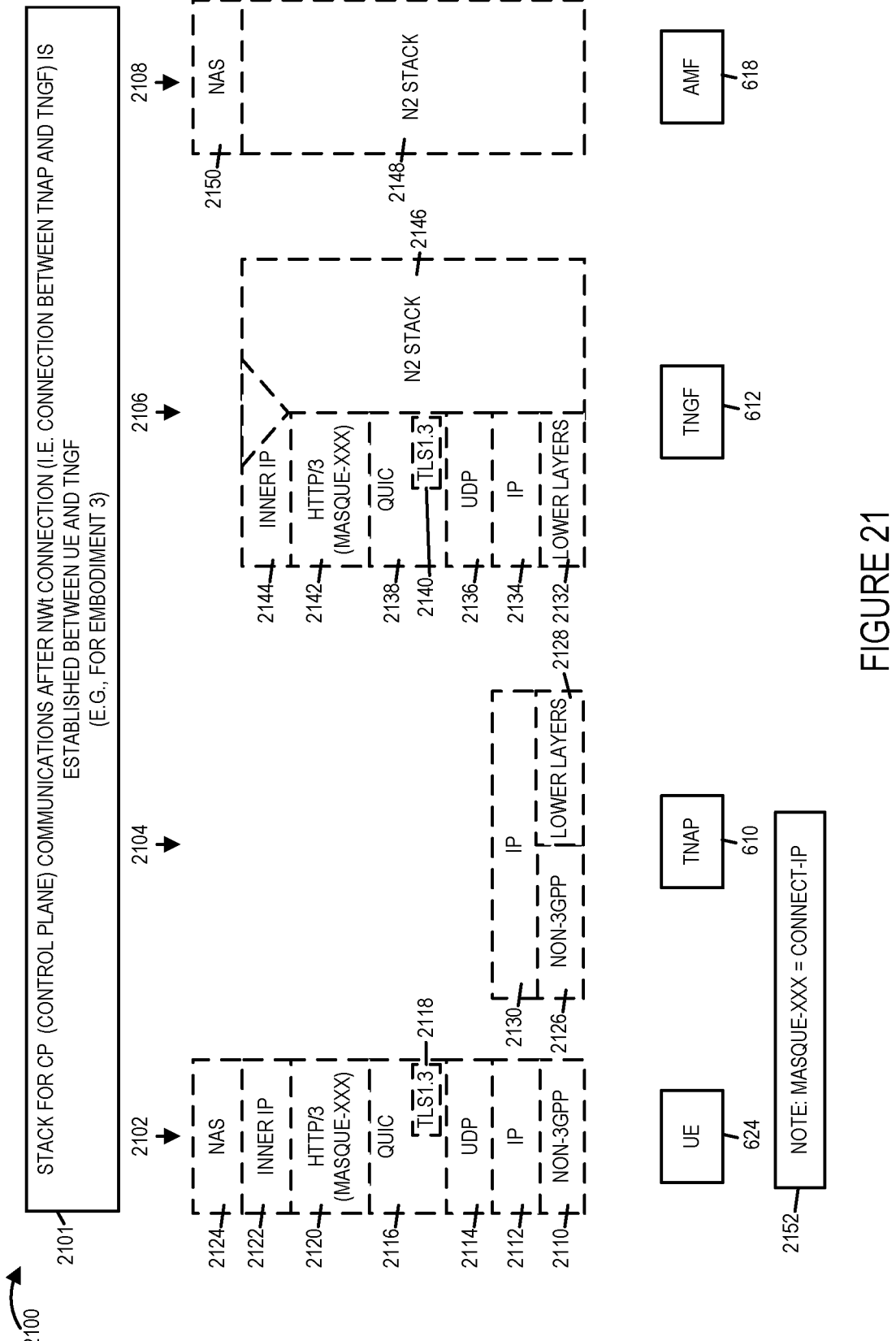
FIG. 21 is a drawing illustrating stack for control plane (CP) stack communications (for Embodiment #3) after NWt connection (i.e., connection between TNAP and TNGF) is established between UE and TNGF.

FIG. 21 is a drawing 2100 illustrating stack for control plane (CP) stack communications (for Embodiment #3) after NWt connection (i.e., connection between TNAP 610 and TNGF 612) is established between UE 624 and TNGF 612. Drawing 2100 includes drawing title 2101, the stack configuration 2102 for UE 634, the stack configuration 2104 for TNAP 610, the stack configuration 2106 for TNGF 612, and the stack configuration 2108 for AMF 618.

UE stack 2102 includes a NAS layer 2124, an inner IP layer 2122, a HTTP/3 layer 2120, QUIC layer 2116 using TLS 1.3 2118, a UDP layer 2114, an IP layer 2112, and a non-3GPP layer 2110, as shown. TNAP stack 2104 includes an IP layer 2130, a non-3GPP layer 2126 and lower layers 2128, as shown. TNGF stack 2106 includes an inner IP layer 2144, a HTPP/3 layer 2142, a QUIC layer 2138, a UDP layer 2136, an IP layer 2134, lower layers 2132, and N2 stack 2146, as shown. AMF stack 2108 includes a NAS layer 2150 and N2 stack 2148, as shown.

Note: MASQUE-XXX=CONNECT-IP, as indicated by block 2152, which is currently an IETF RFC (ix).

Stack diagram 2100 of FIG. 21 (for Embodiment #3) is similar to stack diagram 1200 of FIG. 12 (for Embodiment #1 and Embodiment #2), where the non-3GPP AN 608 is replaced with TNAP 610 and the N3IWF 616 is replaced with TNGF 612.

Embodiment #3 will now be described with respect to user plane (UP) traffic. UP traffic (for Embodiment #3) is similar to UP traffic (for Embodiment #2) with the non-3GPP AN 608 and N3IWF 616 being replaced with TNAP 610 and TNGF 612, respectively.

For reference, 3GPP R18 TS23.501 Figure 8.3.2-1 illustrates prior art User Plane via TNGF.

Figure 22:
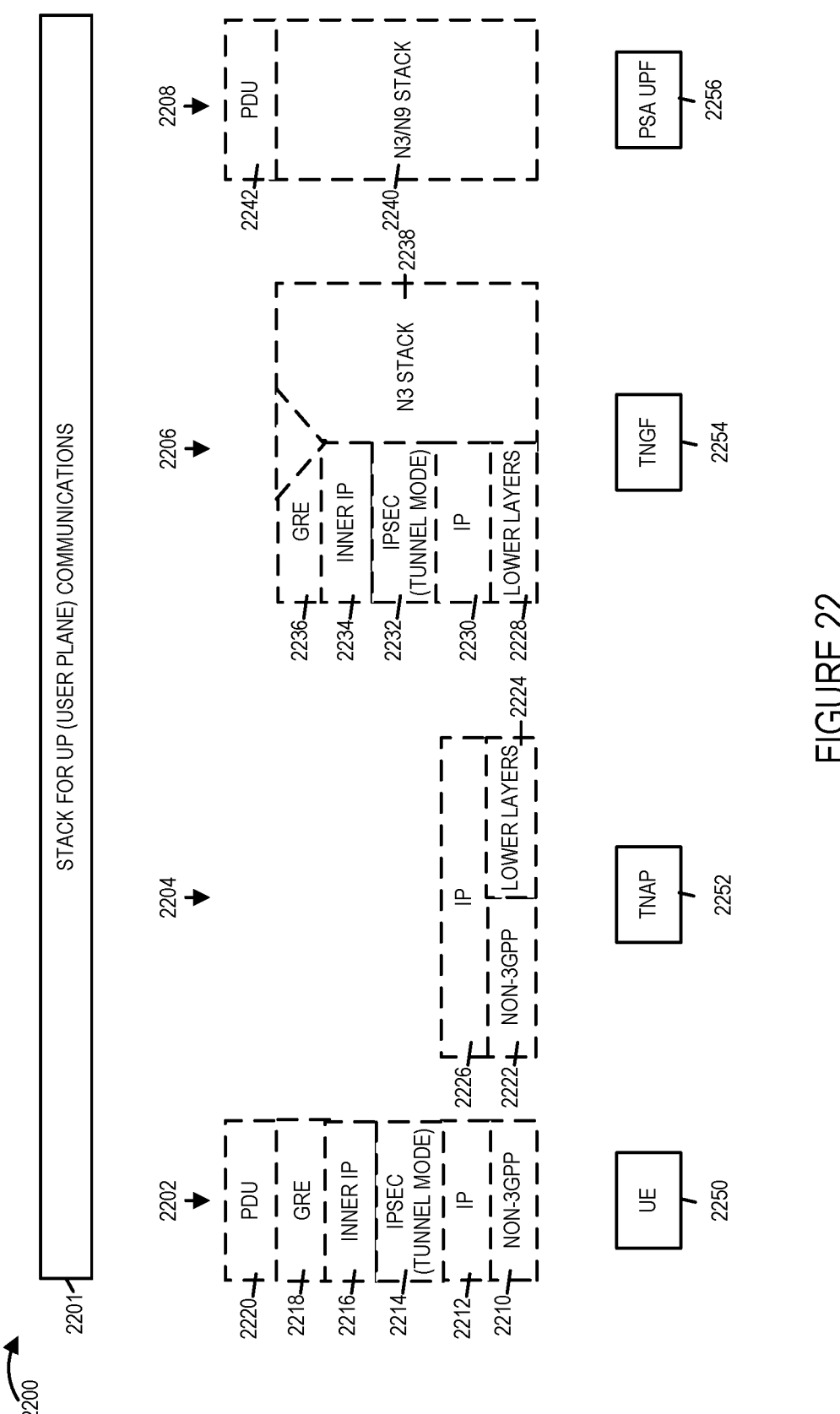
FIG. 22 is a drawing illustrating prior art stacks for user plane (UP) communications.

FIG. 22 is a drawing 2200 illustrating prior art stacks for user plane (UP) communications. Drawing 2200 includes drawing title 2201, the stack configuration 2202 for a prior art UE 2250, the stack configuration 2204 for a prior art TNAP 2252, the stack configuration 2206 for a prior art TNGF 2254, and the stack configuration 2208 for a prior art PSA UPF 2256.

UE stack 2202 includes a PDU layer 2220, a GRE layer 2218, an inner IP layer 2216, an IPsec (tunnel mode) layer 2214, an IP layer 2212, and a non-3GPP layer 2210, as shown. TNAP stack 2204 includes an IP layer 2226, a non-3GPP layer 2222 and lower layers 2224, as shown. TNGF stack 2206 includes a GRE layer 2236, an inner IP layer 2234, an IPsec (tunnel mode) layer 2232, an IP layer 2230, lower layers 2228, and N3 stack 2238, as shown. PSA UPF stack 2208 includes a PDU layer 2242 and N3/N9 stack 2240, as shown.

Figure 23:
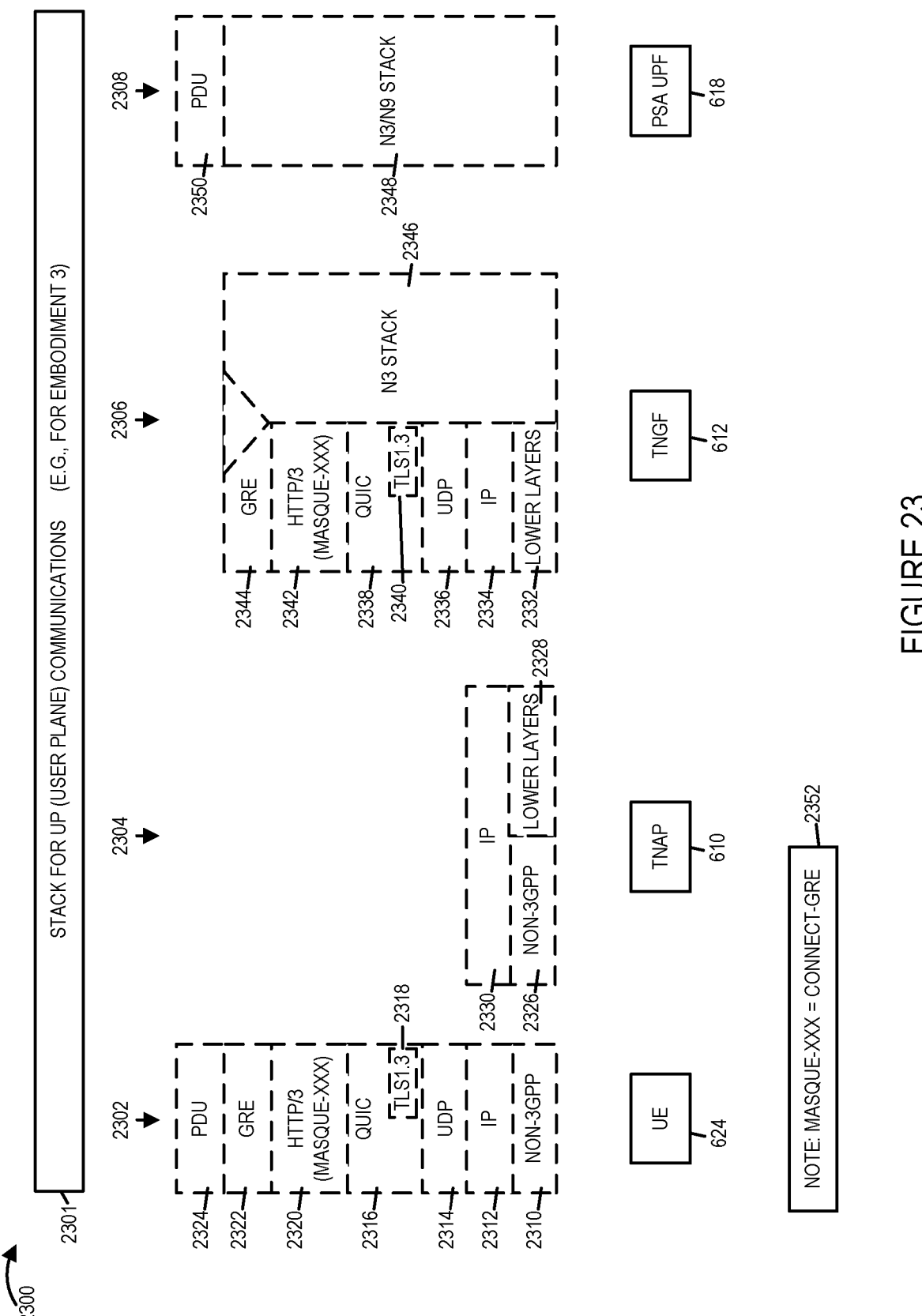
FIG. 23 is a drawing illustrating stacks for user plane (UP) communications (for Embodiment #3), in accordance the present invention.

FIG. 23 is a drawing 2300 illustrating stacks for user plane (UP) communications (for Embodiment #3), in accordance the present invention. Drawing 2300 includes drawing title 2301, the stack configuration 2302 for UE 624, the stack configuration 2304 for TNAP 610, the stack configuration 2306 for TNGF 612, and the stack configuration 2308 for PSA UPF 620.

UE stack 2302 includes a PDU layer 2324, a GRE layer 2322, a HTTP/3 layer 2320, a QUIC layer 2316 using TLS 1.3 2318, a UDP layer 2314, an IP layer 2312 and a non-3GPP layer 2310, as shown. TNAP stack 2304 includes an IP layer 2330, a non-3GPP layer 2326 and lower layers 2328, as shown. TNGF stack 2306 includes a GRE layer 2344, a HTTP/3 layer 2342, a QUIC layer 2338 using TLS 1.3 2340, a UDP layer 2336, an IP layer 2334, lower layers 2332, and N3 stack 2346, as shown. PSA UPF stack 2308 includes a PDU layer 2350 and N3/N9 stack 2348, as shown.

Note: MASQUE-XXX=CONNECT-GRE, as indicated by block 2352, is a new feature, which currently is not an IETF RFC or draft.

Stack 2300 of FIG. 23 for UP communications (for Embodiment #3) is similar to stack 1500 for UP communications (for Embodiment #1 and Embodiment #2) with the non-3GPP AN 608 replaced with TNAP 610 and the N3IWF 616 is replaced with TNGF 612.

Figure 24A:
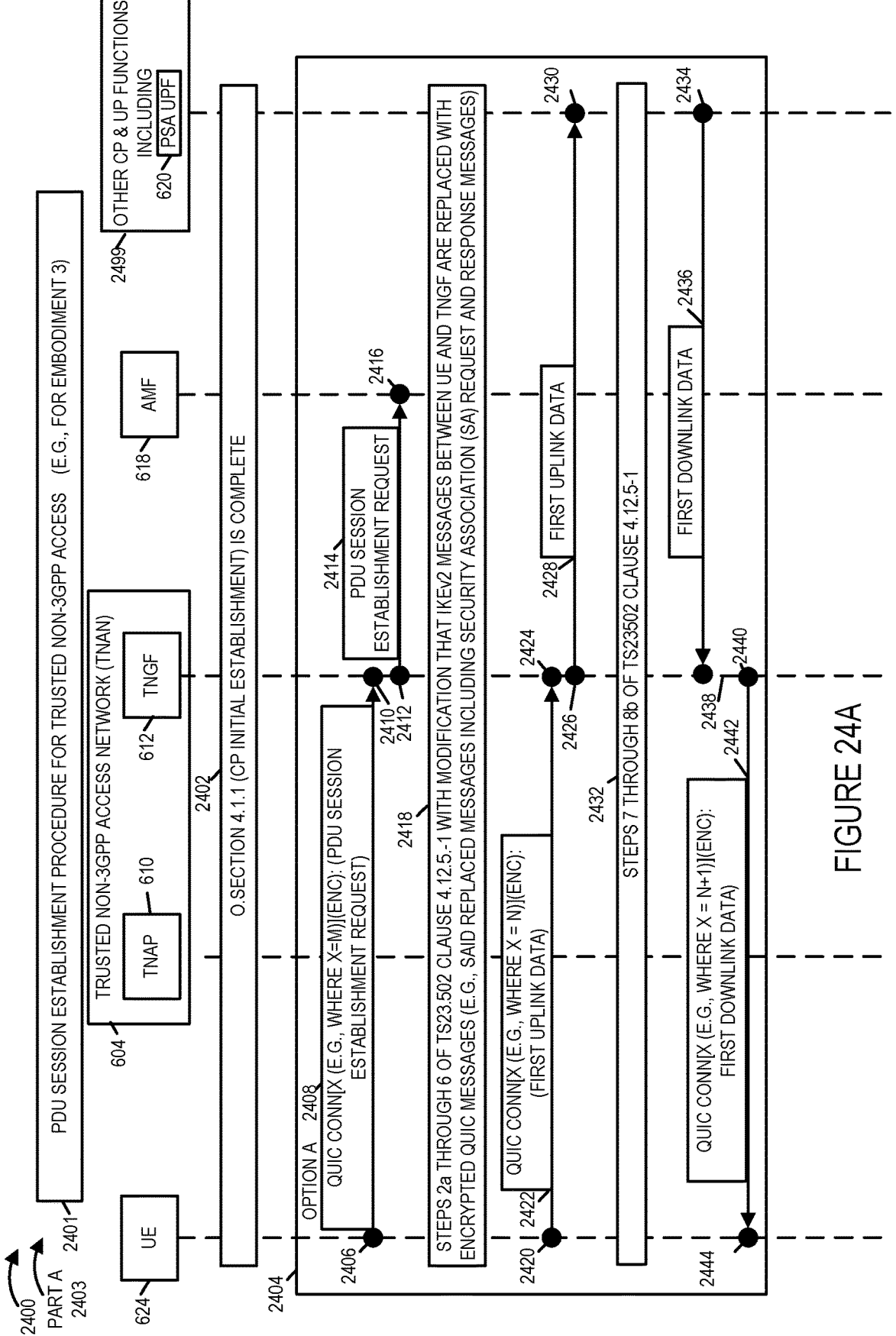
FIG. 24A is a first part of a drawing which illustrates an exemplary PDU session establishment procedure for trusted non-3GPP access, in accordance with an exemplary embodiment (e.g., Embodiment #3) of the present invention.
Figure 24B:
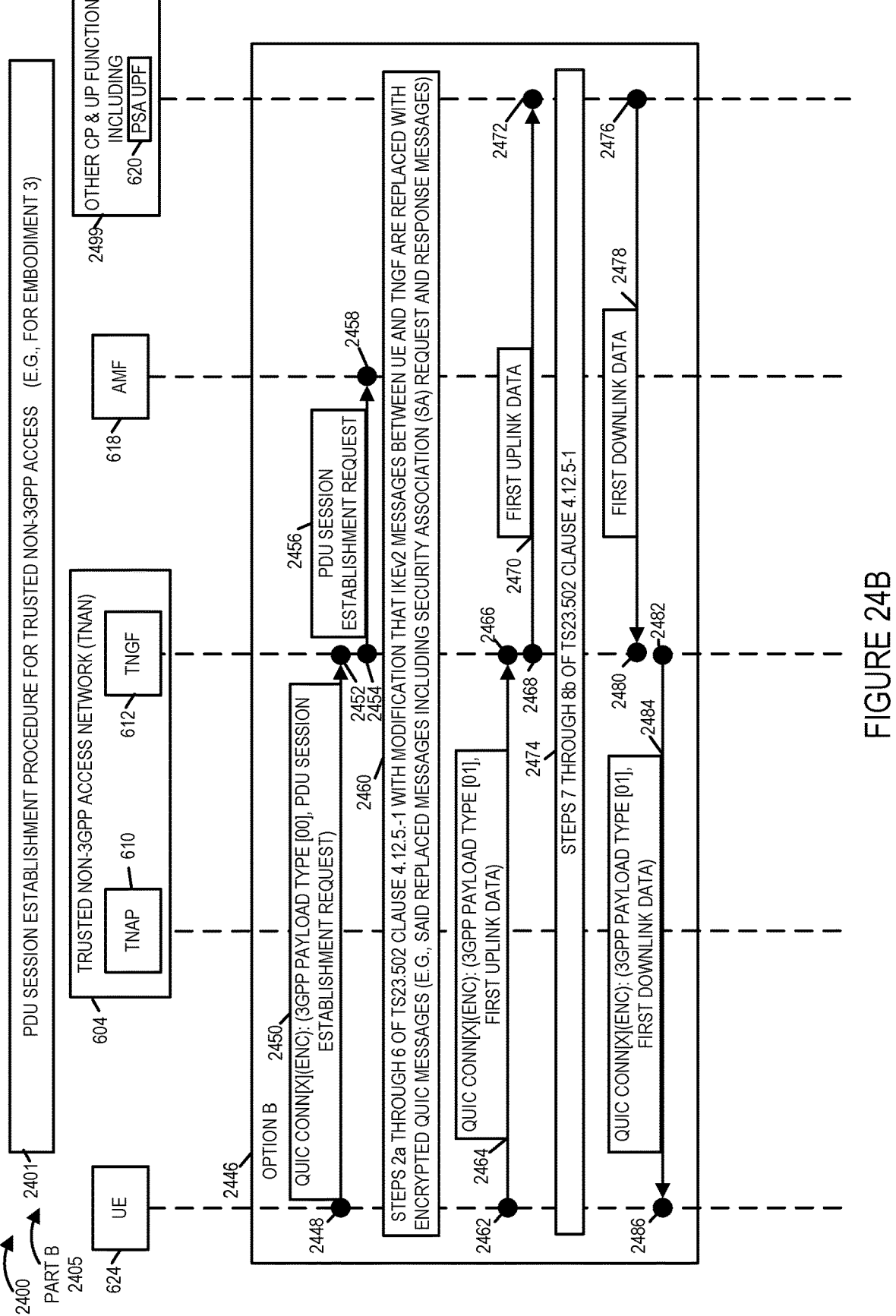
FIG. 24B is a second part of a drawing which illustrates an exemplary PDU session establishment procedure for trusted non-3GPP access, in accordance with an exemplary embodiment (e.g., Embodiment #3) of the present invention.

FIG. 24, comprising the combination of FIG. 24A and FIG. 24B, is a drawing 2400, comprising Part A 2403 and Part B 2405, which illustrates an exemplary PDU session establishment procedure for trusted non-3GPP access, as indicated in title box 2401, in accordance with an exemplary embodiment (e.g., Embodiment #3) of the present invention. Drawing 2400 includes UE 624, trusted non-3GPP access network 604 including TNAP 610 and TNGF 612, AMF 618 and other CP and UP functions 2499 including PSA UPF 620 and further includes signaling between various elements and operations performed by various elements, as part of the PDU session establishment procedure and subsequent data communications.

Information box 2402 indicates that control plane (CP) initial establishment is complete. Box 2404 includes signaling between various elements and operations performed by various elements, as part of the PDU session establishment procedure and subsequent data communications for option A (in which different sets of QUIC connection IDs are used for control plane signaling and for user plane signaling).

In step 2406 UE 624 generates and sends QUIC CONN[X (e.g., where X=M)] (Enc): (PDU Session Establishment Request) communication 2408 to TNGF 612. The value of X in communications 2408 corresponds to a QUIC connection ID value from a set of QUIC connection ID values corresponding to CP communications. In step 2410 TNGF 612 receives the QUIC communication 2408 and recovers the communicated PDU session establishment request message. In step 2412, TNGF 612 sends PDU session establishment request message 2414 to AMF 618, which receives message 2414 in step 2416 and recovers the communicated information.

In step 2418 the various elements (including elements 624, 610, 612, 618, 620) perform operations in accordance with steps 2a through 6 8b of TS 23.502 clause 4.12.5.-1 with modification that IKEv2, IPsec messages between UE and TNGF are replaced with encrypted QUIC messages (e.g., said replaced messages including security association (SA) request and response messages).

In step 2420, UE 624 generates and sends QUIC[X (e.g., where X=N)](Enc):(First Uplink Data) communication 2422 to TNGF 612. The value of X in communications 2422 corresponds to a QUIC connection ID value from a set of QUIC connection ID values corresponding to UP communications. In step 2424 TNGF 612 receives the QUIC communication 2422 and recovers the First Uplink Data. In step 2426, TNGF 612 sends message 2428 including first uplink data to PSA UPF 620, which receives message 2428 in step 2430 and recovers the first uplink data.

In step 2432 the various elements (including elements 624, 610, 612, 618, 620) perform operations in accordance with steps 7 through 8b of TS 23.502 clause 4.12.5.-1

In step 2434, PSA UPF 624 generates and sends message 2436 including first downlink data to TNGF 612. In step 2438 TNGF 612 receives message 2436 and recovers the communicated first downlink data. In step 2440, the TNGF 612 generates and sends QUIC CONN[X (e.g., where X=N+ 1)](Enc): (First Downlink Data communication 2442 to UE 624. The value of X in communications 2442 corresponds to a QUIC connection ID value from a set of QUIC connection ID values corresponding to UP communications. In step 2444 the UE 624 receives the QUIC communications 2442 and recovers the communicated First Downlink Data.

Box 2446 (see FIG. 24B) includes signaling between various elements and operations performed by various elements, as part of the PDU session establishment procedure and subsequent data communications for option B (in which a 3GPP traffic type field in a header is used to distinguish between control plane (CP) signaling and user plane (UP) signaling).

In step 2448 UE 624 generates and sends QUIC CONN [X] (Enc): (3GPP payload type [00], PDU Session Establishment Request) communication 2450 to TNGF 612. The value of [00] for the GPP payload type field in communications 2448 corresponds to control plane signaling. In step 2452 TNGF 612 receives the QUIC communication 2450 and recovers the communicated PDU session establishment request message. In step 2454, TNGF 612 sends PDU session establishment request message 2456 to AMF 618, which receives message 2456 in step 2458 and recovers the communicated information.

In step 2460 the various elements (including elements 624, 610, 612, 618, 620) perform operations in accordance with steps 2a through 6 of TS 23.502 clause 4.12.5.-1 with modification that IKEv2, IPsec messages between UE and TNGF are replaced with encrypted QUIC messages (e.g., said replaced messages including security association (SA) request and response messages).

In step 2462, UE 624 generates and sends QUIC[X](Enc): (3GPP payload type [01], First Uplink Data) communication 2464 to TNGF 612. The value of [10] for the GPP payload type field in communications 2464 corresponds to user plane data signaling. In step 2466 TNGF 612 receives the QUIC communication 2464 and recovers the First Uplink Data. In step 2468, TNGF 612 sends message 2470 including first uplink data to PSA UPF 620, which receives message 2470 in step 2472 and recovers the first uplink data.

In step 2474 the various elements (including elements 624, 610, 612, 618, 620) perform operations in accordance with steps 7 through 8b of TS 23.502 clause 4.12.5.-1.

In step 2476, PSA UPF 624 generates and sends message 2478 including first downlink data to TNGF 612. In step 2480 TNGF 612 receives message 2478 and recovers the communicated first downlink data. In step 2482, the TNGF 612 generates and sends QUIC CONN[X](Enc): (3GPP payload type [01], First Downlink Data) communication 2484 to UE 624. The value of [01] for the GPP payload type field in communications 2484 corresponds to user plane data signaling. In step 2486 the UE 624 receives the QUIC communications 2482 and recovers the communicated First Downlink Data.

In some embodiments, the value of X in each of signals 2450, 2464, and 2484 is a different value indicating a different QUIC connection ID, corresponding to the same established QUIC connection between the UE 624 and the TNGF; however, value of X does not signify whether the type of 3GPP payload traffic is control signal (control plane) traffic or data (user plane) traffic.

Embodiment #4: Implementing MASQUE to transport explicit information (i.e., NAS and UP traffic) to 5GC (i.e., AMF, SMF, & UPF) alleviating the need for N3IWF will now be described.

In Embodiment #4 MASQUE mechanisms are leveraged to communicate to 5GC without the need of TNGF or N3IWF, but this approach still allows the UE to send 3GPP control plane traffic over the non-3GPP access (i.e., non-integrated Wi-Fi AP). IN Embodiment #4 3GPP control plane NAS (i.e., N1/N2) messages can be, and are, tunneled via a MASQUE CONNECT tunnel to AMF via the UPF or directly.

Removing the N3IWF and/or TNGF requires a new mechanism for establishing a secure CP between UE and 5GC. The security credentials used to establish IPSec SAs are tied into EAP-5G protocol between UE and the Network (N3IWF, AMF, AUSF) (See, e.g., 3GPP TS 23.502, clause 4.12.2) as described previously. Embodiment #1 & Embodiment #2 replaces the use of IKEv2+IPSec by QUIC, which provides built-in transport layer security. The credentials used to establish QUIC connection between UE and 5GC can either be UICC-based or certificates (see, e.g., 3GPP TS 33.501 V18.3.0 (2023 September)). This embodiment assumes UICC based as described previously.

The same mechanism utilized in Embodiment #2 is deployed for Embodiment #4, where a secure transport link is between the UE and the Network (i.e., AMF and AUSF) although not requiring an N3IWF. Upon establishment of a secure transport link, NAS signaling can be, and is, tunneled between UE and AMF.

Embodiment #4, with regard to CP traffic will now be described.

Figure 25A:
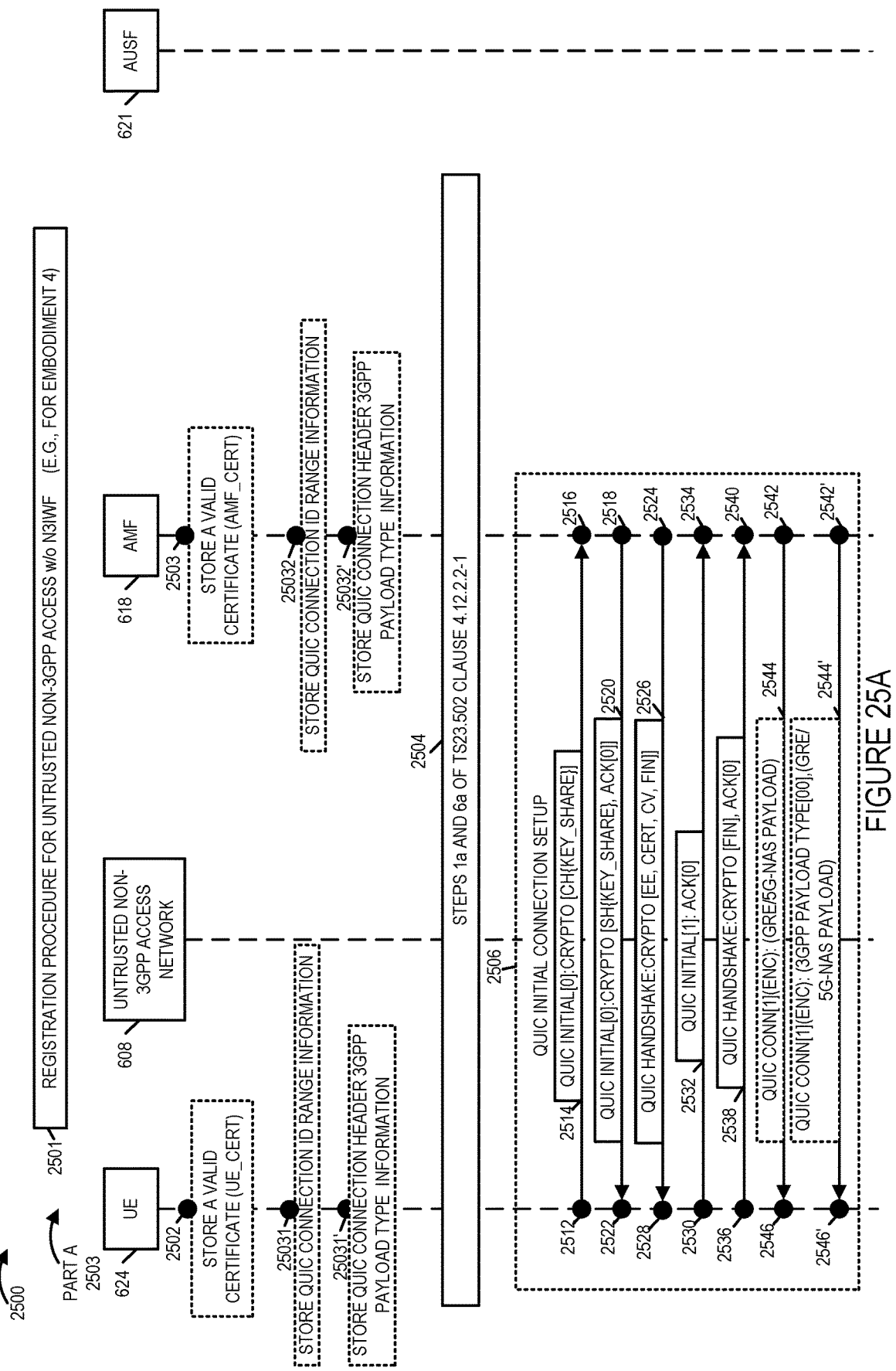
FIG. 25A is a first part of a drawing illustrating a registration procedure for untrusted non-3GPP access w/o N3IWF, in accordance with an exemplary embodiment (Embodiment #4).
Figure 25B:
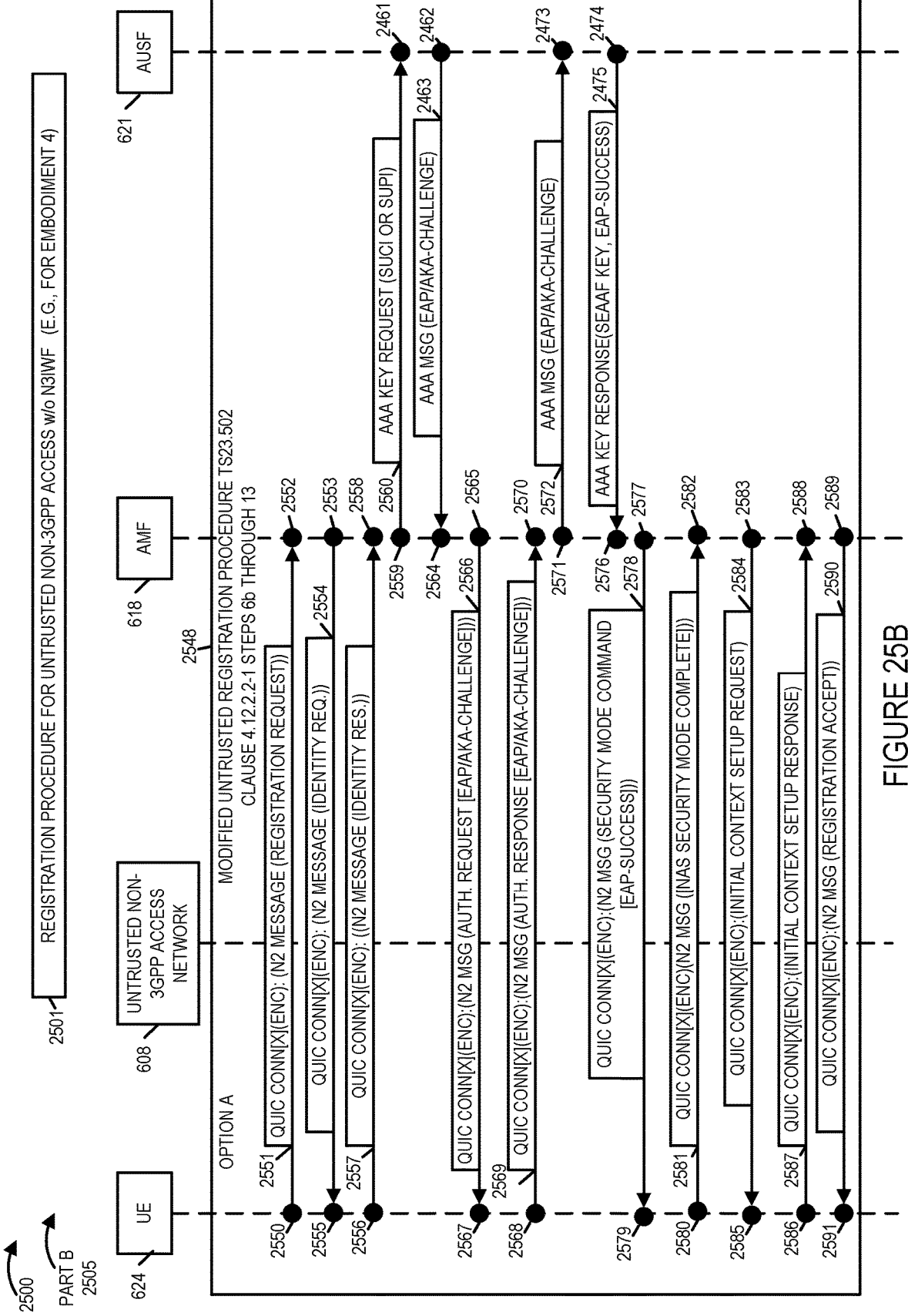
FIG. 25B is a second part of a drawing illustrating a registration procedure for untrusted non-3GPP access w/o N3IWF, in accordance with an exemplary embodiment (Embodiment #4).
Figure 25C:
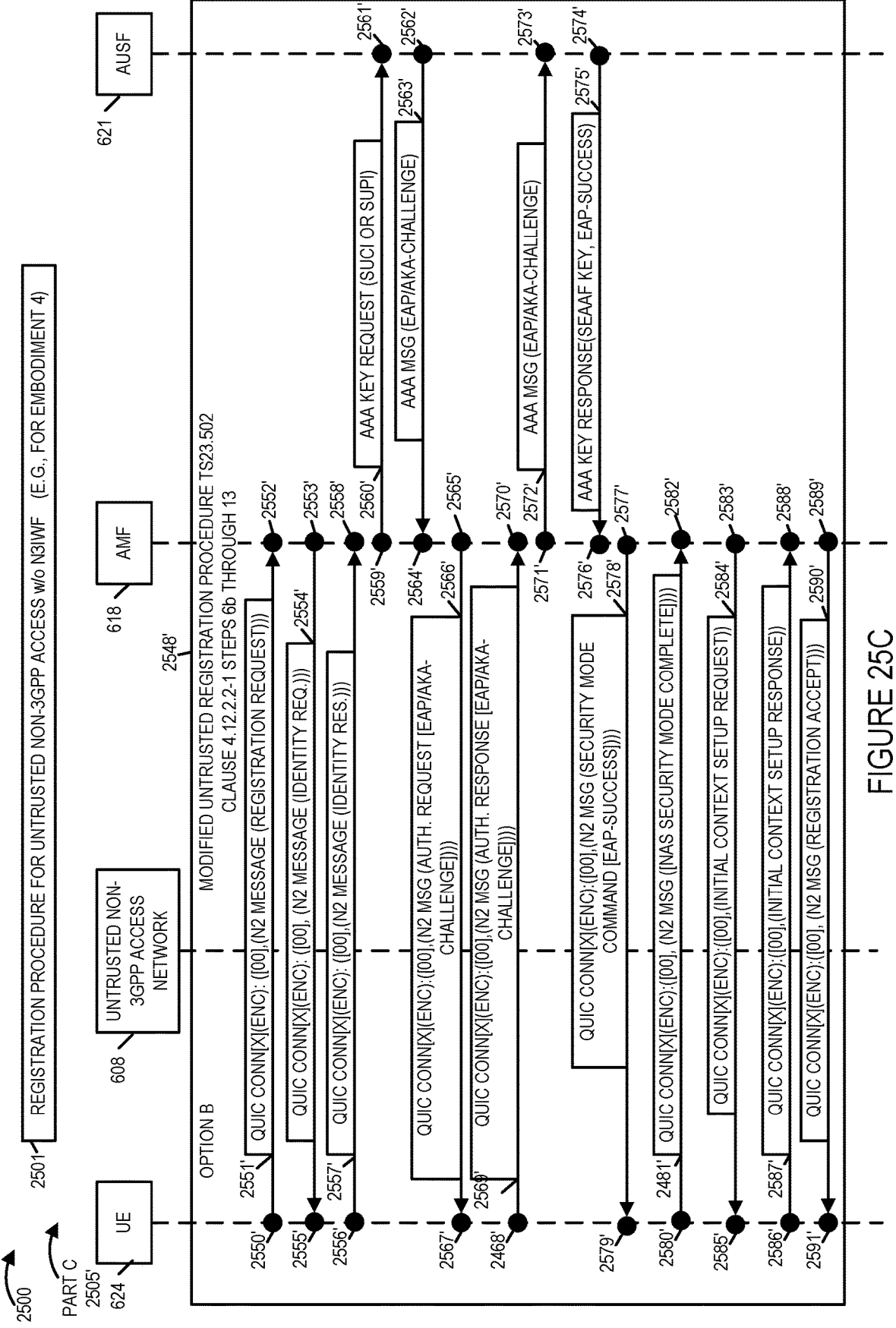
FIG. 25C is a third part of a drawing illustrating a registration procedure for untrusted non-3GPP access w/o N3IWF, in accordance with an exemplary embodiment (Embodiment #4).

FIG. 25, comprising the combination of FIG. 25A, FIG. 25B and FIG. 25C, is a drawing 2500 illustrating a registration procedure for untrusted non-3GPP access w/o N3IWF, in accordance with an exemplary embodiment (Embodiment #4). FIG. 25 is a modified version of Figure 4.12.2.2-1 of TS23.502 in which a QUIC connection is established between UE 624 and AMF 618.

A MASQUE tunnel to the AMF 618 is utilized to communicate 3GPP control plane messages to and from the UE 624 and 5GC (i.e., AMF 618).

FIG. 25, comprising the combination of FIG. 25A, FIG. 25B and FIG. 25C, is a drawing 2500, comprising the combination of Part A 2503, Part B 2505 and Part C 2505', which illustrates an exemplary registration procedure for untrusted non-3GPP access without (w/o) N3IWF in accordance with an exemplary embodiment (e.g., Embodiment #4) of the present invention. Drawing 2500 is a modified version of Figure 4.12.2.1-1 of TS 23.502, in which a QUIC connection is established between UE 624 and AMF 618, said modified version supporting encrypted QUIC messages. Drawing 2500 includes UE 624, an untrusted non-3GPP access network (WLAN) 608, e.g., a WiFi AP 614, AMF 618 and AUSF 621 and further includes signaling between various elements and operations performed by various elements, as part of the registration procedure.

In step 2502 UE 624 stores a valid certificated (UE_cert). In step 2503, AMF 618 stores a valid certificate (AMF_cert). In some embodiments, the procedure includes steps 25031 and 25032. In other embodiments, the procedure includes steps 25031' and 25032'. In step 25031 UE 624 stores QUIC connection ID range information. In step 25032 AMF 618 stores QUIC connection ID range information. In step 25031' the UE 624 stores QUIC connection header 3GPP payload type information. In step 25032' the AMF 618 stores QUIC connection header 3GPP payload type information.

In step 2504, various elements (e.g., including UE 624, untrusted non-3GPP access network 608, AMF 618 and AUSF 621) perform steps 1a and 6a of TS23.502 clause 4.12.2.2-1.

In step 2506, the UE 624 and N3IWF 616 perform a QUIC initial connection setup procedure. In step 2512 UE 624 generates and sends QUIC Initial[0]: CRYPTO [CH{key_share}] signal 2514 to AMF 618, which receives signal 2514 in step 2516 and recovers the communicated information. In step 2518 the AMF 618 generates and sends QUIC Initial[0]: CRYPTO [SH{key_share}, ACK[0]] signal 2520 to UE 624, which receives signal 2520 in step 2522 and recovers the communicated information. In step 2524 the AMF 618 generates and sends Handshake: CRYPTO [EE, CERT, CV, FIN] signal 2526 to UE 624, which receives signal 2526 in step 2528 and recovers the communicated information. In step 2530 UE 624 generates and sends QUIC Initial[1]: ACK[0] signal 2532 to AMF 618, which receives signal 2532 in step 2534 and recovers the communicated information. In step 2542 UE 624 generates and sends QUIC Handshake: CRYPTO [FIN], ACK[0] signal 2538 to AMF 618, which receives signal 2538 in step 2540 and recovers the communicated information. In some embodiments, in step 2542 the AMF 618 generates and sends QUIC CONN [1](Enc): (GRE/5G-NAS payload) signal 2544 to UE 624, which receives signal 2544 in step 2546 and recovers the communicated information. In some other embodiments, in step 2542' the AMF 618 generates and sends QUIC CONN [1](Enc): (3GPP payload type [00], (GRE/5G-NAS payload)) signal 2544' to UE 624, which receives signal 2544 in step 2546 and recovers the communicated information.

In some embodiments, option A is implemented, in which different sets of QUIC connection IDs correspond to control plane (CP) signaling and user plane (UP) signaling, and step 2548 of FIG. 25B is performed. In some other embodiments, option B is implemented, in which a 3GPP traffic type field is implemented and used to distinguish between CP signaling and UP signaling, and step 2548' of FIG. 25C is performed.

In step 2548 the various elements (624, 608, 618, 621) perform operations in accordance with steps 6b through 13 of TS 23.502 clause 4.12.2.2-1 with modification that IKEv2, IPsec messages are replaced with encrypted QUIC messages (e.g., said replaced messages including authentication request and response messages). In step 2550 UE 624 generates and sends QUIC CONN[X](Enc.): (N2 message (Registration Request)) communication signal 2551 to AMF 618 which receives signal 2551 in step 2552 and recovers the communicated information. In step 2553 AMF 618 generates and sends QUIC CONN[X](Enc.): (N2 message (Identity Request)) communication signal 2554 to UE 624 which receives the QUIC communication signal 2554 in step 2555 and recovers the communicated information. In step 2556 UE 624 generates and sends QUIC CONN[X](Enc.): (N2 message (Identity Response)) communication signal 2557 to AMF 618 which receives QUIC communication signal 2557 in step 2558 and recovers the communicated information. In step 2559 AMF 618 generates and sends (Authentication, Authorization and Accounting) AAA Key Request message 2560 to AUSF 621. AAA Key Request Message 2560 includes a Subscription Concealed Identifier (SUCI) or a (Subscription Permanent Identifier (SUPI). In step 2561 AUSF receives the AAA Key Request message 2560 and recovers the communicated information. In step 2462 the AUSF 621 generates and sends AAA message 2563 to AMF 618. AAA message 2563 includes an EAP/AKA challenge. In step 2564 the AMF 618 receives the AAA message 2563 and recovers the communicated information. In step 2565 the AMF 618 generates and sends QUIC CONN[X](Enc.): (N2 message (Authentication request [EAP/AKA-challenge])) communication signal 2566 to UE 624, which receives the QUIC communication signal 2566 in step 2567 and recovers the communicated information. In step 2568 the UE 624 generates and sends QUIC CONN [X](Enc.): (N2 message (Authentication response [EAP/

AKA-challenge])) communication signal 2569 to AMF 618, which receives the QUIC communication signal 2569 in step 2570 and recovers the communicated information. In step 2572 AMF 618 generates and sends AAA message 2472 to AUSF 621. AAA message 2272 includes EAP/AKA-challenge. In step 2573 AUSF 621 receives the AAA Key message 2572 and recovers the communicated information. In step 2474 AUSF 621 generates and sends AAA Key response message 2575 to AMF 618. The AAA Key response message 2574 includes a SEAAF key and an EAP-Success indicator. In step 2576 the AMF 618 receives AAA Key response message 2475 and recovers the communicated information. In step 2577 AMF 618 generates and sends QUIC CONN[X] (Enc.): (N2 message (security mode command [EAP-success])) communication signal 2578 to UE 624, which receives the QUIC communication signal 2578 in step 2579 and recovers the communicated information. In step 2580 UE 624 generates and sends QUIC CONN[X](Enc.): (N2 message (security mode complete)) communication signal 2581 to AMF 618 which receives the QUIC communication signal 2581 in step 2582 and recovers the communicated information. In step 2583 AMF 618 generates and sends QUIC CONN[X] (Enc.):(Initial context setup request) communication signal 2584 to UE 624, which receives the QUIC communication signal 2584 in step 2585 and recovers the communicated information. In step 2586 UE 624 generates and sends QUIC CONN[X](Enc.): (Initial Context Setup response) communication signal 2587 to AMF 618 624 which receives the QUIC communication signal 2587 in step 2588 and recovers the communicated information. In step 2589 AMF 618 generates and sends QUIC CONN[X](Enc.): (N2 message (Registration Accept) communication signal 2590 to UE 624, which receives QUIC communication signal 2590 in step 2591 and recovers the communicated information.

In step 2548' the various elements (624, 608, 618, 621) perform operations in accordance with steps 6b through 13 of TS 23.502 clause 4.12.2.2-1 with modification that IKEv2, IPsec messages are replaced with encrypted QUIC messages (e.g., said replaced messages including authentication request and response messages). In step 2550' UE 624 generates and sends QUIC CONN[X](Enc.): ([00], (N2 message (Registration Request))) communication signal 2551' to AMF 618 which receives signal 2551' in step 2552' and recovers the communicated information. In step 2553' AMF 618 generates and sends QUIC CONN[X](Enc.): ([00], (N2 message (Identity Request))) communication signal 2554' to UE 624 which receives the QUIC communication signal 2554' in step 2555' and recovers the communicated information. In step 2556' UE 624 generates and sends QUIC CONN[X](Enc.): ([00], (N2 message (Identity Response))) communication signal 2557' to AMF 618 which receives QUIC communication signal 2557' in step 2558' and recovers the communicated information. In step 2559' AMF 618 generates and sends (Authentication, Authorization and Accounting) AAA Key Request message 2560' to AUSF 621. AAA Key Request Message 2560' includes a Subscription Concealed Identifier (SUCI) or a (Subscription Permanent Identifier (SUPI). In step 2461' AUSF receives the AAA Key Request message 2560' and recovers the communicated information. In step 2562' the AUSF 621 generates and sends AAA message 2563' to AMF 618. AAA message 2463' includes an EAP/AKA challenge. In step 2564' the AMF 618 receives the AAA message 2563' and recovers the communicated information. In step 2565' the AMF 618 generates and sends QUIC CONN[X](Enc.): ([00], (N2 message (Authentication request [EAP/AKA-challenge]))) communication signal 2566' to UE 624, which receives the QUIC communication signal 2566' in step 2567' and recovers the communicated information. In step 2568' the UE 624 generates and sends QUIC CONN[X](Enc.): ([00], (N2 message (Authentication response [EAP/AKA-challenge]))) communication signal 2569' to AMF 618, which receives the QUIC communication signal 2569' in step 2570' and recovers the communicated information. In step 2572' AMF 618 generates and sends AAA message 2572' to AUSF 621. AAA message 2572' includes EAP/AKA-challenge. In step 2573' AUSF 621 receives the AAA Key message 2572' and recovers the communicated information. In step 2574' AUSF 621 generates and sends AAA Key response message 2575' to AMF 618. The AAA Key response message 2574' includes a SEAAF key and an EAP-Success indicator. In step 2576' the AMF 618 receives AAA Key response message 2475' and recovers the communicated information. In step 2577' AMF 618 generates and sends QUIC CONN[X] (Enc.):([00], (N2 message (security mode command [EAP-success]))) communication signal 2578' to UE 624, which receives the QUIC communication signal 2578' in step 2579' and recovers the communicated information. In step 2580' UE 624 generates and sends QUIC CONN[X](Enc.):([00], (N2 message (security mode complete]))) communication signal 2581' to AMF 618 which receives the QUIC communication signal 2581' in step 2582' and recovers the communicated information. In step 2583' AMF 618 generates and sends QUIC CONN[X] (Enc.):([00], Initial context setup request) communication signal 2584' to UE 624, which receives the QUIC communication signal 2584' in step 2585' and recovers the communicated information. In step 2586' UE 624 generates and sends QUIC CONN[X](Enc.):([00], Initial Context Setup response) communication signal 2587' to AMF 618 624 which receives the QUIC communication signal 2587' in step 2588' and recovers the communicated information. In step 2589' AMF 618 generates and sends QUIC CONN[X] (Enc.): ([00], (N2 message (Registration Accept))) communication signal 2590' to UE 624, which receives QUIC communication signal 2590' in step 2591' and recovers the communicated information.

Figure 26:
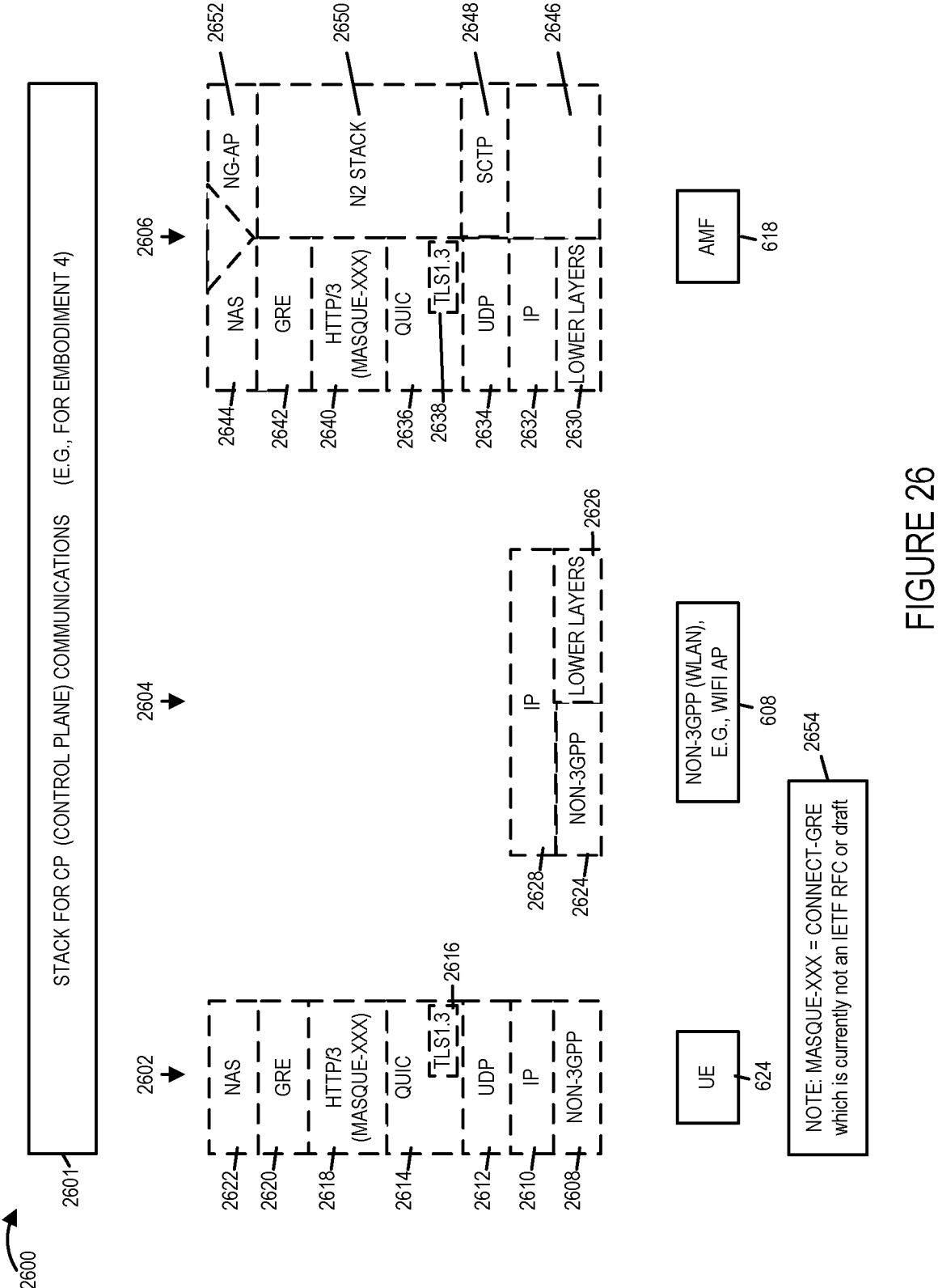
FIG. 26 is a drawing illustrating stack for CP (control plane) communications for Embodiment #4.

FIG. 26 is a drawing 2600 illustrating stack for CP (control plane) communications for Embodiment #4. Drawing 2600 includes drawing title 2601, the stack configuration 2602 for UE 624, the stack configuration 2604 for a non-3GPP (WLAN) 608, e.g., a WiFi AP, and the stack configuration 2606 for AMF 618.

UE stack 2602 includes a NAS layer 2622, a GRE layer 2620, a HTTP/3 layer 2618, a QUIC layer 2614 using TLS 1.3 2616, a UDP layer 2612, an IP layer 2610, and a non-3GPP layer 2608, as shown. Non-3GPP (WLAN), e.g., WiFi AP, stack 2604 includes an IP layer 2628, a non-3GPP layer 2624 and lower layers 2626, as shown. AMF stack 2606 includes a NAS layer 2644, a GRE layer 2642, a HTTP/3 layer 2640, a QUIC layer 2636 using TLS 1.3 2638, a UDP layer 2634, an IP layer 2632, lower layers 2630, NG-AP layer 2652, N2 stack 2650, an SCTP layer 2648 and layer 2646 as shown. Note: MASQUE-XXX=CONNECT-GRE, as indicated in box 2654, which is a new feature in accordance with the present invention and is currently not an IETF RFC or draft.

Embodiment #4, with regard to user plane (UP) traffic will now be described.

A MASQUE tunnel to the UPF is utilized to communicate 3GPP user plane messages to and from the UE (e.g., UE 624) and 5GC (i.e., UPF (e.g., PSA UPF 620)).

Figure 27:
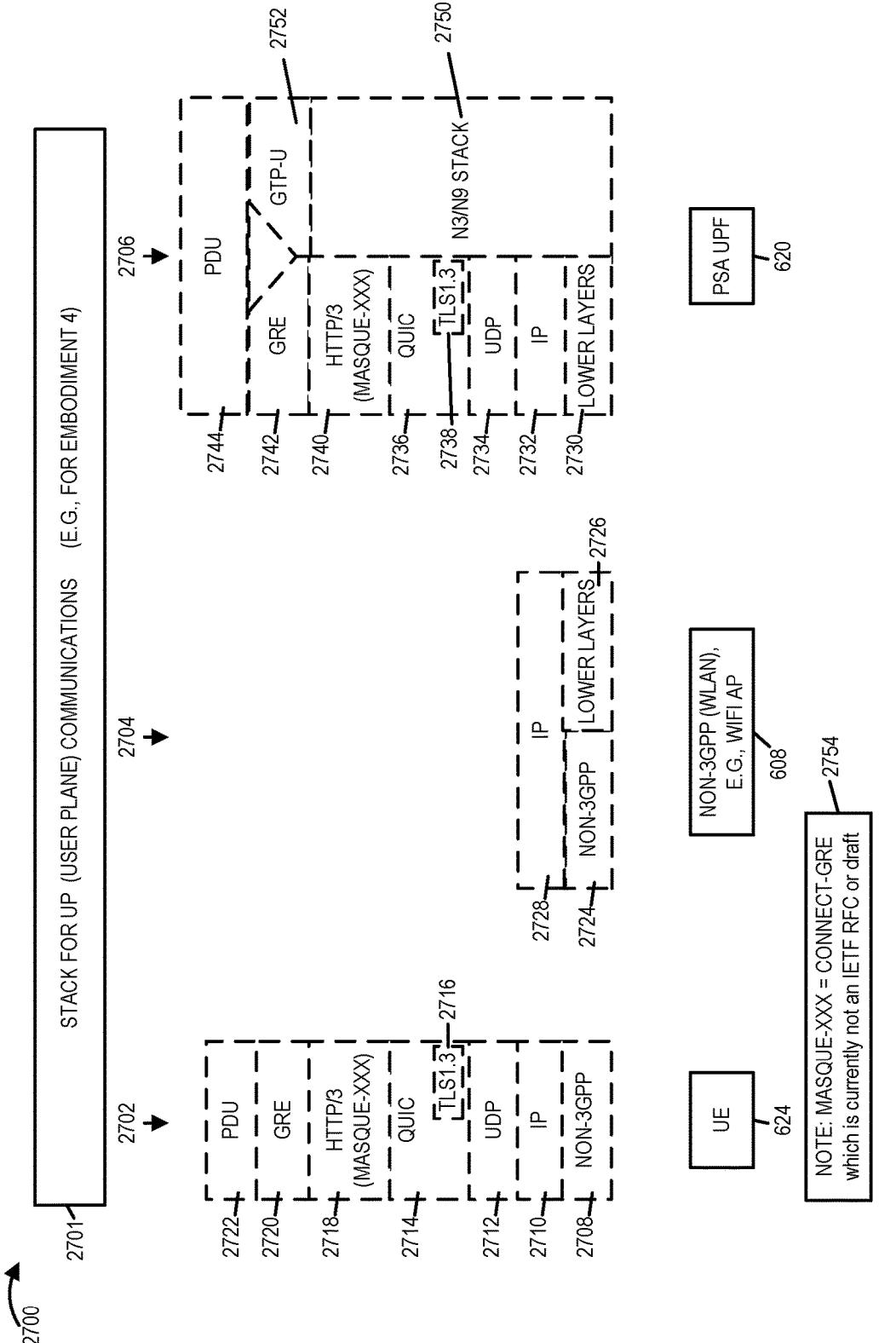
FIG. 27 is a drawing illustrating stack for UP (user plane) communications for Embodiment #4.

FIG. 27 is a drawing 2700 illustrating stack for UP (user plane) communications for Embodiment #4. Drawing 2700 includes drawing title 2701, the stack configuration 2702 for UE 624, the stack configuration 2704 for non-3GPP WLAN 608, e.g., a WiFi AP, and the stack configuration 2706 for PSA UPF 620.

UE stack 2702 includes a PDU layer 2722, a GRE layer 2720, a HTTP/3 layer 2718, a QUIC layer 2714 using TLS 1.3 2716, a UDP layer 2712, an IP layer 2710 and a non-3GPP layer 2708, as shown. Non-3GPP WLAN, e.g., WiFi AP, stack 2704 includes an IP layer 2728, a non-3GPP layer 2724 and lower layers 2726, as shown. Non-3GPP WLAN stack 2704 includes a PDU layer 2744, a GRE layer 2742, a HTTP/3 layer 2740, a QUIC layer 2736 using TLS 1.3 2738, a UDP layer 2734, an IP layer 2732, lower layers 2730, a GTP-U layer 2752, and N3/N9 stack 2750, as shown. Note: MASQUE-XXX=CONNECT-GRE, as indicated by block 2754, is a new feature, which currently is not an IETF RFC or draft.

Figure 28:
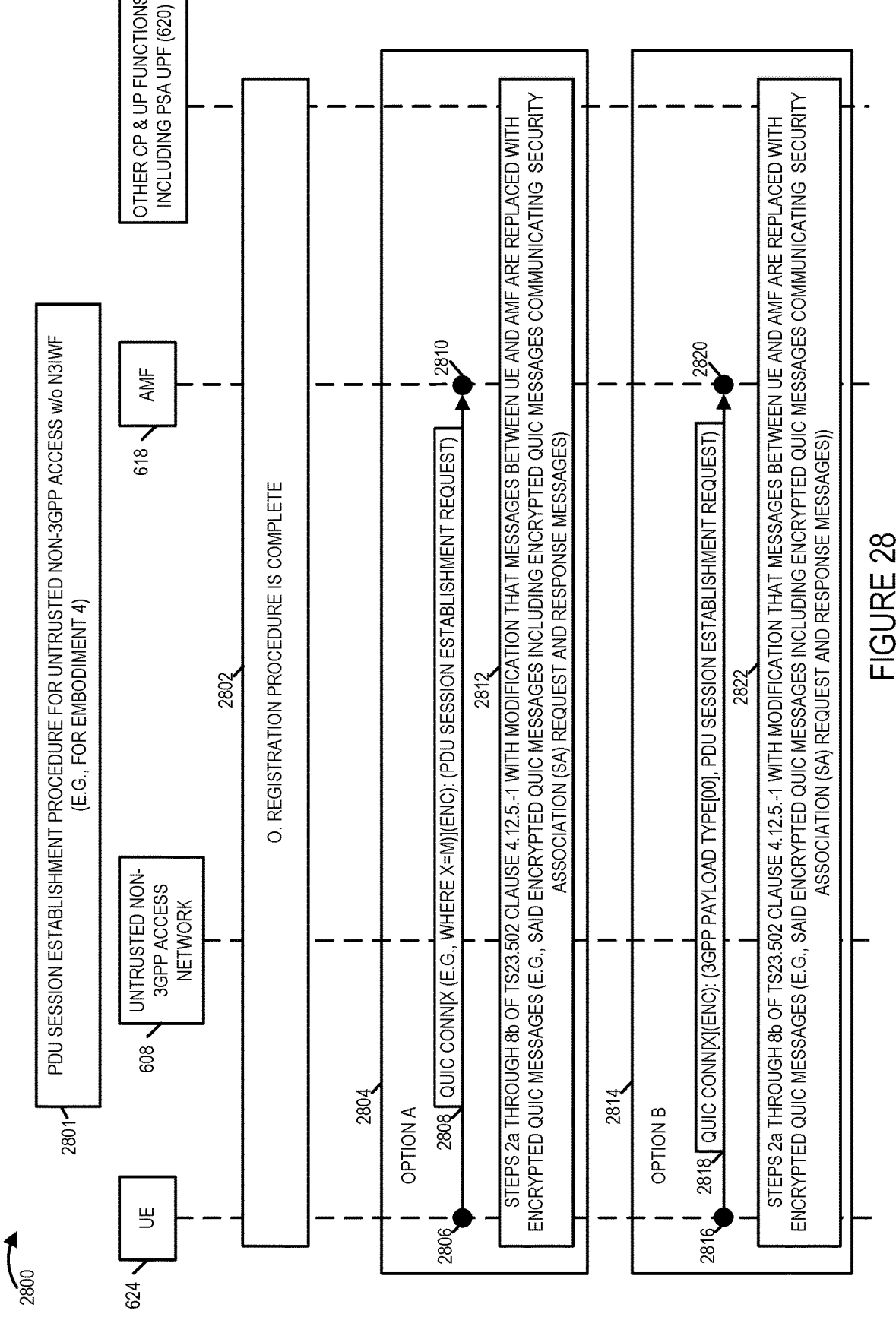
FIG. 28 is a signaling diagram illustrating a PDU session establishment procedure for untrusted Non-3GPP access w/o N3IWF for Embodiment #4.

FIG. 28 is a signaling diagram 2800 illustrating a PDU session establishment procedure for untrusted Non-3GPP access w/o N3IWF in accordance with an exemplary embodiment, e.g., for Embodiment #4. Block 2802 indicates that registration procedure is complete for UE 624, which has performed registration with the 5G core via untrusted non-3GPP access network 608.

In step 2804, various elements including UE 624, untrusted non-3GPP access network 608, AMF 618 and other control plane (CP) and user plane (UP) functions including PSA UPF 620, perform operations including a PDU session establishment procedure, with regard to UE 624, for untrusted non-3GPP access, via untrusted 3GPP access network 608, w/o a N3IWF. In step 2804, option A, is implemented, in which different sets of QUIC connection identifiers are used to distinguish between control plane traffic and user plane traffic. In step 2806, UE 624 generates and sends QUIC CONN [X (e.g., where X=M)] (Enc): (PDU session establishment request) communication signal 2808 to AMF 618. The value of X indicates the QUIC connection ID being used for the communication of the encrypted PDU session establishment request over the QUIC connection, which has been previously established between UE 624 and AMF 618. In this example, M is one of the values which correspond to the set of values designated to be used for control plane (CP) 3GPP traffic type. In step 2810 AMF 618 receives the QUIC communication signal 2808 conveying the encrypted PDU session establishment request and recovers the communicated information.

In step 2812, various elements including UE 624, untrusted non-3GPP access network 608, AMF 618 and other control plane (CP) and user plane (UP) functions including PSA UPF 620, perform operations including steps 2a through 8b of TS23.502 clause 4.12.5.-1 with modification that messages between UE and AMF are replaced with encrypted QUIC messages (e.g., said encrypted QUIC messages including encrypted QUIC messages communicating security association (SA) request and response messages.)

In step 2814, which is an alternative to step 2804, various elements including UE 624, untrusted non-3GPP access network 608, AMF 618 and other control plane (CP) and user plane (UP) functions including PSA UPF 620, perform operations including a PDU session establishment procedure, with regard to UE 624, for untrusted non-3GPP access, via untrusted 3GPP access network 608, w/o a N3IWF. In step 2814, option B, is implemented, in which a 3GPP payload type field is included and used to distinguish between control plane traffic and user plane traffic. In step 2816, UE 624 generates and sends QUIC CONN [X] (Enc): (3GPP payload type [00], PDU session establishment request) communication signal 2818 to AMF 618. The value of X indicates the QUIC connection ID being used for the communication of the encrypted PDU session establishment request over the QUIC connection, which has been previously established between UE 624 and AMF 618. The value of 3GPP Payload type field, which is 00, corresponds to control plane (CP) type traffic, which indicates that the payload, which is the PDU session establishment request is classified as CP type traffic. In step 2820 the AMF 618 receives the QUIC communication signal 2818 conveying the encrypted PDU session establishment request and recovers the communicated information.

In step 2822, various elements including UE 624, untrusted non-3GPP access network 608, AMF 618 and other control plane (CP) and user plane (UP) functions including PSA UPF 620, perform operations including steps 2a through 8b of TS23.502 clause 4.12.5.-1 with modification that messages between UE and AMF are replaced with encrypted QUIC messages (e.g., said encrypted QUIC messages including encrypted QUIC messages communicating security association (SA) request and response messages.)

Figure 29:
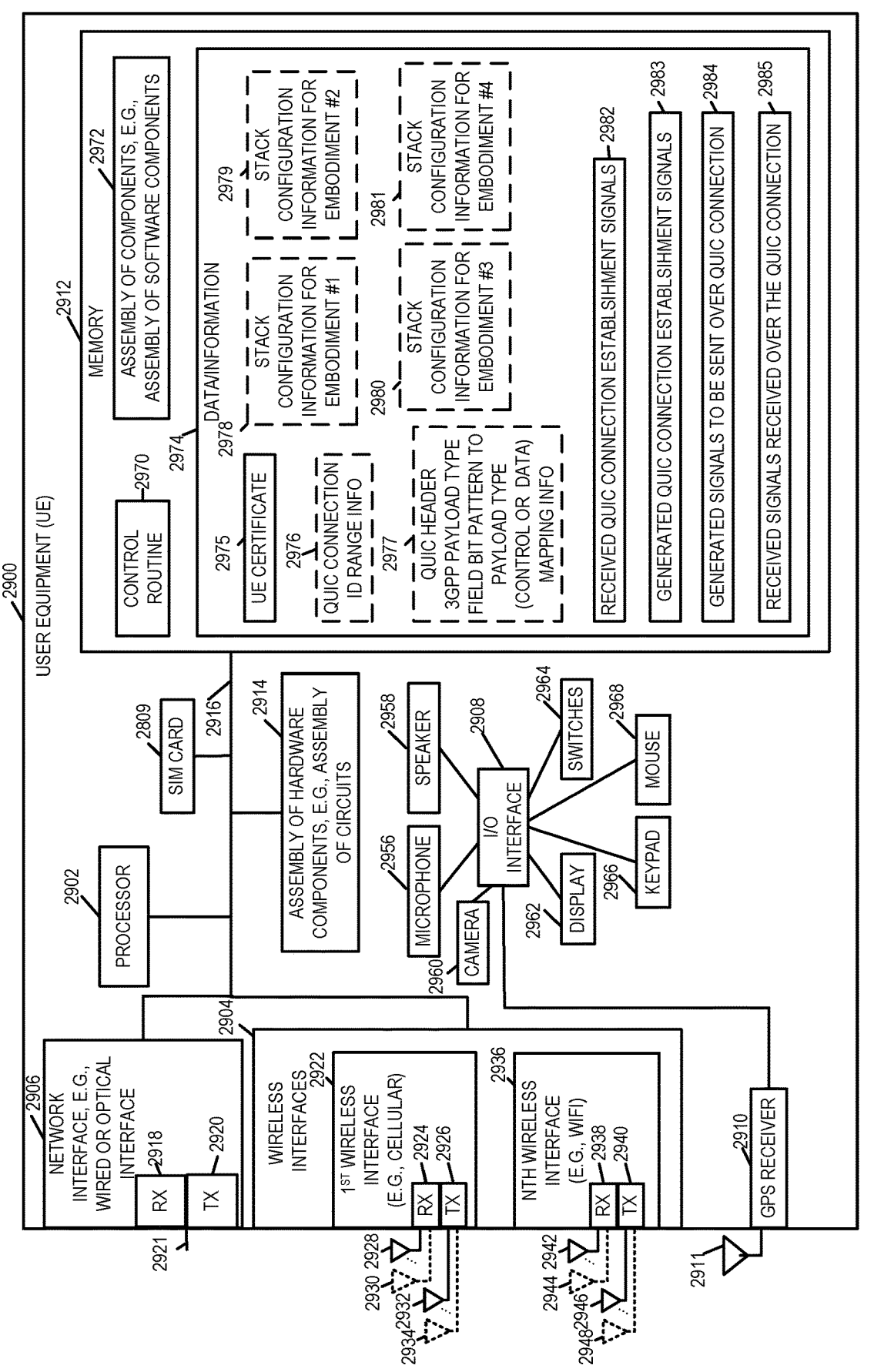
FIG. 29 is a drawing of an exemplary user equipment (UE) device in accordance with an exemplary embodiment.

FIG. 29 is a drawing of an exemplary user equipment (UE) device 2900 in accordance with an exemplary embodiment. Exemplary UE 2900 is, e.g., UE 624 or UE 626 of system 600 of FIG. 4.

Exemplary UE 2900 includes processor 2902, e.g., a CPU, wireless interfaces 2904, network interface 2906, I/O interface 2908, subscriber identity module (SIM) card 2909, GPS receiver 2910, memory 2912, and assembly of hardware components 2914, e.g., an assembly of circuits, coupled together via bus 2916 over which the various elements may interchange data and information.

Wireless interfaces 2904 includes a plurality of wireless interfaces (1st wireless interface 2922, e.g., a cellular wireless interface, . . . , Nth wireless interface 2936, e.g., a WiFi wireless interface). 1st wireless interface 2922 includes wireless receiver 2924 and wireless transmitter 2926. Wireless receiver 2924 is coupled to one or more receive antennas or receive antenna elements (2928, . . . , 2930) via which UE 2900 receives wireless signals from cellular base stations, e.g., gNBs. Wireless transmitter 2926 is coupled to one or more transmit antennas or transmit antenna elements (2932, . . . , 2934) via which UE 2900 transmits wireless signals to cellular base stations, e.g., gNBs. In some embodiment, the same antennas or antenna elements are used for both reception and transmission to a cellular base station.

Nth wireless interface 2936 includes wireless receiver 2938 and wireless transmitter 2940. Wireless receiver 2938 is coupled to one or more receive antennas or receive antenna elements (2942, . . . , 2944) via which UE 2900 receives wireless signals from access points, e.g., WiFi access points. Wireless transmitter 2940 is coupled to one or more transmit antennas or transmit antenna elements (2946, . . . , 2948) via which UE 2900 transmits wireless signals to access points, e.g., WiFi access points. In some embodiment, the same antennas or antenna elements are used for both reception and transmission to a WiFi access point.

Network interface 2906, e.g., a wired or optical interface, includes receiver 2918, transmitter 2920 and connector 2921. UE 2900 may, and sometime does, communicate with network nodes, e.g., a wireline access network device, via network interface 2906, when the UE 2900 is located at a site in which a wireline connection is available, and the UE is stationary and able to connect via a wireline connection.

SIM card 2909 stores subscriber information corresponding to the subscriber of UE 2900. GSP receiver 2910 is coupled to GSP antenna 2911, via which the UE 2900 receives GPS signals. GPS receiver 2910 processes received GPS signals to determine time, position information, e.g., latitude, longitude and altitude, and velocity information. In some embodiments, the GPS receiver 2910 also performs navigation functions based on the received GPS signals and/or additional information, e.g., gyroscope and accelerometer output information, e.g., from an inertial measurement unit (IMU) on a chip included in the UE 2900.

UE 2900 further includes a plurality of I/O devices (microphone 2956, speaker 2958, camera 2960, display 2962, e.g., a touchscreen display, switches 2964, keypad 2966 and mouse 2968, coupled to I/O interface 2908, via which the various I/O devices may communicate with other elements within UE 2900.

Memory 2912 includes control routine 2970, assembly of components 2972 and data/information 2974. Control routine 2970 includes instructions, which when executed by processor 2902, controls the UE 2900 to perform basic device operational functions such as, e.g., controlling the wireless interfaces 2904, controlling the network interface 2906, controlling the various I/O devices, accessing memory 2912, storing in memory 2912, etc. Assembly of components 2972, e.g., an assembly of software components, includes instructions, which when executed by processor 2902 control the UE 2900 to implement steps of a method, e.g., steps of the methods of one or more or all of signaling diagrams of FIG. 9, FIG. 13, FIG. 18, FIG. 24, FIG. 25 and/or FIG. 28, which are performed by a UE device.

Data/information 2974 includes a UE certificate 2974, QUIC connection ID range information 2976, QUIC header 3GPP payload type field bit pattern to payload type (control or data) mapping information 2977, stack configuration information for Embodiment #1 2978, stack configuration information for Embodiment #2 2979, stack configuration information for Embodiment #3 2980, and stack configuration information for Embodiment #4 2981. Data/information 2974 further includes received QUIC connection establishment signals 2982, generated QUIC connection establishment signals 2983, generated signals to be sent over the QUIC connection 2984, and received signals which were received over the QUIC connection 2985.

Figure 30:
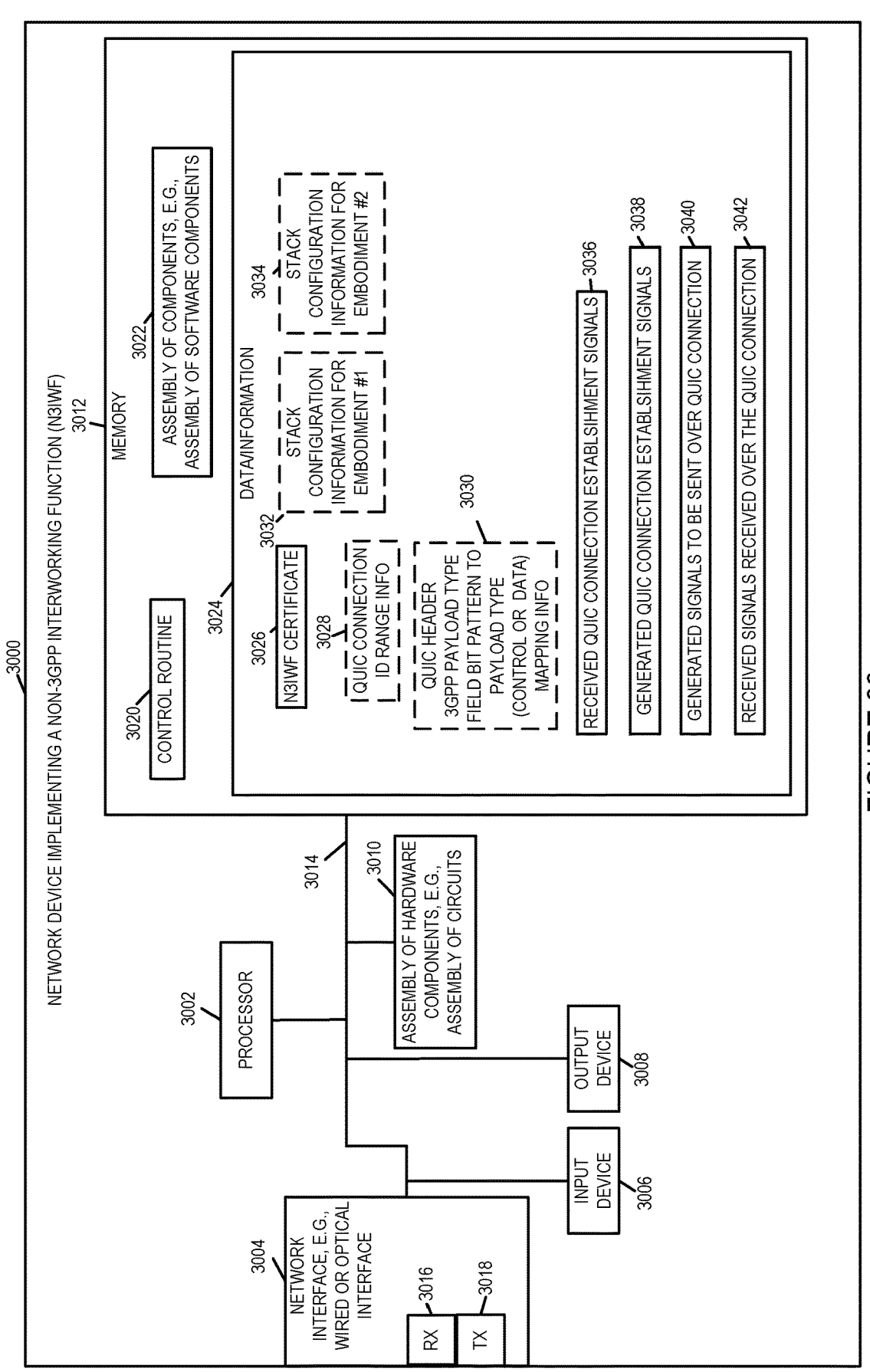
FIG. 30 is a drawing of an exemplary network device implementing a non-3GPP interworking function (N3IWF) in accordance with an exemplary embodiment.

FIG. 30 is a drawing of an exemplary network device 3000 implementing a non-3GPP interworking function (N3IWF) in accordance with an exemplary embodiment. Exemplary network device 3000 implementing a N3IWF is, e.g., N3IWF 616 shown in system 600 of FIG. 4 signaling diagrams of FIG. 9 and FIG. 13. Network device 3000 includes a processor 3002, e.g., a CPU, a network interface 3004, an input device 3006, e.g., a keyboard or mouse, an output device 3008, e.g., a display, an assembly of hardware components 3010, e.g., an assembly of circuits, and memory 3012 coupled together via a bus 3014 over which the various elements may interchange data and information.

Network interface 3004, e.g., a wired or optical interface, includes a receiver 3016 and a transmitter 3018, via which the network device 3000 implementing the N3IWF may communicate with other devices. Network device 3000 implementing the N3IWF receives signals including messages from other devices via receiver 3016. Network device 3000 implementing the N3IWF sends signals including messages to other devices via transmitter 3018.

Memory 3012 includes a control routine 3020, an assembly of components 3022, e.g., an assembly of software components, and data/information 3024. Control routine 3020 includes instructions, which when executed by processor 3002 controls the network device 3000 implementing the N3IWF to perform basic device operational functions such as, e.g., controlling the network interface 3004, accessing memory 3012, storing in memory 3010, etc. Assembly of components 3022, e.g., an assembly of software components, includes instructions, which when executed by processor 3002 control the network device 3000 implementing the N3IWF to implement steps of a method, e.g., steps of the methods of one or more or all of signaling diagrams of FIG. 9 and/or FIG. 13 which are performed by a N3IWF.

Data/information 3024 includes a N3IWF certificate 3026, QUIC connection ID range information 3028, QUIC header 3GPP payload type field bit pattern to payload type (control or data) mapping information 3030, stack configuration information for Embodiment #1 3032, and stack configuration information for Embodiment #2 3034, Data/information 3024 further includes received QUIC connection establishment signals 3035, generated QUIC connection establishment signals 3038, generated signals to be sent over the QUIC connection 3040, and received signals which were received over the QUIC connection 3042.

Figure 31:
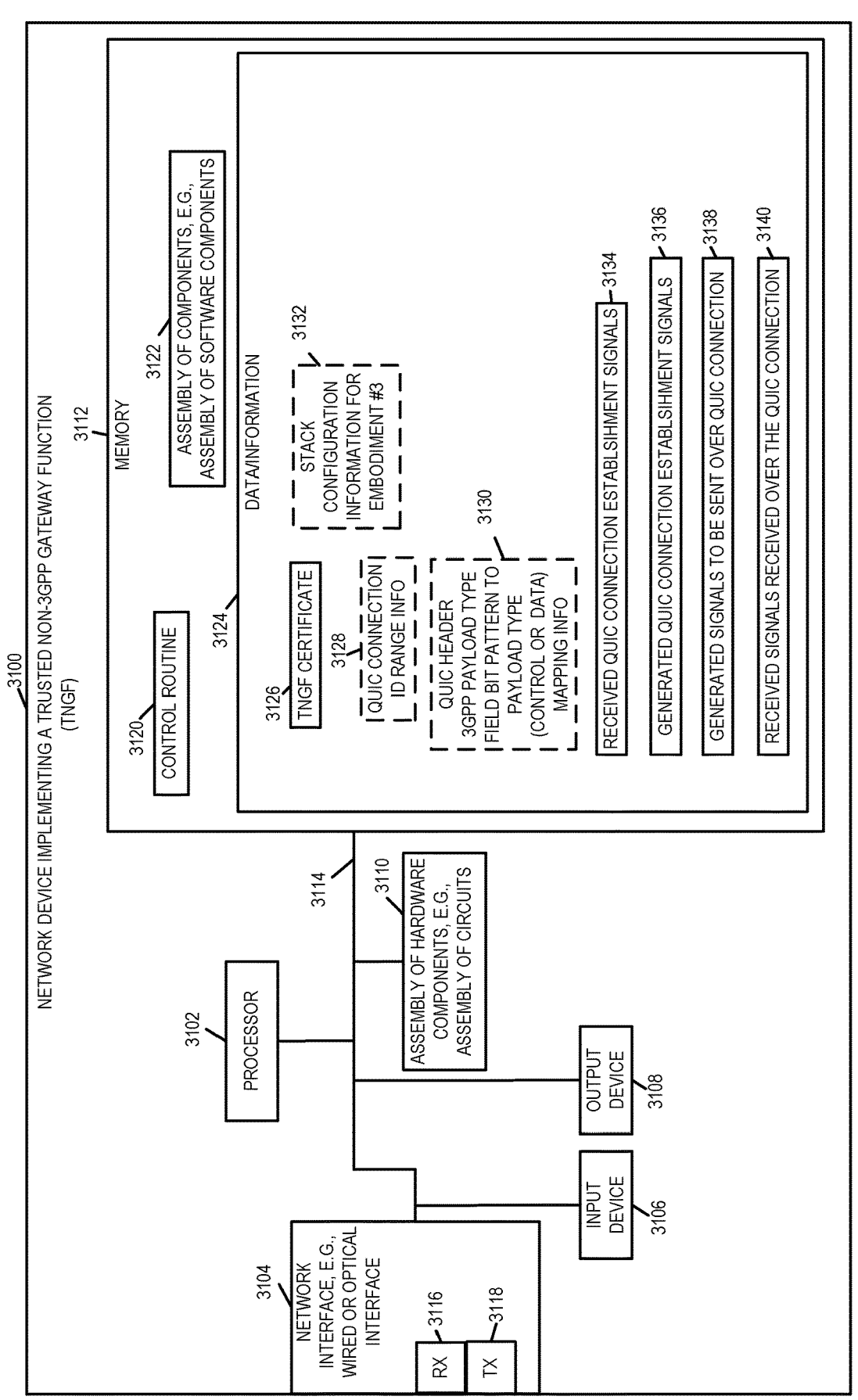
FIG. 31 is a drawing of an exemplary network device implementing a trusted non-3GPP gateway function (TNGF) in accordance with an exemplary embodiment.

FIG. 31 is a drawing of an exemplary network device 3100 implementing a trusted non-3GPP gateway function (TNGF) in accordance with an exemplary embodiment. Exemplary network device 3100 implementing a TNGF is, e.g., TNGF 616 shown in system 600 of FIG. 4 signaling diagrams of FIG. 18 and FIG. 24. Network device 3100 includes a processor 3102, e.g., a CPU, a network interface 3104, an input device 3106, e.g., a keyboard or mouse, an output device 3108, e.g., a display, an assembly of hardware components 3110, e.g., an assembly of circuits, and memory 3112 coupled together via a bus 3114 over which the various elements may interchange data and information.

Network interface 3104, e.g., a wired or optical interface, includes a receiver 3116 and a transmitter 3118, via which the network device 3100 implementing the TNGF may communicate with other devices. Network device 3100 implementing the TNGF receives signals including messages from other devices via receiver 3116. Network device 3100 implementing the TNGF sends signals including messages to other devices via transmitter 3118.

Memory 3112 includes a control routine 3120, an assembly of components 3122, e.g., an assembly of software components, and data/information 3124. Control routine 3120 includes instructions, which when executed by processor 3102 controls the network device 3100 implementing the TNGF to perform basic device operational functions such as, e.g., controlling the network interface 3104, accessing memory 3112, storing in memory 3110, etc. Assembly of components 3122, e.g., an assembly of software components, includes instructions, which when executed by processor 3102 control the network device 3100 implementing the N3IWF to implement steps of a method, e.g., steps of the methods of one or more or all of signaling diagrams of FIG. 18 and/or FIG. 24 which are performed by a TNGF.

Data/information 3124 includes a TNGF certificate 3126, QUIC connection ID range information 3128, QUIC header 3GPP payload type field bit pattern to payload type (control or data) mapping information 3130, and stack configuration information for Embodiment #3 3132. Data/information 3124 further includes received QUIC connection establishment signals 3134, generated QUIC connection establishment signals 3136, generated signals to be sent over the QUIC connection 3138, and received signals which were received over the QUIC connection 3140.

Figure 32:
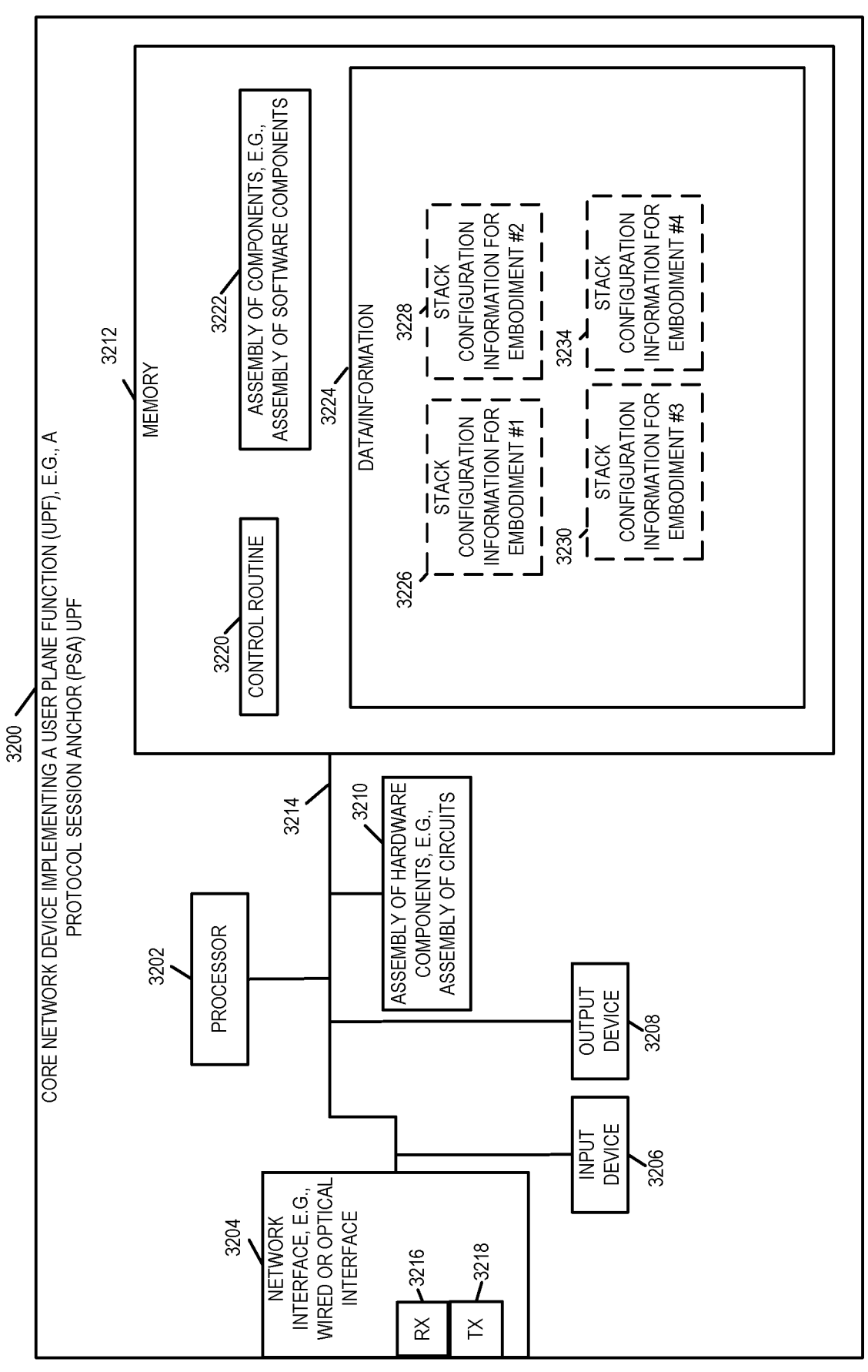
FIG. 32 is a drawing of an exemplary core network device implementing a user plane function (UPF), e.g., a PSA UPF, in accordance with an exemplary embodiment.

FIG. 32 is a drawing of an exemplary core network device 3200 implementing a user plane function (UPF), e.g., a PSA UPF, in accordance with an exemplary embodiment. Core network device 3200 implementing a UPF is, e.g., UPF 620 of system 600 of FIG. 4, and of one or more of all of the signaling diagrams of FIG. 9, FIG. 13, FIG. 18, FIG. 24, FIG. 25, and/or FIG. 28.

Core network device 3200 includes a processor 3202, e.g., a CPU, a network interface 3204, an input device 3206, e.g., a keyboard or mouse, an output device 3208, e.g., a display, an assembly of hardware components 3210, e.g., an assembly of circuits, and memory 3212 coupled together via a bus 3214 over which the various elements may interchange data and information.

Network interface 3204, e.g., a wired or optical interface, includes a receiver 3216 and a transmitter 3218, via which the core network device 3200 implementing a UPF may communicate with other devices. Core network device 3200 implementing a UPF receives signals including messages from other devices via receiver 3216. Core network device 3200 implementing a UPF sends signals including messages to other devices via transmitter 3218.

Memory 3212 includes a control routine 3220, an assembly of components 3222, e.g., an assembly of software components, and data/information 3224. Control routine 3220 includes instructions, which when executed by processor 3202 controls the core network device 3200 implementing the UPF to perform basic device operational functions such as, e.g., controlling the network interface 3204, accessing memory 3212, storing in memory 3210, etc. Assembly of components 3222, e.g., an assembly of software components, includes instructions, which when executed by processor 3202 control the core network device 3200 implementing the UPF to implement steps of a method, e.g., steps of the methods of one or more or all of signaling diagrams of FIG. 9, FIG. 13, FIG. 18, FIG. 24, FIG. 25 and/or FIG. 28, which are performed by a UPF.

Data/information 3224 includes stack configuration information for Embodiment #1 3226, stack configuration information for Embodiment #2 3228, stack configuration information for Embodiment #3 3230, and stack configuration information for Embodiment #4 3234.

Figure 33:
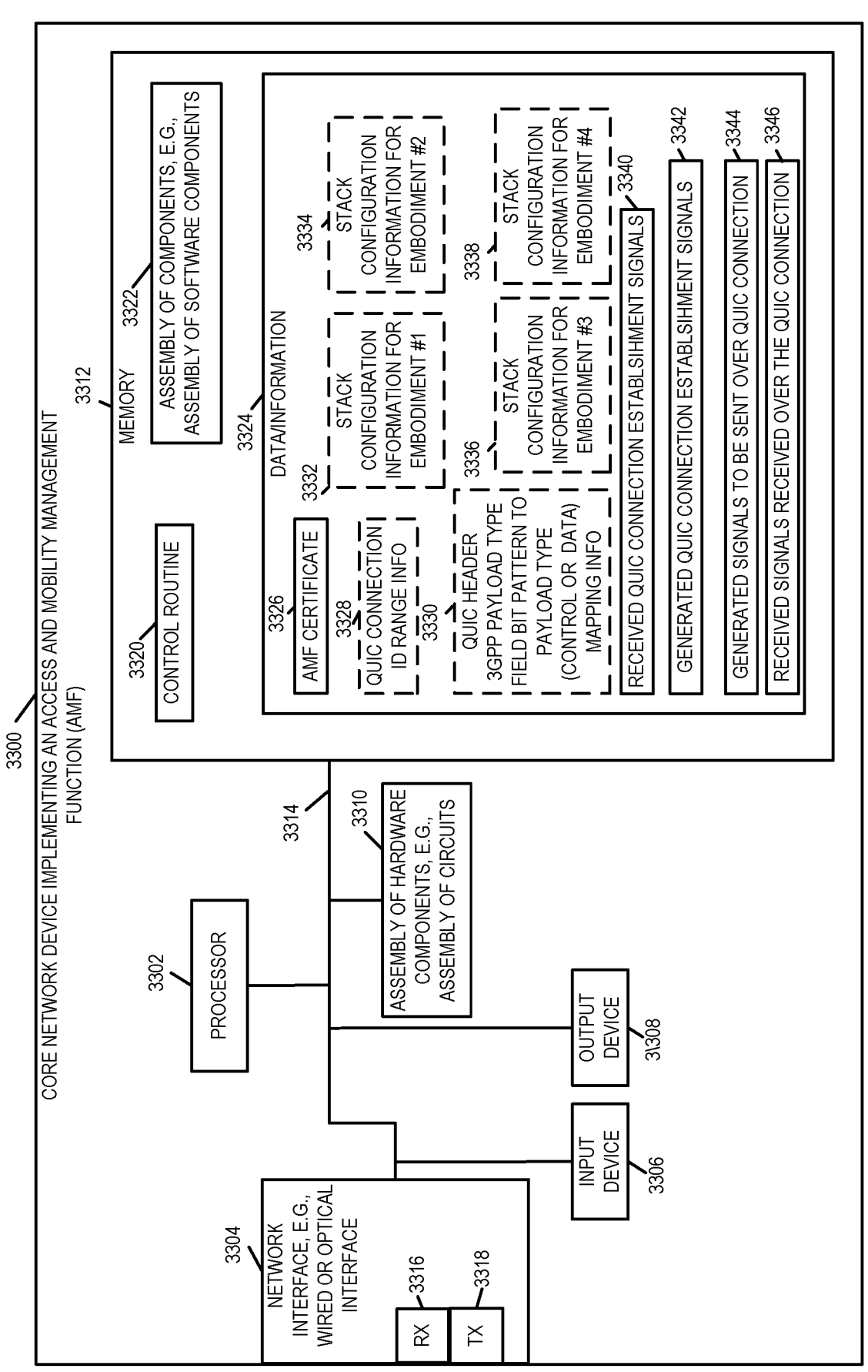
FIG. 33 is a drawing of an exemplary core network device implementing an access and mobility management function (AMF) in accordance with an exemplary embodiment.

FIG. 33 is a drawing of an exemplary core network device implementing an access and mobility management function (AMF) in accordance with an exemplary embodiment. Core network device 3300 implementing an AMF is, e.g., AMF 618 of system 600 of FIG. 4, and of one or more of all of the signaling diagrams of FIG. 9, FIG. 13, FIG. 18, FIG. 24, FIG. 25, and/or FIG. 28.

Core network device 3300 includes a processor 3302, e.g., a CPU, a network interface 3304, an input device 3306, e.g., a keyboard or mouse, an output device 3308, e.g., a display, an assembly of hardware components 3310, e.g., an assembly of circuits, and memory 3312 coupled together via a bus 3314 over which the various elements may interchange data and information.

Network interface 3304, e.g., a wired or optical interface, includes a receiver 3316 and a transmitter 3318, via which the core network device 3300 implementing an AMF may communicate with other devices. Core network device 3300 implementing an AMF receives signals including messages from other devices via receiver 3316. Core network device 3300 implementing an AMF sends signals including messages to other devices via transmitter 3318.

Memory 3312 includes a control routine 3320, an assembly of components 3322, e.g., an assembly of software components, and data/information 3324. Control routine 3320 includes instructions, which when executed by processor 3302 controls the core network device 3300 implementing the AMF to perform basic device operational functions such as, e.g., controlling the network interface 3304, accessing memory 3312, storing in memory 3310, etc. Assembly of components 3322, e.g., an assembly of software components, includes instructions, which when executed by processor 3302 control the core network device 3300 implementing the AMF to implement steps of a method, e.g., steps of the methods of one or more or all of signaling diagrams of FIG. 9, FIG. 13, FIG. 18, FIG. 24, FIG. 25 and/or FIG. 28, which are performed by an AMF.

Data/information 3324 includes an AMF certificate 3326, QUIC connection ID range information 3328, QUIC header 3GPP payload type field bit pattern to payload type (control or data) mapping information 3330, stack configuration information for Embodiment #1 3332, stack configuration information for Embodiment #2 3334, stack configuration information for Embodiment #3 3336, and stack configuration information for Embodiment #4 3338. Data/information 3324 further includes received QUIC connection establishment signals 3340, generated QUIC connection establishment signals 3342, generated signals to be sent over the QUIC connection 3344, and received signals which were received over the QUIC connection 3346.

Each of the following public references are each hereby expressly incorporated by reference in their entirety.

1) 3GPP TS 23.501 3rd Generation Partnership Project; Technical Specification Group Services and System Aspects; System architecture for the 5G System (5GS); Stage 2 (Release 18) V18.3.0 (2023 September)

2) 3GPP TS 23.502 V18.3.0 (2023 September) 3rd Generation Partnership Project Technical Specification Group Services and System Aspects; Procedures for the 5G System (5GS); Stage 2 (Release 18)

3) 3GPP TS 33.501 V18.3.0 (2023 September) 3rd Generation Partnership Project Technical Specification Group Services and System Aspects; Security architecture and procedures for 5G system (Release 18)

4) IETF RFC 8446 TLSv1.3, Internet Engineering Task Force (IETF) Request for Comments, The Transport Layer Security (TLS) Protocol Version 1.3, August 2018

5) IETF RFC 8555 ACME, Internet Engineering Task Force (IETF), Request for Comments: 8555, Automatic Certificate Management Environment (ACME), ISSN: 2070-1721 EFF, March 2019

6) IETF RFC 9000 QUIC, Internet Engineering Task Force (IETF), RFC 9000 QUIC: A UDP-Based Multiplexed and Secure Transport, May 2021

7) IETF RFC 9297 HTTP Datagrams and the Capsule Protocol, Internet Engineering Task Force (IETF), RFC 9297 HTTP Datagrams and the Capsule Protocol, ISSN 2070-1721 August 2022

8) IETF RFC 9298 Proxying UDP in HTTP, Internet Engineering Task Force (IETF), RFC 9298 Proxying UDP in HTTP, ISSN 2070-1721 August 2022

9) IETF draft-ietf-masque-connect-ip Proxying IP in HTTP (submitted to IESG for publication, Apr. 28, 2023) Workgroup: MASQUE, Internet-Draft: draft-ietf-masque-connect-ip-04, Published: 18 Jan. 2023

10) IETF draft-asedeno-masque-connect-ethernet Proxying Ethernet in HTTP, Workgroup: Multiplexed Application Substrate over QUIC Encryption, Internet-Draft: draft-asedeno-masque-connect-ethernet-00 Proxying Ethernet in HTTP, Published: 1 May 2023

11) IETF RFC 7296 IKEv2, Internet Engineering Task Force (IETF, Request for Comments: 7296, ISSN: 2070-1721, Internet Key Exchange Protocol Version 2 (IKEv2), October 2014

For brevity one or more of the above references may be referred to elsewhere in the present application using an abbreviated reference identifier. For example, TS 23.501 may be used to refer to the first reference, TS 23.502 may be used to refer to the second reference, TS 33.501 may be used to refer to the third reference, RFC 8446 may be used to refer to the fourth reference and so on. Accordingly, references to a TS number or RFC number matching one or the above references are used to refer to the corresponding reference listed above unless additional information indicating a different version or reference is provided.

Many of the above listed references are referred to in various locations in this application which occur prior to the detailed list of reference citations using abbreviated identifiers to avoid having to list the full citation each time a reference is discussed.

At least some of the following list of exemplary numbered method embodiments are method embodiments relating to using a QUIC Connection between a UE and N3IWF.

First Numbered List of Exemplary Method Embodiments

Method Embodiment 1. A method of operating a Non-3GPP InterWorking Function (N3IWF) (616) to support user equipment (UE) communications, the method comprising: performing a QUIC connection setup (910) with a first UE (624) to establish a first QUIC connection between the first UE and the N3IWF; and communicating (948) authentication request and response messages via the first QUIC connection between the first UE and the N3IWF as part of a UE registration procedure.

Note that method Embodiments 1A to 1C relate to storing information relating to connection ID ranges to distinguish between types of payload data to be communicated over different connections, e.g., control and user plane connections where the information can be preconfigured or sent to the UE and N3IWF via signaling.

Method Embodiment 1AA. The method of Method Embodiment 1, further comprising: storing (904) a N3IWF certificate to support QUIC connection setup (910).

Method Embodiment 1A. The method of Method Embodiment 1, further comprising: storing (905) QUIC connection ID range information in the N3IWF, said QUIC connection ID range information including: i) a first range of QUIC connection ID values corresponding to control plane interface signaling, ii) a second range of QUIC connection ID values corresponding to user plane interface signaling.

Method Embodiment 1B. The method of Method Embodiment 1A, wherein the control plane interface signaling have an AMF as an end point and the user plane interface signaling is user plane (UP) traffic.

Method Embodiment 1BA. The method of Method Embodiment 1A, further comprising: storing (e.g., Part of step 905) information indicating subsets of QUIC connection ID values corresponding to user plane traffic, different subsets of QUIC connection ID values corresponding to different types of user plane traffic and/or user plane traffic corresponding to different QoS levels.

Method Embodiment 1C. The method of Method Embodiment 1A, wherein said QUIC connection ID range information is preconfigured in the N3IWF (and the first UE).

Method Embodiment 1D. The method of Method Embodiment 1A, wherein said QUIC connection ID range information is communicated to N3IWF from a control device in the core network (and wherein the connection ID range values can be changed by the control device).

Note that method embodiments 1E to 1G relate to storing information indicating payload type identifiers used in QUIC headers in some embodiments to indicate different types of payloads, e.g., payloads corresponding to control or user plane connections.

Method Embodiment 1E. The Method Embodiment of claim 1, further comprising: storing (905') QUIC connection header payload type (e.g., 3GPP payload) identifiers including i) a first payload type identifier (e.g., value of 00) corresponding to N2(N1) interface (control plane) signaling, ii) a second payload type identifier (e.g., value of 01) corresponding to N3 interface (user plane data) traffic.

Method Embodiment 1F. The method of Method Embodiment 1E wherein said QUIC connection header payload type identifiers are preconfigured in the N3IWF (and the first UE).

Method Embodiment 1G. The method of Method Embodiment 1A, wherein said QUIC connection header payload type identifiers are communicated to the N3IWF (and the UE) from a control device in the network core (and wherein said QUIC connection header payload type identifiers can be changed by the control device).

Method Embodiment 2. The method of Method Embodiment 1, wherein said UE registration procedure involves communicating first UE registration information to an AMF (618) in the core network.

Method Embodiment 3. The method of Method Embodiment 1, wherein communicating (948) authentication request and response messages via the first QUIC connection between the first UE and the N3IWF as part of a UE registration procedure includes: using a first stack (1106 or 1606) in the N3IWF to communicate with the first UE (e.g., to process one or more messages received via the first QUIC connection), said first stack (1106 or 1606) including a HTTP/3 layer (1144 or 1642) with an extension for proxying GRE in HTTP (e.g., CONNECT-GRE), a QUIC layer (1140 or 1638) (e.g., using TLS1.3 (1142 or 1640)) and a UDP layer (1138 or 1636).

Method Embodiment 3A. The method of Method Embodiment 3, wherein the HTTP/3 layer (1144 or 1642) includes a MASQUE-XXX extension that provides CONNECT-GRE support (1156 or 1652).

Method Embodiment 4. The method of Method Embodiment 3, wherein the first stack (1106 or 1606) further includes a GRE layer (1146 or 1644) above the HTTP/3 layer (1144 or 1642).

Method Embodiment 5. The method of Method Embodiment 4, wherein the first stack (1106) further includes an EAP-5G layer (1148) (Embodiment 1) above the GRE layer (1146).

Method Embodiment 6. The method of Method Embodiment 3, wherein the first stack (1106) does not include an IKEv2 layer. (See, for comparison purposes, Prior Art FIG. 10 N3IWF stack 1006 which does include IKEv2 layer 1030).

Method Embodiment 7. The method of Method Embodiment 1, further comprising: receiving (1310 or 1352) at the N3IWF, following registration of said first UE via said UE registration procedure, a PDU session establishment communication (1308 or 1350) via the QUIC connection, the PDU session establishment communication using a QUIC connection identifier (a PDU session establishment message (1314 or 1356) received via the QUIC tunnel with a QUIC header is then communicated to the AMF after removal of the QUIC header used in communicating the PDU session establishment message to the N3IWF).

Note that Method Embodiment 8 uses a connection identifier value to indicate control traffic type.

Method Embodiment 8. The method of Method Embodiment 7, wherein the QUIC connection identifier (e.g., [X] in QUIC connection header of QUIC communication 1308) has a value indicating a control plane traffic type.

Note that Method Embodiment 8a uses a payload type indicator to indicate control plane signaling.

Method Embodiment 8A. The method of Method Embodiment 7, wherein the PDU session establishment communication (1350) includes a QUIC connection identifier (e.g., [X] in communications 1350) and a payload type indicator (e.g., value [00] in 3GPP Payload type field of header) indicating a control plane traffic type (e.g., control plane signaling type traffic).

Method Embodiment 9. The method of Method Embodiment 8, wherein a QUIC header in the PDU session establishment request indicates control plane signaling.

Method Embodiment 10. The method of Method Embodiment 7, wherein the PDU session establishment communication is processed in N3IWF using a second protocol stack (1206) including an inner IP layer (1244), a HTTP/3 layer (1242) with an extension for proxying IP in HTTP (e.g., CONNECT-IP), a QUIC layer (1238) and a UDP layer (1236).

Method Embodiment 10A. The method of Method Embodiment 10 wherein the HTTP/3 layer (1242) includes a MASQUE-XXX extension that provides CONNECT-IP support (1252).

Note that method embodiment 11 uses a QUIC connection identifier value to indicate communication type.

Method Embodiment 11. The method of Method Embodiment 7, further comprising: receiving (1324) at the N3IWF a QUIC traffic data communication (1322) including traffic data (first uplink data) via the QUIC connection.

Method Embodiment 11A. The method of Method Embodiment 11 wherein said QUIC traffic data communication (1322) includes a QUIC connection identifier value (e.g., value of [X] in header of QUIC communication 1322 including the first uplink data is within a range of QUIC connection ID values used for user plane traffic data) indicating user plane data.

Note that method embodiment 12 uses a payload type identifier (e.g., 3GPP payload type header (e.g., 2 bits) to indicate a user plane traffic data.

Method Embodiment 12. The method of Method Embodiment 7, further comprising: receiving (1366) at the N3IWF a QUIC traffic data communication (1364) including traffic data (first uplink data) via the QUIC connection, said traffic data communication (1364) including a QUIC connection identifier (e.g., [X] in QUIC header of QUIC communication 1364) and a payload type indicator (e.g., [01] in 3GPP Payload Type Field of QUIC header of QUIC communication 1364) indicating user plane traffic data.

Method Embodiment 13. The method of Method Embodiment 11, further comprising: processing, at the N3IWF, the traffic data using a third stack (1506) which includes a HTTP/3 layer (1542) with an extension for proxying GRE in HTTP (e.g., CONNECT-GRE), a QUIC layer (1538), and a UDP layer (1536).

Method Embodiment 14. The method of Method Embodiment 13, wherein said HTTP/3 layer (1542) includes a MASQUE-xxx extension that provides CONNECT-GRE support (1552).

Method Embodiment 15. The method of Method Embodiment 13, wherein the third stack (1506) does not include an inner IP layer. (See, for comparison purposes, Prior Art FIG. 14 N3IWF stack 1406 for UP communications which does include inner IP layer 1434.)

Method Embodiment 16. The method of Method Embodiment 13, wherein the third stack (1506) does not include an IPsec (tunnel mode) layer. (See, for comparison purposes, Prior Art FIG. 14 N3IWF stack 1406 for UP communications which does include IPsec (tunnel mode) layer 1432.)

One or more of the following Apparatus Embodiments relate to use of a QUIC Connection between a UE and N3IWF.

First Numbered List of Exemplary Apparatus Embodiments

Apparatus Embodiment 1. A Non-3GPP Inter Working Function (N3IWF) (616 or 3000) comprising: a receiver (3016); a transmitter (3018); and a processor (3002) configured to operate the N3IWF to: perform a QUIC connection setup (910) with a first UE (624) to establish a first QUIC connection between the first UE and the N3IWF; and communicate (948) authentication request and response messages via the first QUIC connection between the first UE and the N3IWF as part of a UE registration procedure.

Note that apparatus embodiments 1A to 1C relate to storing information relating to connection ID ranges to distinguish between types of payload data to be communicated over different connections, e.g., control and user plane connections where the information can be preconfigured or sent to the UE and N3IWF via signaling.

Apparatus Embodiment 1AA. The N3IWF of Apparatus Embodiment 1, further comprising: memory (3012); and wherein said processor (3002) is further configured to operate the N3IWF to: store (904) (e.g., in memory 3012) a N3IWF certificate to support QUIC connection setup (910).

Apparatus Embodiment 1A. The N3IWF of Apparatus Embodiment 1, further comprising: memory (3012); and wherein said processor (3002) is further configured operate the N3IWF to: store (905) (e.g., in memory 3012) QUIC connection ID range information in the N3IWF, said QUIC connection ID range information including: i) a first range of QUIC connection ID values corresponding to control plane signaling, ii) a second range of QUIC connection ID values corresponding to user plane signaling.

Apparatus Embodiment 1B. The N3IWF of Apparatus Embodiment 1A, wherein the control plane signaling have an AMF (618) as an end point and the user plane signaling is user plane (UP) traffic.

Apparatus Embodiment 1BA. The N3IWF of Apparatus Embodiment 1A, wherein said processor (3002) is further configured to operate the N3IWF to: store (e.g., Part of step 905) information indicating subsets of QUIC connection ID values corresponding to user plane traffic, different subsets of QUIC connection ID values corresponding to different types of user plane traffic and/or user plane traffic corresponding to different QoS levels.

Apparatus Embodiment 1C. The N3IWF of Apparatus Embodiment 1A, wherein said QUIC connection ID range information is preconfigured in the N3IWF (and the first UE).

Apparatus Embodiment 1D. The N3IWF of Apparatus Embodiment 1A, wherein said QUIC connection ID range information is communicated to N3IWF from a control device in the core network (and wherein the connection ID range values can be changed by the control device).

Note that Apparatus Embodiments 1E to 1G relate to storing information indicating payload type identifiers used in QUIC headers in some embodiments to indicate different types of payloads, e.g., payloads corresponding to control plane or user plane connections.

Apparatus Embodiment 1E. The N3IWF of Apparatus Embodiment 1, further comprising: memory (3012); and wherein said processor (3002) is further configured to operate the N3IWF to: store (905') (e.g., in memory 3002) QUIC connection header payload type (e.g., 3GPP payload) identifiers including i) a first payload type identifier (e.g., value of 00) corresponding to control interface (control plane) signaling, ii) a second payload type identifier (e.g., value of 01) corresponding to user plane interface (user plane data) traffic.

Apparatus Embodiment 1F. The N3IWF of Apparatus Embodiment 1E wherein said QUIC connection header payload type identifiers are preconfigured in the N3IWF (and the first UE).

Apparatus Embodiment 1G. The N3IWF of Apparatus Embodiment 1A, wherein said QUIC connection header payload type identifiers are communicated to the N3IWF (and the UE) from a control device in the network core (and wherein said QUIC connection header payload type identifiers can be changed by the control device).

Apparatus Embodiment 2. The N3IWF of Apparatus Embodiment 1, wherein said UE registration procedure involves communicating first UE registration information to an AMF (618) in the core network.

Apparatus Embodiment 3. The N3IWF of Apparatus Embodiment 1, wherein said processor (3002) is configured to: use a first stack (1106 or 1606) in the N3IWF to communicate with the first UE (e.g., to process one or more messages received via the first QUIC connection), as part of being configured to operate the N3IWF to communicate (948) authentication request and response messages via the first QUIC connection between the first UE and the N3IWF as part of a UE registration procedure, said first stack (1106 or 1606) including a HTTP/3 layer (1144 or 1642) with an extension for proxying GRE in HTTP (e.g., CONNECT-GRE), a QUIC layer (1140 or 1638) (e.g., using TLS1.3 (1142 or 1640)) and a UDP layer (1138 or 1636).

Apparatus Embodiment 3A. The N3IWF of Apparatus Embodiment 3, wherein the HTTP/3 layer (1144 or 1642) includes a MASQUE-XXX extension that provides CONNECT-GRE support (1156 or 1652).

Apparatus Embodiment 4. The N3IWF of Apparatus Embodiment 3, wherein the first stack (1106 or 1606) further includes a GRE layer (1146 or 1644) above the HTTP/3 layer (1144 or 1642).

Apparatus Embodiment 5. The N3IWF of Apparatus Embodiment 4, wherein the first stack (1106) further includes an EAP-5G layer (1148) (Embodiment 1) above the GRE layer (1146).

Apparatus Embodiment 6. The N3IWF of Apparatus Embodiment 3, wherein the first stack (1106) does not include an IKEv2 layer. (See, for comparison purposes, Prior Art FIG. 10 N3IWF stack 1006 which does include IKEv2 layer 1030).

Apparatus Embodiment 7. The N3IWF of Apparatus Embodiment 1, wherein said first processor (3002) is further configured to operate the N3IWF to: receive (1310 or 1352) (via receiver 3016) at the N3IWF, following registration of said first UE via said UE registration procedure, a PDU session establishment communication (1308 or 1350) via the QUIC connection, the PDU session establishment communication using a QUIC connection identifier (a PDU session establishment message (1314 or 1356) received via the QUIC tunnel with a QUIC header is then communicated to the AMF after removal of the QUIC header used in communicating the PDU session establishment message to the N3IWF).

Note that Apparatus Embodiment 8 uses a connection identifier value to indicate a control traffic type.

Apparatus Embodiment 8. The N3IWF of Apparatus Embodiment 7, wherein the QUIC connection identifier (e.g., [X] in QUIC connection header of QUIC communication 1308) has a value indicating a control plane traffic type.

Note that Apparatus Embodiment 8a uses a payload type indicator to indicate control plane signaling.

Apparatus Embodiment 8A. The N3IWF of Apparatus Embodiment 7, wherein the PDU session establishment communication (1350) includes a QUIC connection identifier (e.g., [X] in communications 1350) and a payload type indicator (e.g., value [00] in 3GPP Payload type field of header) indicating a control plane traffic type (e.g., control plane signaling type traffic).

Apparatus Embodiment 9. The N3IWF of Apparatus Embodiment 8, wherein a QUIC header in the PDU session establishment request indicates N1 control signaling.

Apparatus Embodiment 10. The N3IWF of Apparatus Embodiment 7, wherein the PDU session establishment communication is processed in N3IWF using a second protocol stack (1206) including an inner IP layer (1244), a HTTP/3 layer (1242) with an extension for proxying IP in HTTP (e.g., CONNECT-IP), a QUIC layer (1238) and a UDP layer (1236).

Apparatus Embodiment 10A. The N3IWF of Apparatus Embodiment 10 wherein the HTTP/3 layer (1242) includes a MASQUE-XXX extension that provides CONNECT-IP support (1252).

Note that Apparatus Embodiment 11 uses a QUIC connection identifier value to indicate a communication type.

Apparatus Embodiment 11. The N3IWF of Apparatus Embodiment 7, wherein said processor (3002) is further configured to operate the N3IWF to: receive (1324) (via receiver 3016) at the N3IWF a QUIC traffic data communication (1322) including traffic data (first uplink data) via the QUIC connection.

Apparatus Embodiment 11A. The N3IWF of Apparatus Embodiment 11 wherein said QUIC traffic data communication (1322) includes a QUIC connection identifier value (e.g., value of [X] in header of QUIC communication 1322 including the first uplink data is within a range of QUIC connection ID values used for user plane traffic data) indicating user plane data.

Note that Apparatus Embodiment 12 uses a payload type identifier (e.g., 3GPP payload type header (e.g., 2 bits) to indicate a user plane traffic data).

Apparatus Embodiment 12. The N3IWF of Apparatus Embodiment 7, wherein said processor (3002) is further configured to operate the N3IWF to: receive (1366) (via receiver 3016) at the N3IWF a QUIC traffic data communication (1364) including traffic data (first uplink data) via the QUIC connection, said traffic data communication (1364) including a QUIC connection identifier (e.g., [X] in QUIC header of QUIC communication 1364) and a payload type indicator (e.g., [01] in 3GPP Payload Type Field of QUIC header of QUIC communication 1364) indicating user plane traffic data.

Apparatus Embodiment 13. The N3IWF of Apparatus Embodiment 11, wherein said processor (3002) is further configured to: process, at the N3IWF, the traffic data using a third stack (1506) which includes a HTTP/3 layer (1542) with an extension for proxying GRE in HTTP (e.g., CONNECT-GRE), a QUIC layer (1538), and a UDP layer (1536).

Apparatus Embodiment 14. The N3IWF of Apparatus Embodiment 13, wherein said HTTP/3 layer (1542) includes a MASQUE-xxx extension that provides CONNECT-GRE support (1552).

Apparatus Embodiment 15. The N3IWF of Apparatus Embodiment 13, wherein the third stack (1506) does not include an inner IP layer. (See, for comparison purposes, Prior Art FIG. 14 N3IWF stack 1406 for UP communications which does include inner IP layer 1434.)

Apparatus Embodiment 16. The N3IWF of Apparatus Embodiment 13, wherein the third stack (1506) does not include an IPsec (tunnel mode) layer. (See, for comparison purposes, Prior Art FIG. 14 N3IWF stack 1406 for UP communications which does include IPsec (tunnel mode) layer 1432.)

First Set of Non-Transitory Computer Readable Medium Apparatus Embodiments

Non-Transitory Computer Readable Medium Embodiment 1. A non-transitory computer readable medium (3012) including machine executable instructions, which when executed by a processor (3002) of a Non-3GPP InterWorking Function (N3IWF) (616 or 3000) cause the N3IWF to perform the steps of: performing a QUIC connection setup (910) with a first UE (624) to establish a first QUIC connection between the first UE and the N3IWF; and communicating (948) authentication request and response messages via the first QUIC connection between the first UE and the N3IWF as part of a UE registration procedure.

Note that at least some of the following Method Embodiments relate to use of a QUIC Connection between a UE and TNGF.

Second Numbered List of Exemplary Method Embodiments

Method Embodiment 1. A method of operating a Trusted Non-3GPP Gateway Function (TNGF) (612) to support user equipment (UE) communications, the method comprising: performing a QUIC connection setup (1808) with a first UE (624) to establish a first QUIC connection between the first UE and the TNGF; and communicating (1846) authentication request and response messages via the first QUIC connection between the first UE and the TNGF as part of a UE registration procedure.

Note that following Method Embodiments 1A to 1C relate to storing information relating to connection ID ranges to distinguish between types of payload data to be communicated over different connections, e.g., control and user plane connections where the information can be preconfigured or sent to the UE and TNGF via signaling.

Method Embodiment 1AA. The method of Method Embodiment 1, further comprising: storing (1804) a TNGF certificate to support QUIC connection setup.

Method Embodiment 1A. The method of Method Embodiment 1, further comprising: storing (1805) QUIC connection ID range information in the TNGF, said QUIC connection ID range information including: i) a first range of QUIC connection ID values corresponding to control plane interface signaling, ii) a second range of QUIC connection ID values corresponding to user plane interface traffic.

Method Embodiment 1B. The method of Method Embodiment 1A, wherein the control plane interface signaling have an AMF as an end point and the user plane interface signaling is user plane (UP) traffic.

Method Embodiment 1BA. The method of Method Embodiment 1A, further comprising: storing (e.g., Part of step 1805) information indicating subsets of QUIC connection ID values corresponding to user plane traffic, different subsets of QUIC connection ID values corresponding to different types of user plane traffic and/or user plane traffic corresponding to different QoS levels.

Method Embodiment 1C. The method of Method Embodiment 1A, wherein said QUIC connection ID range information is preconfigured in the TNGF (and the first UE).

Method Embodiment 1D. The method of Method Embodiment 1A, wherein said QUIC connection ID range information is communicated to TNGF from a control device in the core network (and wherein the connection ID range values can be changed by the control device).

Note that Method Embodiments 1E to 1G relate to storing information indicating payload type identifiers used in QUIC headers in some embodiments to indicate different types of payloads, e.g., payloads corresponding to control or user plane connections.

Method Embodiment 1E. The method of Method Embodiment 1, further comprising: storing (1805') QUIC connection header payload type (e.g., 3GPP payload) identifiers including i) a first payload type identifier (e.g., value of 00) corresponding to control plane interface signaling, ii) a second payload type identifier (e.g., value of 01) corresponding to user plane interface (user plane data) traffic.

Method Embodiment 1F. The method of Method Embodiment 1E wherein said QUIC connection header payload type identifiers are preconfigured in the TNGF (and the first UE).

Method Embodiment 1G. The method of Method Embodiment 1A, wherein said QUIC connection header payload type identifiers are communicated to the TNGF (and the UE) from a control device in the network core (and wherein said QUIC connection header payload type identifiers can be changed by the control device).

Method Embodiment 2. The method of Method Embodiment 1, wherein communicating (1846) authentication request and response messages via the first QUIC connection between the first UE and the TNGF as part of a UE registration procedure includes: using a first stack (1906) in the TNGF to communicate with the first UE (e.g., to process one or more messages received via the first QUIC connection), said first stack (1906) including a HTTP/3 layer (1942) with an extension for proxying GRE in HTTP (e.g., CONNECT-GRE), a QUIC layer (1938) (e.g., using TLS1.3 (1940)) and a UDP layer (1936).

Method Embodiment 2A. The method of Method Embodiment 2, wherein the HTTP/3 layer (1942) includes a MASQUE-XXX extension that provides CONNECT-GRE support (1952).

Method Embodiment 3. The method of Method Embodiment 2, wherein the first stack (1906) further includes a GRE layer (1944) above the HTTP/3 layer (1942).

Method Embodiment 4. The method of Method Embodiment 2, wherein the first stack (1906) does not include an EAP-5G layer. (See, for comparison purposes, Prior Art FIG. 15 TNGF stack (1706), which includes EAP-5G layer 1726).

Method Embodiment 5. The method of Method Embodiment 1, further comprising: receiving (2410 or 2452) at the TNGF, following registration of said first UE via said UE registration procedure, a PDU session establishment communication (2408 or 2450) via the QUIC connection, the PDU session establishment communication (2408 or 2450) using a QUIC connection identifier (a PDU session establishment message (2414 or 2456) received via the QUIC tunnel with a QUIC header is then communicated to the AMF (618) after removal of the QUIC header used in communicating the PDU session establishment message to the TNGF).

Note that Method Embodiment 6 relates to use of a connection identifier value to indicate control traffic type.

Method Embodiment 6. The method of Method Embodiment 5, wherein the QUIC connection identifier (e.g., [X] in QUIC connection header of QUIC communication 2408) has a value indicating a control plane traffic type (e.g., X value in within a range of values for QUIC connection identifiers to be used for UP data type traffic).

Note that following Method Embodiment 6a relates to use payload type indicator to indicate control plane signaling.

Method Embodiment 6A. The method of Method Embodiment 5, wherein the PDU session establishment communication (2450) includes a QUIC connection identifier (e.g., [X] in communications 2450) and a payload type indicator (e.g., value [00] in 3GPP Payload type field of header) indicating a control plane traffic type (e.g., control plane signaling type traffic).

Method Embodiment 7. The method of Method Embodiment 6, wherein a QUIC header in the PDU session establishment request indicates control signaling.

Method Embodiment 8. The method of Method Embodiment 5, wherein the PDU session establishment communication is processed in TNGF using a second protocol stack (2106) including an inner IP layer (2144), a HTTP/3 layer (2142) with an extension for proxying IP in HTTP (e.g., CONNECT-IP), a QUIC layer (2138) and a UDP layer (2136).

Method Embodiment 8A. The method of Method Embodiment 8, wherein the HTTP/3 layer (2142) includes a MASQUE-XXX extension that provides CONNECT-IP support (2152).

Method Embodiment 8B. The method of Method Embodiment 8, wherein the second protocol stack (2106) does not include a TCP layer (See, for comparison Prior Art FIG. 20 TNGF stack (2006) which does include TCP layer (2036)).

Method Embodiment 8C. The method of Method Embodiment 8, wherein the second stack (2106) does not include an IPsec (tunnel mode) layer. (See, for comparison Prior Art FIG. 20 TNGF stack (2006) which does include IPsec (tunnel mode) layer (2032)).

Note that the following Method Embodiment 9 uses a QUIC connection identifier value to indicate communication type.

Method Embodiment 9. The method of Method Embodiment 5, further comprising: receiving (2410) at the TNGF a QUIC traffic data communication (2408) including traffic data (first uplink data) via the QUIC connection.

Method Embodiment 9A. The method of Method Embodiment 9, wherein said traffic data communication (2408) includes a QUIC connection identifier value (e.g., value of [X] in header of QUIC communication (2408) including the first uplink data is within a range of QUIC connection ID values used for user plane traffic data) indicating user plane data.

Note that the following Method Embodiment 10 relates to using a payload type identifier (e.g., 3GPP payload type header (e.g., 2 bits) to indicate user plane traffic data).

Method Embodiment 10. The method of Method Embodiment 5, further comprising: receiving at the TNGF a QUIC traffic data communication (2422) including traffic data (first uplink data) via the QUIC connection, said traffic data communication (2422) including a QUIC connection identifier (e.g., [X] value in QUIC header of QUIC communication 2422) and a payload type indicator (e.g., [01] in 3GPP Payload type Field of QUIC header of QUIC communication 2422) indicating user plane traffic data.

Method Embodiment 11. The method of Method Embodiment 9, further comprising: processing, at the TNGF, the traffic data using a third stack (2306) which includes a HTTP/3 layer (2342) with an extension for proxying GRE in HTTP (e.g., CONNECT-GRE), a QUIC layer (2338), and a UDP layer (2336).

Method Embodiment 12. The method of Method Embodiment 11, wherein said HTTP/3 layer (2342) includes a MASQUE-xxx extension that provides CONNECT-GRE support (2352).

Method Embodiment 13. The method of Method Embodiment 11, wherein the third protocol stack (2306) does not include an inner IP layer. (See, for comparison, Prior Art FIG. 22 TNGF stack 2206 for UP which does include inner IP layer 2234.)

Method Embodiment 14. The method of Method Embodiment 11, wherein the third protocol stack (2306) does not include an IPsec (tunnel mode) layer (See, for comparison, Prior Art FIG. 22 in which TNGF stack 2206 for UP which does include IPsec (tunnel mode) layer (2232)).

Second Numbered List of Exemplary Apparatus Embodiments

Apparatus Embodiment 1. A Trusted Non-3GPP Gateway Function (TNGF) (612 or 3100): comprising: a receiver (3116); a transmitter (3118); and a processor (3102) configured to operate the TNGF to: perform a QUIC connection setup (1808) with a first UE (624) to establish a first QUIC connection between the first UE and the TNGF; and communicate (1846) (via transmitter 3118 and receiver 3116) authentication request and response messages via the first QUIC connection between the first UE and the TNGF as part of a UE registration procedure.

Note that the following Apparatus Embodiments 1A to 1C relate to storing information relating to connection ID ranges to distinguish between types of payload data to be communicated over different connections, e.g., control and user plane connections where the information can be preconfigured or sent to the UE and TNGF via signaling.

Apparatus Embodiment 1AA. The TNGF of Apparatus Embodiment 1, further comprising: memory (3112); and wherein said processor (3102) is further configured to operate the TNGF to: store (1804) (e.g., in memory 3112) a TNGF certificate to support QUIC connection setup.

Apparatus Embodiment 1A. The TNGF of Apparatus Embodiment 1, further comprising: memory (3112); and wherein said processor (3102) is further configured to operate the TNGF to: store (1805) (in memory 3112) QUIC connection ID range information in the TNGF, said QUIC connection ID range information including: i) a first range of QUIC connection ID values corresponding to control plane interface signaling, ii) a second range of QUIC connection ID values corresponding to user plane interface traffic.

Apparatus Embodiment 1B. The TNGF of Apparatus Embodiment 1A, wherein the control plane interface signaling have an AMF as an end point and the user plane interface signaling is user plane (UP) traffic.

Apparatus Embodiment 1BA. The TNGF of Apparatus Embodiment 1A, wherein said processor (3102) is further configured to operate the TNGF to: store (e.g., Part of step 1805) information indicating subsets of QUIC connection ID values corresponding to user plane traffic, different subsets of QUIC connection ID values corresponding to different types of user plane traffic and/or user plane traffic corresponding to different QoS levels.

Apparatus Embodiment 1C. The TNGF of Apparatus Embodiment 1A, wherein said QUIC connection ID range information is preconfigured in the TNGF (and the first UE).

Apparatus Embodiment 1D. The TNGF of Apparatus Embodiment 1A, wherein said QUIC connection ID range information is communicated to TNGF from a control device in the core network (and wherein the connection ID range values can be changed by the control device).

Note that the following Apparatus Embodiments 1E to 1G relate to storing information indicating payload type identifiers used in QUIC headers in some embodiments to indicate different types of payloads, e.g., payloads corresponding to control or user plane connections.

Apparatus Embodiment 1E. The TNGF of Apparatus Embodiment 1, further comprising: memory (3112); and wherein said processor (3102) is further configured to operate the TNGF to: store (1805') (in memory 3112) QUIC connection header payload type (e.g., 3GPP payload) identifiers including i) a first payload type identifier (e.g., value of 00) corresponding to control plane interface signaling, ii) a second payload type identifier (e.g., value of 01) corresponding to user plane interface traffic.

Apparatus Embodiment 1F. The TNGF of Apparatus Embodiment 1E wherein said QUIC connection header payload type identifiers are preconfigured in the TNGF (and the first UE).

Apparatus Embodiment 1G. The TNGF of Apparatus Embodiment 1A, wherein said QUIC connection header payload type identifiers are communicated to the TNGF (and the UE) from a control device in the network core (and wherein said QUIC connection header payload type identifiers can be changed by the control device).

Apparatus Embodiment 2. The TNGF of Apparatus Embodiment 1, wherein said processor (3102) is further configured to operate the TNGF to: use a first stack (1906) in the TNGF to communicate with the first UE (e.g., to process one or more messages received via the first QUIC connection), as part of being configured to operate the TNGF to communicate (1846) authentication request and response messages via the first QUIC connection between the first UE and the TNGF as part of a UE registration procedure, said first stack (1906) including a HTTP/3 layer (1942) with an extension for proxying GRE in HTTP (e.g., CONNECT-GRE), a QUIC layer (1938) (e.g., using TLS1.3 (1940)) and a UDP layer (1936).

Apparatus Embodiment 2A. The TNGF of Apparatus Embodiment 2, wherein the HTTP/3 layer (1942) includes a MASQUE-XXX extension that provides CONNECT-GRE support (1952).

Apparatus Embodiment 3. The TNGF of Apparatus Embodiment 2, wherein the first stack (1906) further includes a GRE layer (1944) above the HTTP/3 layer (1942).

Apparatus Embodiment 4. The TNGF of Apparatus Embodiment 2, wherein the first stack (1906) does not include an EAP-5G layer. (See, for comparison purposes, Prior Art FIG. 15 TNGF stack (1706), which includes EAP-5G layer 1726).

Apparatus Embodiment 5. The TNGF of Apparatus Embodiment 1, further comprising: memory (3112); and wherein said processor (3102) is further configured to operate the TNGF to: receive (2410 or 2452) (via receiver 3116) at the TNGF, following registration of said first UE via said UE registration procedure, a PDU session establishment communication (2408 or 2450) via the QUIC connection, the PDU session establishment communication (2408 or 2450) using a QUIC connection identifier (a PDU session establishment message (2414 or 2456) received via the QUIC tunnel with a QUIC header is then communicated to the AMF (618) after removal of the QUIC header used in communicating the PDU session establishment message to the TNGF).

Note that the following Apparatus Embodiment 6 relates to use of a connection identifier value to indicate control traffic type.

Apparatus Embodiment 6. The TNGF of Apparatus Embodiment 5, wherein the QUIC connection identifier (e.g., [X] in QUIC connection header of QUIC communication 2408) has a value indicating a control plane traffic type (e.g., X value in within a range of values for QUIC connection identifiers to be used for UP data type traffic).

Note that the following Apparatus Embodiment 6a relates to use of a payload type indicator to indicate control plane signaling.

Apparatus Embodiment 6A. The TNGF of Apparatus Embodiment 5, wherein the PDU session establishment communication (2450) includes a QUIC connection identifier (e.g., [X] in communications 2450) and a payload type indicator (e.g., value [00] in 3GPP Payload type field of header) indicating a control plane traffic type (e.g., control plane signaling type traffic).

Apparatus Embodiment 7. The TNGF of Apparatus Embodiment 6, wherein a QUIC header in the PDU session establishment request indicates control signaling.

Apparatus Embodiment 8. The TNGF of Apparatus Embodiment 5, wherein the PDU session establishment communication is processed in TNGF using a second protocol stack (2106) including an inner IP layer (2144), a HTTP/3 layer (2142) with an extension for proxying IP in HTTP (e.g., CONNECT-IP), a QUIC layer (2138) and a UDP layer (2136).

Apparatus Embodiment 8A. The TNGF of Apparatus Embodiment 8, wherein the HTTP/3 layer (2142) includes a MASQUE-XXX extension that provides CONNECT-IP support (2152).

Apparatus Embodiment 8B. The TNGF of Apparatus Embodiment 8, wherein the second protocol stack (2106) does not include a TCP layer (See, for comparison Prior Art FIG. 20 TNGF stack (2006) which does include TCP layer (2036)).

Apparatus Embodiment 8C. The TNGF of Apparatus Embodiment 8, wherein the second stack (2106) does not include an IPsec (tunnel mode) layer. (See, for comparison Prior Art FIG. 20 TNGF stack (2006) which does include IPsec (tunnel mode) layer (2032)).

Note that Apparatus Embodiment 9 relates to use of QUIC connection identifier value to indicate communication type.

Apparatus Embodiment 9. The TNGF of Apparatus Embodiment 5, wherein said processor (3102) is further configured to operate the TNGF to: receive (2410) (via receiver 3116) at the TNGF a QUIC traffic data communication (2408) including traffic data (first uplink data) via the QUIC connection.

Apparatus Embodiment 9A. The TNGF of Apparatus Embodiment 9, wherein said traffic data communication (2408) includes a QUIC connection identifier value (e.g., value of [X] in header of QUIC communication (2408) including the first uplink data is within a range of QUIC connection ID values used for user plane traffic data) indicating user plane data.

Note that Apparatus Embodiment 10 relates to using a payload type identifier (e.g., 3GPP payload type header (e.g., 2 bits) to indicate user plane traffic data)).

Apparatus Embodiment 10. The TNGF of Apparatus Embodiment 5, wherein said processor (3102) is further configured to operate the TNGF to: receive at the TNGF a QUIC traffic data communication (2422) including traffic data (first uplink data) via the QUIC connection, said traffic data communication (2422) including a QUIC connection identifier (e.g., [X] value in QUIC header of QUIC communication 2422) and a payload type indicator (e.g., [01] in 3GPP Payload type Field of QUIC header of QUIC communication 2422) indicating user plane traffic data.

Apparatus Embodiment 11. The TNGF of Apparatus Embodiment 9, wherein said processor (3102) is further configured to: process, at the TNGF, the traffic data using a third stack (2306) which includes a HTTP/3 layer (2342) with an extension for proxying GRE in HTTP (e.g., CON-NECT-GRE), a QUIC layer (2338), and a UDP layer (2336).

Apparatus Embodiment 12. The TNGF of Apparatus Embodiment 11, wherein said HTTP/3 layer (2342) includes a MASQUE-xxx extension that provides CONNECT-GRE support (2352).

Apparatus Embodiment 13. The TNGF of Apparatus Embodiment 11, wherein the third protocol stack (2306) does not include an inner IP layer. (See, for comparison, Prior Art FIG. 22 TNGF stack 2206 for UP which does include inner IP layer 2234.)

Apparatus Embodiment 14. The TNGF of Apparatus Embodiment 11, wherein the third protocol stack (2306) does not include an IPsec (tunnel mode) layer (See, for comparison, Prior Art FIG. 22 in which TNGF stack 2206 for UP which does include IPsec (tunnel mode) layer (2232)).

Second Numbered List of Exemplary Non-Transitory Computer Readable Medium Embodiments Non-Transitory Computer Readable Medium Embodiment 1. A non-transitory computer readable medium (3112) including machine executable instructions, which when executed by a processor (3102) of a Trusted Non-3GPP Gateway Function (TNGF) (612 or 3100) cause the TNGF to perform the steps of: performing a QUIC connection setup (1808) with a first UE (624) to establish a first QUIC connection between the first UE and the TNGF; and communicating (1846) authentication request and response messages via the first QUIC connection between the first UE and the TNGF as part of a UE registration procedure.

In this document the use of MASQUE-xxx is equivalent to CONNECT-UDP, CONNECT-IP, or CONNECT-xxx where xxx could be GRE, IP, or possibly EAP-5G or NAS.

The techniques of various embodiments may be implemented using software, hardware and/or a combination of software and hardware. Various embodiments are directed to apparatus, e.g., user equipment (UE) devices, core network interfacing devices, e.g., N3IWF devices, TNGF devices, etc., core network devices (e.g., PCF devices, AMF devices, SMF devices, UPF devices, etc.), access network devices (e.g., base stations, WiFi access nodes, cable network access devices), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to methods, e.g., method of controlling and/or operating user equipment (UE) devices, core network devices (e.g., PCF devices, AMF devices, SMF devices, UPF devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to a machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., user equipment (UE) devices, core network interfacing devices, e.g., N3IWF devices, TNGF devices, etc., core network devices (e.g., PCF devices, AMF devices, SMF devices, UPF devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements described herein are implemented using one or more components to perform the steps corresponding to one or more methods, for example, provisioning user equipment devices, provisioning AP devices, provisioning AAA servers, provisioning orchestration servers, generating messages, message reception, message transmission, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., user (UE) devices, core network interfacing devices, e.g., N3IWF devices, TNGF devices, etc., core network devices (e.g., PCF devices, AMF devices, SMF devices, UPF devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, are configured to perform the steps of the methods described as being performed by the user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., a user equipment (UE) devices, core network interfacing devices, e.g., N3IWF devices, TNGF devices, etc., core network devices (e.g., PCF devices, AMF devices, SMF devices, UPF devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, with a processor which includes a component corresponding to each of the steps of the various described methods performed by the device in which the processor is included. In some but not all embodiments a device, e.g., user equipment (UE) devices, core network interfacing devices, e.g., N3IWF devices, TNGF devices, etc., core network devices (e.g., PCF devices, AMF devices, SMF devices, UPF devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a Configuration Auditor and Configuration Enforcer (CACE) device, an operations support system (OSS) device, a secure shell file transfer protocol (SFTP) server, a core network node, a base station, a UE, an access point, a device including a AMF, a device including a UDM, a device including a SMF, a device including a PCF, a device including a UPF, a server, a device including a N3IWF, a device including a TNGF, a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., a UE, an access point, a device including a AMF, a device including a UDM, a device including a SMF, a device including a PCF, a device including a UPF, a server, a device including a N3IWF, a device including a TNGF, an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a Trusted Non-3GPP Gateway Function (TNGF) to support user equipment (UE) communications, the method comprising:

performing a QUIC connection setup with a first user equipment (UE) to establish a first QUIC connection between the first UE and the TNGF; and communicating authentication request and response messages via the first QUIC connection between the first UE and the TNGF as part of a UE registration procedure, said step of communicating authentication request and response messages via the first QUIC connection between the first UE and the TNGF as part of a UE registration procedure including:

using a first stack in the TNGF to communicate with the first UE, said first stack including a HTTP/3 layer with an extension for proxying GRE in HTTP, a QUIC layer and a UDP layer.

2. The method of claim 1, wherein the first stack further includes a GRE layer above the HTTP/3 layer.

3. The method of claim 1, wherein the first stack does not include an EAP-5G layer.

4. The method of claim 1, further comprising:

receiving at the TNGF, following registration of said first UE via said UE registration procedure, a PDU session establishment communication via the first QUIC connection, the PDU session establishment communication using a QUIC connection identifier.

5. The method of claim 4, wherein the QUIC connection identifier has a value indicating a control plane traffic type.

6. The method of claim 1, further comprising:

receiving at the TNGF a QUIC traffic data communication including traffic data via the first QUIC connection.

7. A method of operating a Trusted Non-3GPP Gateway Function (TNGF) to support user equipment (UE) communications, the method comprising:

performing a QUIC connection setup with a first user equipment (UE) to establish a first QUIC connection between the first UE and the TNGF;

communicating authentication request and response messages via the first QUIC connection between the first UE and the TNGF as part of a UE registration procedure;

receiving at the TNGF, following registration of said first UE via said UE registration procedure, a PDU session establishment communication via the first QUIC connection, the PDU session establishment communication using a QUIC connection identifier, said QUIC connection identifier having a value indicating a control plane traffic type; and wherein a QUIC header in the PDU session establishment request indicates control signaling.

8. A method of operating a Trusted Non-3GPP Gateway Function (TNGF) to support user equipment (UE) communications, the method comprising:

performing a QUIC connection setup with a first user equipment (UE) to establish a first QUIC connection between the first UE and the TNGF;

communicating authentication request and response messages via the first QUIC connection between the first UE and the TNGF as part of a UE registration procedure;

receiving at the TNGF, following registration of said first UE via said UE registration procedure, a PDU session establishment communication via the first QUIC connection, the PDU session establishment communication using a QUIC connection identifier; and wherein the PDU session establishment communication is processed in TNGF using a second protocol stack including an inner IP layer, a HTTP/3 layer with an extension for proxying IP in HTTP, a QUIC layer and a UDP layer.

9. A method of operating a Trusted Non-3GPP Gateway Function (TNGF) to support user equipment (UE) communications, the method comprising:

performing a QUIC connection setup with a first user equipment (UE) to establish a first QUIC connection between the first UE and the TNGF;

communicating authentication request and response messages via the first QUIC connection between the first UE and the TNGF as part of a UE registration procedure;

receiving at the TNGF, following registration of said first UE via said UE registration procedure, a PDU session establishment communication via the first QUIC connection, the PDU session establishment communication using a QUIC connection identifier; and receiving at the TNGF a QUIC traffic data communication including traffic data via the first QUIC connection, said traffic data communication including a QUIC connection identifier and a payload type indicator indicating user plane traffic data.

10. A method of operating a Trusted Non-3GPP Gateway Function (TNGF) to support user equipment (UE) communications, the method comprising:

performing a QUIC connection setup with a first user equipment (UE) to establish a first QUIC connection between the first UE and the TNGF;

communicating authentication request and response messages via the first QUIC connection between the first UE and the TNGF as part of a UE registration procedure;

receiving at the TNGF, following registration of said first UE via said UE registration procedure, a PDU session establishment communication via the first QUIC connection, the PDU session establishment communication using a QUIC connection identifier;

receiving at the TNGF a QUIC traffic data communication including traffic data via the first QUIC connection; and processing, at the TNGF, the traffic data using a third protocol stack which includes a HTTP/3 layer with an extension for proxying GRE in HTTP, a QUIC layer, and a UDP layer.

11. The method of claim 10, wherein said HTTP/3 layer includes a MASQUE-xxx extension that provides CON-NECT-GRE support.

12. The method of claim 10, wherein the third protocol stack does not include an IPsec layer.

13. A Trusted Non-3GPP Gateway Function (TNGF) comprising:

a receiver;

a transmitter; and a processor configured to operate the TNGF to:

perform a QUIC connection setup with a first user equipment (UE) to establish a first QUIC connection between the first UE and the TNGF; and communicate authentication request and response messages via the first QUIC connection between the first UE and the TNGF as part of a UE registration procedure; and wherein said processor is further configured to operate the TNGF to:

use a first stack in the TNGF to communicate with the first UE, as part of being configured to operate the TNGF to communicate authentication request and response messages via the first QUIC connection between the first UE and the TNGF as part of a UE registration procedure, said first stack including a HTTP/3 layer with an extension for proxying GRE in HTTP, a QUIC layer and a UDP layer.

14. The TNGF of claim 13, wherein the first stack further includes a GRE layer above the HTTP/3 layer.

15. The TNGF of claim 13, wherein the first stack does not include an EAP-5G layer.

16. The TNGF of claim 15, further comprising:

memory; and wherein said processor is further configured to operate the TNGF to:

receive at the TNGF, following registration of said first UE via said UE registration procedure, a PDU session establishment communication via the first QUIC connection, the PDU session establishment communication using a QUIC connection identifier.

17. The TNGF of claim 16, wherein the QUIC connection identifier has a value indicating a control plane traffic type.

18. A Trusted Non-3GPP Gateway Function (TNGF) comprising:

a receiver;

a transmitter; and

54 a processor configured to operate the TNGF to:

perform a QUIC connection setup with a first user equipment (UE) to establish a first QUIC connection between the first UE and the TNGF;

communicate authentication request and response messages via the first QUIC connection between the first UE and the TNGF as part of a UE registration procedure;

receive, at the TNGF, following registration of said first UE via said UE registration procedure, a PDU session establishment communication via the first QUIC connection, the PDU session establishment communication using a QUIC connection identifier; and receive, at the TNGF, a QUIC traffic data communication including traffic data via the first QUIC connection, said traffic data communication including a QUIC connection identifier and a payload type indicator indicating user plane traffic data.

* * * * *